(12) United States Patent
Knowlton et al.

(10) Patent No.: US 9,918,485 B2
(45) Date of Patent: Mar. 20, 2018

(54) SOY PROTEIN PRODUCTS HAVING ALTERED CHARACTERISTICS

(71) Applicant: E I DU PONT DE NEMOURS AND COMPANY, Wilmington, DE (US)

(72) Inventors: Susan Knowlton, Elkton, MD (US); Charles T Blaisdell, Odessa, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/718,214

(22) Filed: May 21, 2015

(65) Prior Publication Data

US 2015/0250205 A1 Sep. 10, 2015

Related U.S. Application Data

(63) Continuation of application No. 13/630,303, filed on Sep. 28, 2012, now abandoned, which is a continuation of application No. 12/337,897, filed on Dec. 18, 2008, now abandoned.

(60) Provisional application No. 61/015,750, filed on Dec. 21, 2007.

(51) Int. Cl.
| | |
|---|---|
| A23J 3/16 | (2006.01) |
| A23C 11/10 | (2006.01) |
| A23L 2/38 | (2006.01) |
| A23L 2/66 | (2006.01) |
| A23K 40/00 | (2016.01) |
| A23K 20/147 | (2016.01) |
| A23L 11/00 | (2016.01) |
| A23L 33/185 | (2016.01) |

(52) U.S. Cl.
CPC .............. *A23J 3/16* (2013.01); *A23C 11/103* (2013.01); *A23K 20/147* (2016.05); *A23K 40/00* (2016.05); *A23L 2/38* (2013.01); *A23L 2/66* (2013.01); *A23L 11/07* (2016.08); *A23L 33/185* (2016.08)

(58) Field of Classification Search
CPC ....................................................... A23J 3/16
See application file for complete search history.

(56) References Cited

U.S. PATENT DOCUMENTS

| | | | |
|---|---|---|---|
| 4,309,344 | A | 1/1982 | Walsh |
| 5,936,069 | A | 8/1999 | Johnson |
| 6,599,556 | B2 | 7/2003 | Stark et al. |
| 6,716,469 | B2 | 4/2004 | Stark et al. |
| 6,720,020 | B2 | 4/2004 | Karieskind et al. |
| 6,803,068 | B2 | 10/2004 | Monagle |
| 2003/0045689 | A1 | 3/2003 | Monagle |

(Continued)

FOREIGN PATENT DOCUMENTS

| | | |
|---|---|---|
| JP | 4207159 | 7/1992 |
| JP | 5168416 | 7/1993 |
| WO | 2007/013146 | 2/2007 |

OTHER PUBLICATIONS

Burkwall et al. (CA 1066115 A), 1979, Derwent Abstract Only.*

(Continued)

*Primary Examiner* — Elizabeth Gwartney
(74) *Attorney, Agent, or Firm* — E I Dupont De Nemours & Co

(57) ABSTRACT

Soy protein products obtained from high oleic soybeans, wherein such products, have improved whiteness, reduced viscosity and reduced gel-strength, are described. Use of such products in food, beverage and animal feed are also disclosed.

11 Claims, 7 Drawing Sheets

(56) References Cited

U.S. PATENT DOCUMENTS

Figure 1:
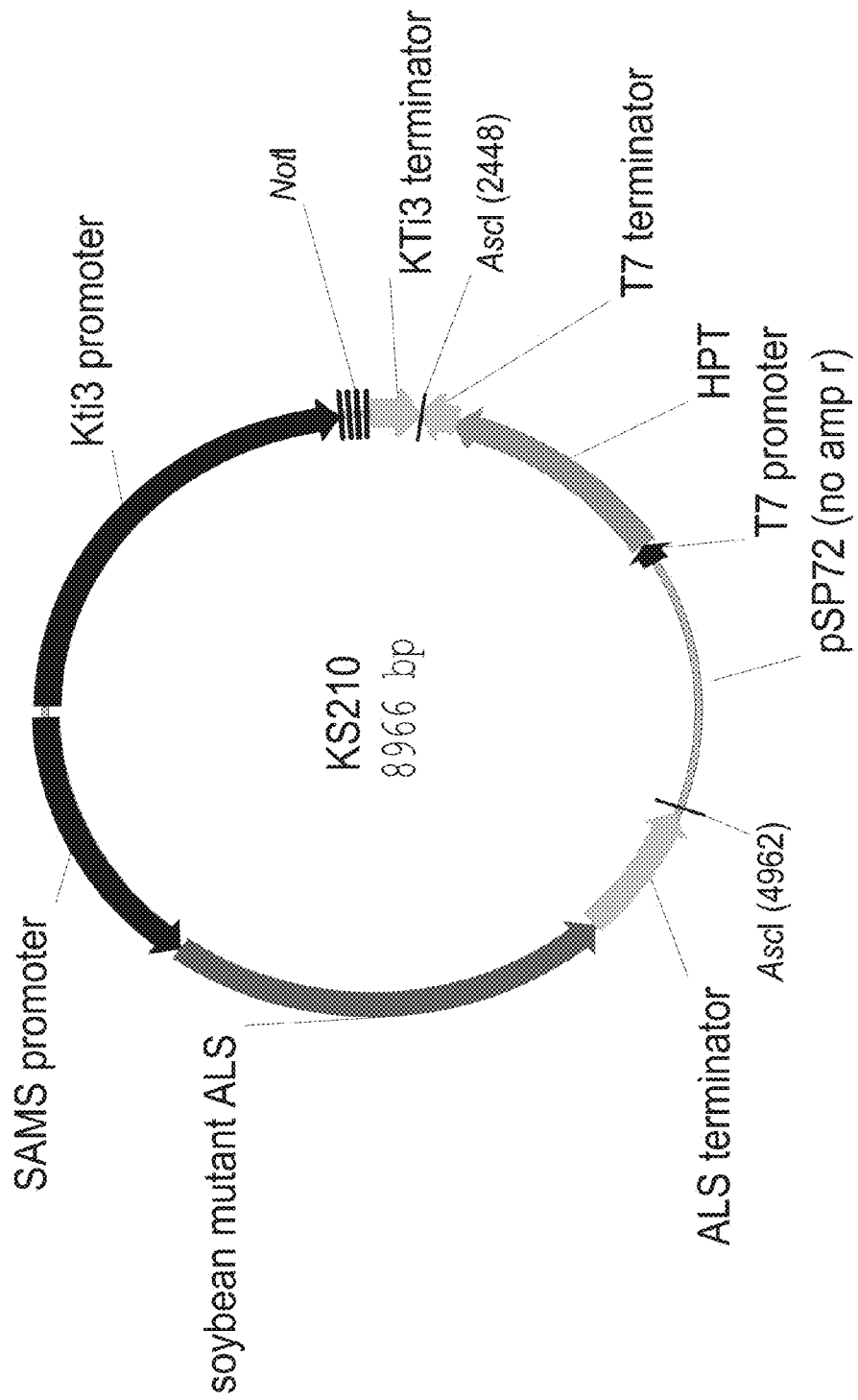

2003/0104108 A1 6/2003 Patel et al.
2004/0028774 A1 2/2004 Prevost et al.
2006/0062889 A1 3/2006 Houston et al.

OTHER PUBLICATIONS

Kinney et al.", Designer oils: the high oleic acid soybean"—Genetic Modification in the Food Industry, Ed. Sibel Roller and Susan Harlander, Springer-Science+ Business Media (1998), p. 193-211.*
Lucas et al., "Soy Protein Products: Processing and Use"—J. Nutr, Mar. 1995, 125 (3 Suppl), 573S-580S.*
Burkwall et al., "Solid, semi-moist animal foods with caseinate replacement by soy protein isolate and starch enzyme" CA 1066115A—Derwent Abstract Only.
Lynn Grooms, Modified Soybeans: What's the bottom line? Mar. 31, 1998, XP002532635, URL:http://farmindustrynews.com/mag/farming_modified_soybeans_whats/>.
International Search Report, PCT/US2008/087585.
European Office Action, EP Application No. 08 866 441.2, dated Sep. 27, 2011.
European Office Action, EP Application No. 08 866 441.2, dated Dec. 17, 2014.
Edmund W. Lusas et al., Soy Protein Products: Processing and Use, Journal of Nutrition, Mar. 1995, 125 (3 Suppl), 573S-580S.
Y. Takagi et al., Inheritance of high oleic acid content in the seed oil of soybean mutant M23, Theor Appl Genet, 1996, pp. 179-182, vol. 92.

* cited by examiner

SEQUENCE LISTING

<160> NUMBER OF SEQ ID NOS: 26

<210> SEQ ID NO 1
<211> LENGTH: 7993
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (5182)..(5182)
<223> OTHER INFORMATION: n is a, c, g, or t

```
<400> SEQUENCE: 1
cgcgccaagc ttggatccgc gccaagcttg gatcctagaa ctagaaacgt gatgccactt      60
gttattgaag tcgattacag catctattct gttttactat ttataacttt gccatttctg     120
acttttgaaa actatctctg gatttcggta tcgctttgtg aagatcgagc aaaagagacg     180
ttttgtggac gcaatggtcc aaatccgttc tacatgaaca aattggtcac aatttccact     240
aaaagtaaat aaatggcaag ttaaaaaagg aatatgcatt ttactgattg cctaggtgag     300
ctccaagaga agttgaatct acacgtctac caaccgctaa aaaagaaaa acattgatat       360 gtaacctgat tccattagct tttgacttct tcaacagatt ctctacttag atttctaaca     420
gaaatattat tactagcaca tcattttcag tctcactaca gcaaaaaatc caacggcaca     480
atacagacaa caggagatat cagactacag agatagatag atgctactgc atgtagtaag     540
ttaaataaaa ggaaaataaa atgtcttgct accaaaacta ctacagacta tgatgctcac     600
cacaggccaa atcctgcaac taggacagca ttatcttata tatattgtac aaaacaagca     660
tcaaggaaca tttggtctag gcaatcagta cctcgttcta ccatcaccct cagttatcac     720
atccttgaag gatccattac tgggaatcat cggcaacaca tgctcctgat ggggcacaat     780
gacatcaaga aggtaggggc caggggtgtc caacattctc tgaattgccg ctctaagctc     840
ttccttcttc gtcactcgcg ctgccggtat cccacaagca tcagcaaact tgagcatgtt     900
tgggaatatc tcgctctcgc tagacggatc tccaagatag gtgtgagctc tattggactt     960
gtagaaccta tcctccaact gaaccaccat acccaaatgc tgattgttca acaacaatat    1020
cttaactggg agattctcca ctcttatagt ggccaactcc tgaacattca tgatgaaact    1080
accatcccca tcaatgtcaa ccacaacagc cccagggtta gcaacagcag caccaatagc    1140
cgcaggcaat ccaaaaccca tggctccaag accccctgag gtcaaccact gcctcggtct    1200
cttgtacttg taaaactgcg cagcccacat tgatgctgc ccaaccccag tactaacaat     1260
agcatctcca ttagtcaact catcaagaac ctcgatagca tgctgcggag aaatcgcgtc    1320
ctggaatgtc ttgtaaccca tggaaacttt gtgtttctgc acattaatct cttctctcca    1380
acctccaaga tcaaacttac cctccactcc tttctcctcc aaaatcatat taattccctt    1440
caaggccaac ttcaaatccg cgcaaaccga cacgtgcgcc tgcttgttct tcccaatctc    1500
ggcagaatca atatcaatgt gaacaatctt agccctacta gcaaaagcct caagcttccc    1560
agtaacacgg tcatcaaacc ttaccccaaa ggcaagcaac aaatcactat tgtcaacagc    1620
atagttagca taaacagtac catgcatacc cagcatctga agggaatatt catcaccaat    1680
aggaaaagtt ccaagaccca ttaaagtgct agcaacggga ataccagtga gttcaacaaa    1740
gcgcctcaat tcagcactgg aattcaaact gccaccgccg acgtagagaa cgggcttttg    1800
ggcctccatg atgagtctga caatgtgttc caattgggcc tcggcggggg gcctgggcag    1860
cctggcgagg taaccgggga ggttaacggg ctcgtcccaa ttaggcacgg cgagttgctg    1920
ctgaacgtct ttgggaatgt cgatgaggac cggaccgggg cggccggagg tggcgacgaa    1980
gaaagcctcg gcgacgacgc gggggatgtc gtcgacgtcg aggatgaggt agttgtgctt    2040
cgtgatggat ctgctcacct ccacgatcgg ggtttcttgg aaggcgtcgg tgccgatcat    2100
ccggcgggcg acctggccgg tgatggcgac gactgggacg ctgtccatta aagcgtcggc    2160
gaggccgctc acgaggttgg tggcgccggg gccggaggtg gcaatgcaga cgccggggag    2220 gccgaggaa cgcgcgtagc cttcggcggc gaagacgccg ccctgctcgt ggcgcgggag     2280
cacgttgcgg atggcggcgg agcgcgtgag cgcctggtgg atctccatcg acgcaccgcc    2340
```

```
ggggtacgcg aacaccgtcg tcacgccctg cctctccagc gcctccacaa ggatgtccgc    2400
gcccttgcga ggttcgccgg aggcgaaccg tgacacgaag ggctccgtgg tcggcgcttc    2460
cttggtgaag ggcgccgccg tgggggggttt ggagatggaa catttgattt tgagagcgtg   2520
gttgggtttg gtgagggttt gatgagagag agggaggggtg gatctagtaa tgcgtttggg   2580
gaaggtgggg tgtgaagagg aagaagagaa tcgggtggtt ctggaagcgg tggccgccat    2640
tgtgttgtgt ggcatggtta tacttcaaaa actgcacaac aagcctagag ttagtaccta    2700
aacagtaaat ttacaacaga gagcaaagac acatgcaaaa atttcagcca taaaaaaagt    2760
tataatagaa tttaaagcaa aagtttcatt ttttaaacat atatacaaac aaactggatt    2820
tgaaggaagg gattaattcc cctgctcaaa gtttgaattc ctattgtgac ctatactcga    2880
ataaaattga agcctaagga atgtatgaga acaagaaaa caaaacaaaa ctacagacaa     2940
acaagtacaa ttacaaaatt cgctaaaatt ctgtaatcac caaaccccat ctcagtcagc    3000
acaaggccca aggtttattt tgaaataaaa aaaagtgat tttatttctc ataagctaaa     3060
agaaagaaag gcaattatga aatgatttcg actagatctg aaagtccaac gcgtattccg    3120
cagatattaa agaaagagta gagtttcaca tggatcctag atggacccag ttgaggaaaa    3180
agcaaggcaa agcaaaccag aagtgcaaga tccgaaattg aaccacggaa tctaggattt    3240
ggtagaggga gaagaaaagt accttgagag gtagaagaga agagaagagc agagagatat    3300
atgaacgagt gtgtcttggt ctcaactctg aagcgatacg agtttagagg ggagcattga    3360
gttccaattt atagggaaac cgggtggcag gggtgagtta atgacggaaa agcccctaag    3420
taacgagatt ggattgtggg ttagattcaa ccgtttgcat ccgcggctta gattggggaa    3480
gtcagagtga atctcaaccg ttgactgagt tgaaaattga atgtagcaac caattgagcc    3540
aaccccagcc tttgcccttt gattttgatt tgtttgttgc atacttttta tttgtcttct    3600
ggttctgact ctcttttctct cgtttcaatg ccaggttgcc tactcccaca ccactcacaa    3660
gaagattcta ctgttagtat taaatatttt ttaatgtatt aaatgatgaa tgcttttgta    3720
aacagaacaa gactatgtct aataagtgtc ttgcaacatt ttttaagaaa ttaaaaaaaa    3780
tatatttatt atcaaaatca aatgtatgaa aaatcatgaa taatataatt ttatacattt    3840
ttttaaaaaa tcttttaatt tcttaattaa tatcttaaaa ataatgatta atatttaacc    3900
caaaataatt agtatgattg gtaaggaaga tatccatgtt atgtttggat gtgagtttga    3960
tctagagcaa agcttactag agtcgaccga tccgtcgacg gcgcggatcc tcgaagagaa    4020 gggtaataa cacatttttt aacattttta acacaaattt tagttattta aaaatttatt      4080
aaaaaattta aaataagaag aggaactctt taaataaatc taacttacaa aatttatgat    4140
ttttaataag ttttcaccaa taaaaaatgt cataaaaata tgttaaaaag tatattatca    4200
atattctctt tatgataaat aaaaagaaaa aaaaaataaa agttaagtga aaatgagatt    4260
gaagtgactt taggtgtgta taaatatatc aaccccgcca acaatttatt taatccaaat    4320
atattgaagt atattattcc atagccttta tttatttata tatttattat ataaaagctt    4380
tatttgttct aggttgttca tgaaatattt ttttggtttt atctccgttg taagaaaatc    4440
atgtgctttg tgtcgccact cactattgca gcttttcat gcattggtca gattgacggt      4500
tgattgtatt tttgtttttt atggttttgt gttatgactt aagtcttcat ctctttatct    4560
cttcatcagg tttgatggtt acctaatatg gtccatgggt acatgcatgg ttaaattagg    4620
tggccaactt tgttgtgaac gatagaattt tttttatatt aagtaaacta ttttatatt     4680 atgaaataat aataaaaaaa atattttatc attattaaca aaatcatatt agttaatttg    4740
```

```
ttaactctat aataaaagaa atactgtaac attcacatta catggtaaca tctttccacc    4800
ctttcatttg tttttgttt gatgactttt tttcttgttt aaatttattt cccttctttt    4860
aaatttggaa tacattatca tcatatataa actaaaatac taaaaacagg attacacaaa    4920
tgataaataa taacacaaat atttataaat ctagctgcaa tatatttaaa ctagctatat    4980
cgatattgta aaataaaact agctgcattg atactgataa aaaaatatca tgtgctttct    5040
ggactgatga tgcagtatac ttttgacatt gcctttattt tatttttcag aaaagctttc    5100
ttagttctgg gttcttcatt atttgtttcc catctccatt gtgaattgaa tcatttgctt    5160
cgtgtcacaa atacaattta gntaggtaca tgcattggtc agattcacgg tttattatgt    5220
catgacttaa gttcatggta gtacattacc tgccacgcat gcattatatt ggttagattt    5280
gataggcaaa tttggttgtc aacaatataa atataaataa tgttttata ttacgaaata     5340
acagtgatca aaacaaacag ttttatcttt attaacaaga ttttgttttt gtttgatgac    5400
gttttttaat gtttacgctt tccccttct tttgaattta gaacacttta tcatcataaa     5460
atcaaatact aaaaaaatta catatttcat aaataataac acaaatattt ttaaaaaatc    5520
tgaaataata atgaacaata ttacatatta tcacgaaaat tcattaataa aaatattata    5580
taaataaat gtaatagtag ttatatgtag gaaaaaagta ctgcacgcat aatatataca     5640
aaagattaa aatgaactat tataaataat aacactaaat taatggtgaa tcatatcaaa     5700
ataatgaaaa agtaaataaa atttgtaatt aacttctata tgtattacac acacaaataa    5760
taaataatag taaaaaaaat tatgataaat atttaccatc tcataagata tttaaaataa    5820
tgataaaaat atagattatt ttttatgcaa ctagctagcc aaaaagagaa cacgggtata    5880
tataaaaaga gtacctttaa attctactgt acttcctta ttcctgacgt ttttatatca     5940
agtggacata cgtgaagatt ttaattatca gtctaaatat tcattagca cttaatactt     6000
ttctgtttta ttcctatcct ataagtagtc ccgattctcc caacattgct tattcacaca    6060
actaactaag aaagtcttcc atagcccccc aagcggccgg agctggtcat ctcgctcatc    6120
gtcgagtcgg cggccggagc tggtcatctc gctcatcgtc gagtcggcgg ccgccggtcc    6180
tctctctttc cgtggcatgg caatctattg ggctgtccag ggttgcatcc ttactggtgt    6240
ttgggtcatt gcccatgagt gtggtcacca tgcattcagt gactaccagc tgcttgatga    6300
tattgttggc cttatcctcc actccgctct cctagtcccg tacttttcat ggaaatacag    6360
ccatcgccgt caccactcca acactggttc tcttgagcgg gatgaagtat tgtgtgccaaa   6420
gcagaagtcc tgtatcaagt ggtactctaa ataccttaac aatcctccag gcagagtcct    6480
cactcttgct gtcaccctca cacttggttg gcccttgtac ttggctttaa atgtttctgg    6540
aaggccttat gatagatttg cttgccacta gacccatat ggtcccattt actctgatcg     6600
tgaacgactt caaatatata tatcagatgc aggagtactt gcaggactta ctctctctac    6660
cgtgttgcaa ccctgaaagg gttggttttgg ctgctatgtg tttatggggt gcctttgctc    6720
attgtgaacg gttttcttgt gactatcaca tatttgcagc acacacactt tgccttgcct    6780
cattacgatt catcagaatg ggactggctg aagggagctt tggcaactat ggacagagat    6840
tatgggattc tgaacaaggt gtttcatcac ataactgata ctcatgtggc tcaccatctc    6900
ttctctacaa tgccacatta ccatgcaatg gaggcaacca atgcaatcaa gccaatattg    6960
ggtgagtact accaatttga tgacacacca ttttacaagg cactgtggag agaagcgaga    7020
gagtgcctct atgtggagcc agatgaagga acatccgaga agggctcctc caccgtttaa    7080
gattgcagaa atcagagctt caataccaaa acattgctgg gtcaagaatc catggagatc    7140
```

| | |
|---|---|
| cctcagttat gttctcaggg atgtgcttgt aattgctgca ttggtggctg cagcaattca | 7200 |
| cttcgacaac tggcttctct ggctaatcta ttgccccatt caaggcacaa tgttctgggc | 7260 |
| tctctttgtt cttggacatg attgtggcca tggaagcttt tcagatagcc ctttgctgaa | 7320 |
| tagcctggtg ggacacatct tgcattcctc aattcttgtg ccataccatg gatggagaat | 7380 |
| tagccacaga actcaccatc aaaaccatgg acacattgag aaggatgagt catgggttcc | 7440 |
| attaacagag aagatttaca agaatctaga cagcatgaca agactcatta gattcactgt | 7500 |
| gccatttcca ttgtttgtgt atccaattta tttgttttca agaagccccg gaaaggaagg | 7560 |
| ctctcacttc aatccctaca gcaatctgtt cccacccagt gagagaaaag gaatagcaat | 7620 |
| atcaacactg tgttgggcta ccatgttttc tctgcttatc tatctctcat tcataactag | 7680 |
| tccacttcta gtgctcaagc tctatgggcg gccgccgact cgacgatgag cgagatgacc | 7740 |
| agctccggcc gccgactcga cgatgagcga gatgaccagc tccggccgcg acacaagtgt | 7800 |
| gagagtacta aataaatgct ttggttgtac gaaatcatta cactaaataa aataatcaaa | 7860 |
| gcttatatat gccttccgct aaggccgaat gcaaagaaat tggttctttc tcgttatctt | 7920 |
| ttgccacttt tactagtacg tattaattac tacttaatca tctttgttta cggctcatta | 7980 |
| tatccgtcga cgg | 7993 |

<210> SEQ ID NO 2
<211> LENGTH: 1533
<212> TYPE: DNA
<213> ORGANISM: artificial sequence
<220> FEATURE:
<223> OTHER INFORMATION: recombinant construct

<400> SEQUENCE: 2

| | |
|---|---|
| cggtcctctc tctttccgtg gcatggcaat ctattgggct gtccagggtt gcatccttac | 60 |
| tggtgtttgg gtcattgccc atgagtgtgg tcaccatgca ttcagtgact accagctgct | 120 |
| tgatgatatt gttggcctta tcctccactc cgctctccta gtcccgtact tttcatggaa | 180 |
| atacagccat cgccgtcacc actccaacac tggttctctt gagcgggatg aagtatttgt | 240 |
| gccaaagcag aagtcctgta tcaagtggta ctctaaatac cttaacaatc ctccaggcag | 300 |
| agtcctcact cttgctgtca ccctcacact tggttggccc ttgtacttgg ctttaaatgt | 360 |
| ttctggaagg cctatgata gatttgcttg ccactatgac ccatatggtc ccatttactc | 420 |
| tgatcgtgaa cgacttcaaa tatatatatc agatgcagga gtacttgcag gacttactct | 480 |
| ctctaccgtg ttgcaaccct gaaagggttg gtttggctgc tatgtgttta tggggtgcct | 540 |
| ttgctcattg tgaacggttt tcttgtgact atcacatatt tgcagcacac acactttgcc | 600 |
| ttgcctcatt acgattcatc agaatgggac tggctgaagg gagctttggc aactatggac | 660 |
| agagattatg ggattctgaa caaggtgttt catcacataa ctgatactca tgtggctcac | 720 |
| catctcttct ctacaatgcc acattaccat gcaatggagg caaccaatgc aatcaagcca | 780 |
| atattgggtg agtactacca atttgatgac acaccatttt acaaggcact gtggagagaa | 840 |
| gcgagagagt gcctctatgt ggagccagat gaaggaacat ccgagaaggg ctcctccacc | 900 |
| gtttaagatt gcagaaatca gagcttcaat accaaaacat tgctgggtca agaatccatg | 960 |
| gagatccctc agttatgttc tcagggatgt gcttgtaatt gctgcattgg tggctgcagc | 1020 |
| aattcacttc gacaactggc ttctctggct aatctattgc cccattcaag gcacaatgtt | 1080 |
| ctgggctctc tttgttcttg gacatgattg tggccatgga agcttttcag atagcccttt | 1140 |
| gctgaatagc ctggtgggac acatcttgca ttcctcaatt cttgtgccat accatggatg | 1200 |

| | |
|---|---|
| gagaattagc cacagaactc accatcaaaa ccatggacac attgagaagg atgagtcatg | 1260 |
| ggttccatta acagagaaga tttacaagaa tctagacagc atgacaagac tcattagatt | 1320 |
| cactgtgcca tttccattgt tgtgtatcc aatttatttg ttttcaagaa gccccggaaa | 1380 |
| ggaaggctct cacttcaatc cctacagcaa tctgttccca cccagtgaga gaaaaggaat | 1440 |
| agcaatatca acactgtgtt gggctaccat gttttctctg cttatctatc tctcattcat | 1500 |
| aactagtcca cttctagtgc tcaagctcta tgg | 1533 |

<210> SEQ ID NO 3
<211> LENGTH: 28
<212> TYPE: DNA
<213> ORGANISM: artificial sequence
<220> FEATURE:
<223> OTHER INFORMATION: primer

<400> SEQUENCE: 3
gcggccgccg gtcctctctc tttccgtg          28

<210> SEQ ID NO 4
<211> LENGTH: 31
<212> TYPE: DNA
<213> ORGANISM: artificial sequence
<220> FEATURE:
<223> OTHER INFORMATION: primer

<400> SEQUENCE: 4
taaacggtgg aggagcccett ctcggatgtt c          31

<210> SEQ ID NO 5
<211> LENGTH: 33
<212> TYPE: DNA
<213> ORGANISM: artificial sequence
<220> FEATURE:
<223> OTHER INFORMATION: primer

<400> SEQUENCE: 5
gaacatccga aagggctcc tccaccgttt aag          33

<210> SEQ ID NO 6
<211> LENGTH: 28
<212> TYPE: DNA
<213> ORGANISM: artificial sequence
<220> FEATURE:
<223> OTHER INFORMATION: primer

<400> SEQUENCE: 6
gcggccgccc atagagcttg agcactag          28

<210> SEQ ID NO 7
<211> LENGTH: 890
<212> TYPE: DNA
<213> ORGANISM: artificial sequence
<220> FEATURE:
<223> OTHER INFORMATION: recombinant construct

<400> SEQUENCE: 7

| | |
|---|---|
| cggtcctctc tctttccgtg gcatggcaat ctattgggct gtccagggtt gcatccttac | 60 |
| tggtgtttgg gtcattgccc atgagtgtgg tcaccatgca ttcagtgact accagctgct | 120 |
| tgatgatatt gttggcctta tcctccactc cgctctccta gtcccgtact tttcatggaa | 180 |
| atacagccat cgccgtcacc actccaacac tggttctctt gagcgggatg aagtatttgt | 240 |
| gccaaagcag aagtcctgta tcaagtggta ctctaaatac cttaacaatc ctccaggcag | 300 |

-continued

| | |
|---|---|
| agtcctcact cttgctgtca ccctcacact tggttggccc ttgtacttgg ctttaaatgt | 360 |
| ttctggaagg ccttatgata gatttgcttg ccactatgac ccatatggtc ccatttactc | 420 |
| tgatcgtgaa cgacttcaaa tatatatatc agatgcagga gtacttgcag gacttactct | 480 |
| ctctaccgtg ttgcaaccct gaaagggttg gtttggctgc tatgtgttta tggggtgcct | 540 |
| ttgctcattg tgaacggttt tcttgtgact atcacatatt tgcagcacac acactttgcc | 600 |
| ttgcctcatt acgattcatc agaatgggac tggctgaagg gagctttggc aactatggac | 660 |
| agagattatg ggattctgaa caaggtgttt catcacataa ctgatactca tgtggctcac | 720 |
| catctcttct ctacaatgcc acattaccat gcaatggagg caaccaatgc aatcaagcca | 780 |
| atattgggtg agtactacca atttgatgac acaccatttt acaaggcact gtggagagaa | 840 |
| gcgagagagt gcctctatgt ggagccagat gaaggaacat ccgagaaggg | 890 |

```
<210> SEQ ID NO 8
<211> LENGTH: 28
<212> TYPE: DNA
<213> ORGANISM: artificial sequence
<220> FEATURE:
<223> OTHER INFORMATION: primer

<400> SEQUENCE: 8
```

| | |
|---|---|
| gcggccgccg gtcctctctc tttccgtg | 28 |

```
<210> SEQ ID NO 9
<211> LENGTH: 30
<212> TYPE: DNA
<213> ORGANISM: artificial sequence
<220> FEATURE:
<223> OTHER INFORMATION: primer

<400> SEQUENCE: 9
```

| | |
|---|---|
| tagagagagt aagtcctgca agtactcctg | 30 |

```
<210> SEQ ID NO 10
<211> LENGTH: 30
<212> TYPE: DNA
<213> ORGANISM: artificial sequence
<220> FEATURE:
<223> OTHER INFORMATION: primer

<400> SEQUENCE: 10
```

| | |
|---|---|
| caggagtact tgcaggactt actctctcta | 30 |

```
<210> SEQ ID NO 11
<211> LENGTH: 29
<212> TYPE: DNA
<213> ORGANISM: artificial sequence
<220> FEATURE:
<223> OTHER INFORMATION: primer

<400> SEQUENCE: 11
```

| | |
|---|---|
| gcggccggcc ccttctcgga tgttccttc | 29 |

```
<210> SEQ ID NO 12
<211> LENGTH: 2460
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (1186)..(1186)
<223> OTHER INFORMATION: n is a, c, g, or t
```

```
<400> SEQUENCE: 12
ccaagcttgg atcctcgaag agaagggtta ataacacatt ttttaacatt tttaacacaa      60
attttagtta tttaaaaatt tattaaaaaa tttaaaataa gaagaggaac tctttaaata     120
aatctaactt acaaaattta tgatttttaa taagttttca ccaataaaaa atgtcataaa     180
aatatgttaa aaagtatatt atcaatattc tctttatgat aaataaaaag aaaaaaaaaa     240
taaaagttaa gtgaaaatga gattgaagtg actttaggtg tgtataaata tatcaacccc     300
gccaacaatt tatttaatcc aaatatattg aagtatatta ttccatagcc tttatttatt     360
tatatattta ttatataaaa gcttatttg ttctaggttg ttcatgaaat attttttgg       420
ttttatctcc gttgtaagaa aatcatgtgc tttgtgtcgc cactcactat tgcagctttt    480
tcatgcattg gtcagattga cggttgattg tattttttgtt ttttatggtt ttgtgttatg   540
acttaagtct tcatctcttt atctcttcat caggtttgat ggttacctaa tatggtccat    600
gggtacatgc atggttaaat taggtggcca actttgttgt gaacgataga attttttta    660
tattaagtaa actatttta tattatgaaa taataataaa aaaatatttt tatcattatt     720
aacaaaatca tattagttaa tttgttaact ctataataaa agaaatactg taacattcac    780
attacatggt aacatctttc caccctttca ttttgttttt gtttgatgac tttttttctt   840
gtttaaattt atttcccttc ttttaaattt ggaatacatt atcatcatat ataaactaaa    900
atactaaaaa caggattaca caaatgataa ataataacac aaatatttat aaatctagct    960
gcaatatatt taaactagct atatcgatat tgtaaaataa aactagctgc attgatactg   1020
ataaaaaaat atcatgtgct ttctggactg atgatgcagt atactttga cattgccttt    1080
atttatttt tcagaaaagc tttcttagtt ctgggttctt cattatttgt ttcccatctc    1140
cattgtgaat tgaatcattt gcttcgtgtc acaaatacaa tttagntagg tacatgcatt    1200
ggtcagattc acggtttatt atgtcatgac ttaagttcat ggtagtacat tacctgccac    1260
gcatgcatta tattggttag atttgatagg caaatttggt tgtcaacaat ataaatataa    1320
ataatgtttt tatattacga ataacagtg atcaaaacaa acagttttat ctttattaac    1380
aagattttgt ttttgtttga tgacgttttt taatgtttac gctttccccc ttcttttgaa    1440
tttagaacac tttatcatca taaaatcaaa tactaaaaaa attacatatt tcataaataa   1500
taacacaaat atttttaaaa aatctgaaat aataatgaac aatattacat attatcacga    1560
aaattcatta ataaaaatat tatataaata aaatgtaata gtagttatat gtaggaaaaa    1620
agtactgcac gcataatata tacaaaaaga ttaaaatgaa ctattataaa taataacact   1680
aaattaatgg tgaatcatat caaaataatg aaaaagtaaa taaaatttgt aattaacttc    1740
tatatgtatt acacacacaa ataataaata atagtaaaaa aaattatgat aaatatttac    1800
catctcataa gatattttaaa ataatgataa aaatatagat tatttttat gcaactagct   1860
agccaaaaag agaacacggg tatatataaa aagagtacct ttaaattcta ctgtacttcc    1920
tttattcctg acgtttttat atcaagtgga catacgtgaa gatttttaatt atcagtctaa   1980
atatttcatt agcacttaat acttttctgt tttattccta tcctataagt agtcccgatt    2040
ctcccaacat tgcttattca cacaactaac taagaaagtc ttccatagcc ccccaagcgg    2100
ccggagctgg tcatctcgct catcgtcgag tcggcggccg gagctggtca tctcgctcat   2160
cgtcgagtcg gcggccgccg actcgacgat gagcgagatg accagctccg gccgccgact   2220
cgacgatgag cgagatgacc agctccggcc gcgacacaag tgtgagagta ctaaataaat   2280
gctttggttg tacgaaatca ttacactaaa taaaataatc aaagcttata tatgccttcc   2340
```

```
gctaaggccg aatgcaaaga aattggttct ttctcgttat cttttgccac ttttactagt    2400
acgtattaat tactacttaa tcatctttgt ttacggctca ttatatccgt cgacggcgcg    2460
```

<210> SEQ ID NO 13
<211> LENGTH: 8966
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (1177)..(1177)
<223> OTHER INFORMATION: n is a, c, g, or t

<400> SEQUENCE: 13

```
gatcctcgaa gagaagggtt aataacacat tttttaacat ttttaacaca aattttagtt      60
atttaaaaat ttattaaaaa atttaaaata agaagaggaa ctctttaaat aaatctaact     120
tacaaaattt atgatttta ataagttttc accaataaaa aatgtcataa aaatatgtta     180
aaaagtatat tatcaatatt ctctttatga taaataaaaa gaaaaaaaaa ataaaagtta     240
agtgaaaatg agattgaagt gactttaggt gtgtataaat atatcaaccc cgccaacaat     300
ttatttaatc caaatatatt gaagtatatt attccatagc cttatttat ttatatattt     360 attatataaa agcttatttt gttctaggtt gttcatgaaa tatttttttg gttttatctc     420
cgttgtaaga aaatcatgtg ctttgtgtcg ccactcacta ttgcagcttt ttcatgcatt     480
ggtcagattg acggttgatt gtattttgt tttttatggt tttgtgttat gacttaagtc     540
ttcatctctt tatctcttca tcaggtttga tggttaccta atatggtcca tgggtacatg     600
catggttaaa ttaggtggcc aactttgttg tgaacgatag aatttttttt atattaagta     660
aactattttt atattatgaa ataataataa aaaaaatatt ttatcattat taacaaaatc     720
atattagtta atttgttaac tctataataa aagaaatact gtaacattca cattacatgg     780
taacatcttt ccaccctttc atttgttttt tgtttgatga cttttttttct tgtttaaatt     840 tattcccctt cttttaaatt tggaatacat tatcatcata tataaactaa aatactaaaa     900
acaggattac acaaatgata aataataaca caaatatttta taaatctagc tgcaatatat     960
ttaaactagc tatatcgata ttgtaaaata aaactagctg cattgatact gataaaaaaa    1020
tatcatgtgc tttctggact gatgatgcag tatacttttg acattgcctt tattttattt    1080
ttcagaaaag ctttcttagt tctgggttct tcattatttg tttcccatct ccattgtgaa    1140
ttgaatcatt tgcttcgtgt cacaaataca atttagntag gtacatgcat tggtcagatt    1200
cacggtttat tatgtcatga cttaagttca tggtagtaca ttacctgcca cgcatgcatt    1260
atattggtta gatttgatag gcaaatttgg ttgtcaacaa tataaatata aataatgttt    1320
ttatattacg aaataacagt gatcaaaaca aacagttta tctttattaa caagattttg    1380
tttttgtttg atgacgtttt ttaatgttta cgctttcccc cttcttttga atttagaaca    1440
ctttatcatc ataaaatcaa atactaaaaa aattacatat ttcataaata ataacacaaa    1500
tatttttaaa aaatctgaaa taataatgaa caatattaca tattatcacg aaaattcatt    1560
aataaaaata ttatataaat aaaatgtaat agtagttata tgtaggaaaa aagtactgca    1620
cgcataatat atacaaaaag attaaaatga actattataa ataataacac taaattaatg    1680
gtgaatcata tcaaaataat gaaaaagtaa ataaaatttg taattaactt ctatatgtat    1740
tacacacaca aataataaat aatagtaaaa aaaattatga taaatattta ccatctcata    1800
agatatttaa aataatgata aaaatataga ttattttta tgcaactagc tagccaaaaa    1860
```

```
gagaacacgg gtatatataa aaagagtacc tttaaattct actgtacttc ctttattcct   1920
gacgttttta tatcaagtgg acatacgtga agattttaat tatcagtcta aatatttcat   1980
tagcacttaa tacttttctg ttttattcct atcctataag tagtcccgat tctcccaaca   2040
ttgcttattc acacaactaa ctaagaaagt cttccatagc cccccaagcg gccggagctg   2100
gtcatctcgc tcatcgtcga gtcggcggcc ggagctggtc atctcgctca tcgtcgagtc   2160
ggcggccgcc gactcgacga tgagcgagat gaccagctcc ggccgccgac tcgacgatga   2220
gcgagatgac cagctccggc cgcgacacaa gtgtgagagt actaaataaa tgctttggtt   2280
gtacgaaatc attacactaa ataaaataat caaagcttat atatgccttc cgctaaggcc   2340
gaatgcaaag aaattggttc tttctcgtta tcttttgcca cttttactag tacgtattaa   2400
ttactactta atcatctttg tttacggctc attatatccg tcgacggcgc gcccgatcat   2460
ccggatatag ttcctccttt cagcaaaaaa cccctcaaga cccgtttaga ggccccaagg   2520
ggttatgcta gttattgctc agcggtggca gcagccaact cagcttccct tcgggctttg   2580
ttagcagccg gatcgatcca agctgtacct cactattcct ttgccctcgg acgagtgctg   2640
gggcgtcggt ttccactatc ggcgagtact tctacacagc catcggtcca gacggccgcg   2700
cttctgcggg cgatttgtgt acgcccgaca gtcccggctc cggatcggac gattgcgtcg   2760
catcgaccct gcgcccaagc tgcatcatcg aaattgccgt caaccaagct ctgatagagt   2820
tggtcaagac caatgcggag catatacgcc cggagccgcg gcgatcctgc aagctccgga   2880
tgcctccgct cgaagtagcg cgtctgctgc tccatacaag ccaaccacgg cctccagaag   2940
aagatgttgg cgacctcgta ttgggaatcc ccgaacatcg cctcgctcca gtcaatgacc   3000
gctgttatgc ggccattgtc cgtcaggaca ttgttggagc cgaaatccgc gtgcacgagg   3060
tgccggactt cggggcagtc ctcggcccaa agcatcagct catcgagagc ctgcgcgacg   3120
gacgcactga cggtgtcgtc catcacagtt tgccagtgat acacatgggg atcagcaatc   3180
gcgcatatga aatcacgcca tgtagtgtat tgaccgattc cttgcggtcc gaatgggccg   3240
aacccgctcg tctggctaag atcggccgca gcgatcgcat ccatagcctc cgcgaccggc   3300
tgcagaacag cgggcagttc ggtttcaggc aggtcttgca acgtgacacc ctgtgcacgg   3360
cgggagatgc aataggtcag gctctcgctg aattccccaa tgtcaagcac ttccggaatc   3420
gggagcgcgg ccgatgcaaa gtgccgataa acataacgat cttttgtagaa accatcggcg   3480
cagctattta cccgcaggac atatccacgc cctcctacat cgaagctgaa agcacgagat   3540
tcttcgccct ccgagagctg catcaggtcg gagacgctgt cgaacttttc gatcagaaac   3600
ttctcgacag acgtcgcggt gagttcaggc ttttccatgg gtatatctcc ttcttaaagt   3660
taaacaaaat tatttctaga gggaaaccgt tgtggtctcc ctatagtgag tcgtattaat   3720
ttcgcgggat cgagatctga tcaacctgca ttaatgaatc ggccaacgcg cggggagagg   3780
cggtttgcgt attgggcgct cttccgcttc ctcgctcact gactcgctgc gctcggtcgt   3840
tcggctgcgg cgagcggtat cagctcactc aaaggcggta atacggttat ccacagaatc   3900
aggggataac gcaggaaaga acatgtgagc aaaaggccag caaaaggcca ggaaccgtaa   3960
aaaggccgcg ttgctggcgt ttttccatag gctccgcccc cctgacgagc atcacaaaaa   4020
tcgacgctca agtcagaggt ggcgaaaccc gacaggacta taaagatacc aggcgtttcc   4080
ccctggaagc tccctcgtgc gctctcctgt tccgaccctg ccgcttaccg gatacctgtc   4140
cgcctttctc ccttcgggaa gcgtggcgct ttctcaatgc tcacgctgta ggtatctcag   4200
ttcggtgtag gtcgttcgct ccaagctggg ctgtgtgcac gaaccccccg ttcagcccga   4260
```

```
ccgctgcgcc ttatccggta actatcgtct tgagtccaac ccggtaagac acgacttatc    4320
gccactggca gcagccactg gtaacaggat tagcagagcg aggtatgtag gcggtgctac    4380
agagttcttg aagtggtggc ctaactacgg ctacactaga aggacagtat ttggtatctg    4440
cgctctgctg aagccagtta ccttcggaaa aagagttggt agctcttgat ccggcaaaca    4500
aaccaccgct ggtagcggtg gttttttgt ttgcaagcag cagattacgc gcagaaaaaa    4560
aggatctcaa gaagatcctt tgatcttttc tacggggtct gacgctcagt ggaacgaaaa    4620
ctcacgttaa gggattttgg tcatgacatt aacctataaa aataggcgta tcacgaggcc    4680
ctttcgtctc gcgcgtttcg gtgatgacgg tgaaaacctc tgacacatgc agctcccgga    4740
gacggtcaca gcttgtctgt aagcggatgc cgggagcaga caagcccgtc agggcgcgtc    4800
agcgggtgtt ggcgggtgtc ggggctggct taactatgcg gcatcagagc agattgtact    4860
gagagtgcac catatggaca tattgtcgtt agaacgcggc tacaattaat acataacctt    4920
atgtatcata cacatacgat ttaggtgaca ctatagaacg gcgcgccaag cttggatccg    4980
cgccaagctt ggatcctaga actagaaacg tgatgccact tgttattgaa gtcgattaca    5040
gcatctattc tgttttacta tttataactt tgccatttct gacttttgaa aactatctct    5100
ggatttcggt atcgctttgt gaagatcgag caaaagagag gttttgtgga cgcaatggtc    5160
caaatccgtt ctacatgaac aaattggtca caatttccac taaaagtaaa taaatggcaa    5220
gttaaaaaag gaatatgcat tttactgatt gcctaggtga gctccaagag aagttgaatc    5280
tacacgtcta ccaaccgcta aaaaagaaa aacattgata tgtaacctga ttccattagc    5340
ttttgacttc ttcaacagat tctctactta gatttctaac agaaatatta ttactagcac    5400
atcattttca gtctcactac agcaaaaaat ccaacggcac aatacagaca acaggagata    5460
tcagactaca gagatagata gatgctactg catgtagtaa gttaaataaa aggaaaataa    5520
aatgtcttgc taccaaaact actacagact atgatgctca ccacaggcca aatcctgcaa    5580
ctaggacagc attatcttat atatattgta caaaacaagc atcaaggaac atttggtcta    5640
ggcaatcagt acctcgttct accatcaccc tcagttatca catccttgaa ggatccatta    5700
ctgggaatca tcggcaacac atgctcctga tggggcacaa tgacatcaag aaggtagggg    5760
ccaggggtgt ccaacattct ctgaattgcc gctctaagct cttccttctt cgtcactcgc    5820
gctgccggta tcccacaagc atcagcaaac ttgagcatgt ttgggaatat ctcgctctcg    5880
ctagacggat ctccaagata ggtgtgagct ctattggact tgtagaacct atcctccaac    5940
tgaaccacca tacccaaatg ctgattgttc aacaacaata tcttaactgg agattctcc     6000 actcttatag tggccaactc ctgaacattc atgatgaaac taccatcccc atcaatgtca    6060
accacaacag ccccagggtt agcaacagca gcaccaatag ccgcaggcaa tccaaaaccc    6120
atggctccaa gaccccctga ggtcaaccac tgcctcggtc tcttgtactt gtaaaactgc    6180
gcagcccaca tttgatgctg cccaacccca gtactaacaa tagcatctcc attagtcaac    6240
tcatcaagaa cctcgatagc atgctgcgga gaaatcgcgt cctggaatgt cttgtaaccc    6300
aatggaaact tgtgtttctg cacattaatc tcttctctcc aacctccaag atcaaactta    6360
ccctccactc ctttctcctc caaaatcata ttaattccct tcaaggccaa cttcaaatcc    6420
gcgcaaaccg acacgtgcgc ctgcttgttc ttcccaatct cggcagaatc aatatcaatg    6480
tgaacaatct tagccctact agcaaaagcc tcaagcttcc cagtaacacg gtcatcaaac    6540
cttaccccaa aggcaagcaa caaatcacta ttgtcaacag catagttagc ataaacagta    6600
ccatgcatac ccagcatctg aagggaatat tcatcaccaa taggaaaagt tccaagaccc    6660
```

```
attaaagtgc tagcaacggg aataccagtg agttcaacaa agcgcctcaa ttcagcactg    6720
gaattcaaac tgccaccgcc gacgtagaga acgggctttt gggcctccat gatgagtctg    6780
acaatgtgtt ccaattgggc ctcggcgggg ggcctgggca gcctggcgag gtaaccgggg    6840
aggttaacgg gctcgtccca attaggcacg gcgagttgct gctgaacgtc tttgggaatg    6900
tcgatgagga ccggaccggg gcggccggag gtggcgacga agaaagcctc ggcgacgacg    6960
cgggggatgt cgtcgacgtc gaggatgagg tagttgtgct tcgtgatgga tctgctcacc    7020
tccacgatcg gggtttcttg gaaggcgtcg gtgccgatca tccggcgggc gacctggccg    7080
gtgatggcga cgactgggac gctgtccatt aaagcgtcgg cgaggccgct cacgaggttg    7140
gtggcgccgg ggccggaggt ggcaatgcag acgccgggga ggccggagga acgcgcgtag    7200
ccttcggcgg cgaagacgcc gccctgctcg tggcgcggga gcacgttgcg gatggcggcg    7260
gagcgcgtga gcgcctggtg gatctccatc gacgcaccgc cggggtacgc gaacaccgtc    7320
gtcacgccct gcctctccag cgcctccaca aggatgtccg cgcccttgcg aggttcgccg    7380
gaggcgaacc gtgacacgaa gggctccgtg gtcggcgctt ccttggtgaa gggcgccgcc    7440
gtgggggggtt tggagatgga acatttgatt ttgagagcgt ggttgggttt ggtgagggtt    7500
tgatgagaga gaggagggt ggatctagta atgcgtttgg ggaaggtggg gtgtgaagag    7560
gaagaagaga atcgggtggt tctggaagcg gtggccgcca ttgtgttgtg tggcatggtt    7620
atacttcaaa aactgcacaa caagcctaga gttagtacct aaacagtaaa tttacaacag    7680
agagcaaaga cacatgcaaa aatttcagcc ataaaaaaag ttataataga atttaaagca    7740
aaagtttcat tttttaaaca tatatacaaa caaactggat ttgaaggaag ggattaattc    7800
ccctgctcaa agtttgaatt cctattgtga cctatactcg aataaaattg aagcctaagg    7860
aatgtatgag aaacaagaaa acaaaacaaa actacagaca aacaagtaca attacaaaat    7920
tcgctaaaat tctgtaatca ccaaacccca tctcagtcag cacaaggccc aaggtttatt    7980
ttgaaataaa aaaaagtga ttttatttct cataagctaa agaaagaaa ggcaattatg    8040
aaatgatttc gactagatct gaaagtccaa cgcgtattcc gcagatatta aagaaagagt    8100
agagtttcac atggatccta gatggaccca gttgaggaaa aagcaaggca aagcaaacca    8160
gaagtgcaag atccgaaatt gaaccacgga atctaggatt tggtagaggg agaagaaaag    8220
taccttgaga ggtagaagag aagagaagag cagagagata tatgaacgag tgtgtcttgg    8280
tctcaactct gaagcgatac gagtttagag gggagcattg agttccaatt tatagggaaa    8340
ccgggtggca ggggtgagtt aatgacggaa aagcccctaa gtaacgagat tggattgtgg    8400
gttagattca accgtttgca tccgcggctt agattgggga agtcagagtg aatctcaacc    8460
gttgactgag ttgaaaattg aatgtagcaa ccaattgagc caaccccagc ctttgccctt    8520
tgattttgat ttgttgttg catacttttt atttgtcttc tggttctgac tctctttctc    8580
tcgtttcaat gccaggttgc ctactcccac accactcaca agaagattct actgttagta    8640
ttaaatattt tttaatgtat taaatgatga atgctttttgt aaacagaaca agactatgtc    8700
taataagtgt cttgcaacat tttttaagaa attaaaaaaa atatatttat tatcaaaatc    8760
aaatgtatga aaaatcatga ataatataat tttatacatt tttttaaaaa atcttttaat    8820
ttcttaatta atatcttaaa aataatgatt aatatttaac ccaaaataat tagtatgatt    8880
ggtaaggaag atatccatgt tatgtttgga tgtgagtttg atctagagca aagcttacta    8940
gagtcgaccg atccgtcgac ggcgcg                                         8966
```

```
<210> SEQ ID NO 14
<211> LENGTH: 6611
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (4436)..(4436)
<223> OTHER INFORMATION: n is a, c, g, or t

<400> SEQUENCE: 14
cgcgcctatg cgggaccatc gcagcggacg agaagcggca cgagaacgcg tactcaagaa      60
tcgtggagaa gcttctggaa gtggacccca ccggggcaat ggtggccata gggaacatga     120
tggagaagaa gatcacgatg ccggcgcacc ttatgtacga tggggatgac cccaggctat     180
tcgagcacta ctccgctgtg gcgcagcgca taggcgtgta caccgccaac gactacgcag     240
acatcttgga tttctcgttg acggtgaaga ttggagaagc ttgaaggatt gatgcctgag     300
gggaagcggg ccccaggatt tccgtgtgtg ggttgccccc gaggattagg aggttccaag     360
aacgcgctga tgagcgagcg cgtaagatga agaagcatca tgccgttaag ttcagttgga     420
ttttcaataa agaattgctt ttgtgagcgg ccgccgactc gacgatgagc gagatgacca     480
gctccggccg ccgactcgac gatgagcgag atgaccagct ccggccgcga cacaagtgtg     540
agagtactaa ataaatgctt tggttgtacg aaatcattac actaaataaa ataatcaaag     600
cttatatatg ccttccgcta aggccgaatg caaagaaatt ggttctttct cgttatcttt     660
tgccactttt actagtacgt attaattact acttaatcat ctttgtttac ggctcattat     720
atccgtcgac ggcgcgcccg atcatccgga tatagttcct cctttcagca aaaaacccct     780
caagacccgt ttagaggccc caaggggtta tgctagttat tgctcagcgg tggcagcagc     840
caactcagct tcctttcggg ctttgttagc agccggatcg atccaagctg tacctcacta     900
ttcctttgcc ctcggacgag tgctgggcgc tcggtttcca ctatcggcga gtacttctac     960
acagccatcg gtccagacgg ccgcgcttct gcgggcgatt tgtgtacgcc cgacagtccc    1020
ggctccggat cggacgattg cgtcgcatcg accctgcgcc caagctgcat catcgaaatt    1080
gccgtcaacc aagctctgat agagttggtc aagaccaatg cggagcatat acgcccggag    1140
ccgcggcgat cctgcaagct ccggatgcct ccgctcgaag tagcgcgtct gctgctccat    1200
acaagccaac cacggcctcc agaagaagat gttggcgacc tcgtattggg aatccccgaa    1260
catcgcctcg ctccagtcaa tgaccgctgt tatgcggcca ttgtccgtca ggacattgtt    1320
ggagccgaaa tccgcgtgca cgaggtgccg gacttcgggg cagtcctcgg cccaaagcat    1380
cagctcatcg agagcctgcg cgacggacgc actgacggtg tcgtccatca cagtttgcca    1440
gtgatacaca tggggatcag caatcgcgca tatgaaatca cgccatgtag tgtattgacc    1500
gattccttgc ggtccgaatg ggccgaaccc gctcgtctgg ctaagatcgg ccgcagcgat    1560
cgcatccata gcctccgcga ccggctgcag aacagcgggc agttcggttt caggcaggtc    1620
ttgcaacgtg acaccctgtg cacggcggga gatgcaatag gtcaggctct cgctgaattc    1680
cccaatgtca agcacttccg gaatcggag cgcggccgat gcaaagtgcc gataaacata    1740
acgatctttg tagaaaccat cggcgcagct atttacccgc aggacatatc cacgccctcc    1800
tacatcgaag ctgaaagcac gagattcttc gccctccgag agctgcatca ggtcggagac    1860
gctgtcgaac ttttcgatca gaaacttctc gacagacgtc gcggtgagtt caggcttttc    1920
catgggtata tctccttctt aaagttaaac aaaattattt ctagagggaa accgttgtgg    1980
```

```
tctccctata gtgagtcgta ttaatttcgc gggatcgaga tctgatcaac ctgcattaat    2040
gaatcggcca acgcgcgggg agaggcggtt tgcgtattgg gcgctcttcc gcttcctcgc    2100
tcactgactc gctgcgctcg gtcgttcggc tgcggcgagc ggtatcagct cactcaaagg    2160
cggtaatacg gttatccaca gaatcagggg ataacgcagg aaagaacatg tgagcaaaag    2220
gccagcaaaa ggccaggaac cgtaaaaagg ccgcgttgct ggcgtttttc cataggctcc    2280
gcccccctga cgagcatcac aaaaatcgac gctcaagtca gaggtggcga aacccgacag    2340
gactataaag ataccaggcg tttccccctg gaagctccct cgtgcgctct cctgttccga    2400
ccctgccgct taccggatac ctgtccgcct ttctcccttc gggaagcgtg gcgctttctc    2460
aatgctcacg ctgtaggtat ctcagttcgg tgtaggtcgt tcgctccaag ctgggctgtg    2520
tgcacgaacc ccccgttcag cccgaccgct gcgccttatc cggtaactat cgtcttgagt    2580
ccaacccggt aagacacgac ttatcgccac tggcagcagc cactggtaac aggattagca    2640
gagcgaggta tgtaggcggt gctacagagt tcttgaagtg gtggcctaac tacggctaca    2700
ctagaaggac agtatttggt atctgcgctc tgctgaagcc agttaccttc ggaaaaagag    2760
ttggtagctc ttgatccggc aaacaaacca ccgctggtag cggtggtttt tttgtttgca    2820
agcagcagat tacgcgcaga aaaaaaggat ctcaagaaga tcctttgatc ttttctacgg    2880
ggtctgacgc tcagtggaac gaaaactcac gttaagggat tttggtcatg acattaacct    2940
ataaaaatag gcgtatcacg aggcccttc gtctcgcgcg tttcggtgat gacggtgaaa    3000
acctctgaca catgcagctc ccggagacgg tcacagcttg tctgtaagcg gatgccggga    3060
gcagacaagc ccgtcagggc gcgtcagcgg gtgttggcgg gtgtcggggc tggcttaact    3120
atgcggcatc agagcagatt gtactgagag tgcaccatat ggacatattg tcgttagaac    3180
gcggctacaa ttaatacata accttatgta tcatacacat acgatttagg tgacactata    3240
gaacggcgcg ccaagcttgg atcctcgaag agaagggtta ataacacatt ttttaacatt    3300
tttaacacaa attttagtta tttaaaaatt tattaaaaaa tttaaaataa gaagaggaac    3360
tcttaaaata aatctaactt acaaaattta tgatttttaa taagttttca ccaataaaaa    3420
atgtcataaa aatatgttaa aaagtatatt atcaatattc tctttatgat aaataaaaag    3480
aaaaaaaaaa taaagttaa gtgaaaatga gattgaagtg actttaggtg tgtataaata    3540
tatcaacccc gccaacaatt tatttaatcc aaatatattg aagtatatta ttccatagcc    3600
tttatttatt tatatattta ttatataaaa gctttatttg ttctaggttg ttcatgaaat    3660
atttttttgg ttttatctcc gttgtaagaa aatcatgtgc tttgtgtcgc cactcactat    3720
tgcagctttt tcatgcattg gtcagattga cggttgattg tattttttgtt ttttatggtt    3780
ttgtgttatg acttaagtct tcatctcttt atctcttcat caggtttgat ggttacctaa    3840
tatggtccat gggtacatgc atggttaaat taggtggcca actttgttgt gaacgataga    3900
atttttttta tattaagtaa actatttta tattatgaaa taataataaa aaaaatattt    3960
tatcattatt aacaaaatca tattagttaa tttgttaact ctataataaa agaaatactg    4020
taacattcac attacatggt aacatctttc cacccttca tttgtttttt gtttgatgac    4080
ttttttcctt gtttaaattt attccccttc ttttaaattt ggaatacatt atcatcatat    4140
ataaactaaa atactaaaaa caggattaca caaatgataa ataataacac aaatatttat    4200
aaatctagct gcaatatatt taaactagct atatcgatat tgtaaaataa aactagctgc    4260
attgatactg ataaaaaaat atcatgtgct ttctggactg atgatgcagt atacttttga    4320
```

```
cattgccttt attttattttt tcagaaaagc tttcttagtt ctgggttctt cattatttgt    4380
ttcccatctc cattgtgaat tgaatcattt gcttcgtgtc acaaatacaa tttagntagg    4440
tacatgcatt ggtcagattc acggtttatt atgtcatgac ttaagttcat ggtagtacat    4500
tacctgccac gcatgcatta tattggttag atttgatagg caaatttggt tgtcaacaat    4560
ataaatataa ataatgtttt tatattacga ataacagtg atcaaaacaa acagttttat     4620
ctttattaac aagattttgt ttttgtttga tgacgttttt taatgtttac gctttccccc    4680
ttcttttgaa tttagaacac tttatcatca taaaatcaaa tactaaaaaa attacatatt    4740
tcataaataa taacacaaat attttttaaaa aatctgaaat aataatgaac aatattacat    4800
attatcacga aaattcatta ataaaaatat tatataaata aaatgtaata gtagttatat    4860
gtaggaaaaa agtactgcac gcataatata tacaaaaaga ttaaaatgaa ctattataaa    4920
taataacact aaattaatgg tgaatcatat caaaataatg aaaaagtaaa taaaatttgt    4980
aattaacttc tatatgtatt acacacacaa ataataaata atagtaaaaa aaattatgat    5040
aaatatttac catctcataa gatatttaaa ataatgataa aaatatagat tatttttat     5100 gcaactagct agccaaaaag agaacacggg tatatataaa aagagtacct ttaaattcta    5160
ctgtacttcc tttattcctg acgttttat atcaagtgga catacgtgaa gatttaatt      5220 atcagtctaa atatttcatt agcacttaat acttttctgt tttattccta tcctataagt    5280
agtcccgatt ctcccaacat tgcttattca cacaactaac taagaaagtc ttccatagcc    5340
ccccaagcgg ccggagctgg tcatctcgct catcgtcgag tcggcggccg gagctggtca    5400
tctcgctcat cgtcgagtcg gcggccgctg agtgattgct cacgagtgtg gtcaccatgc    5460
cttcagcaag taccaatggg ttgatgatgt tgtgggtttg acccttcact caacactttt    5520
agtcccttat ttctcatgga aaataagcca tcgccgccat cactccaaca caggttccct    5580
tgaccgtgat gaagtgtttg tcccaaaacc aaaatccaaa gttgcatggt tttccaagta    5640
cttaaacaac cctctaggaa gggctgtttc tcttctcgtc acactcacaa tagggtggcc    5700
tatgtattta gccttcaatg tctctggtag accctatgat agttttgcaa gccactacca    5760
cccttatgct cccatatatt ctaaccgtga gaggcttctg atctatgtct ctgatgttgc    5820
tttgttttct gtgacttact ctctctaccg tgttgcaacc ctgaaagggt tggtttggct    5880
gctatgtgtt tatggggtgc cttttgctcat tgtgaacggt tttcttgtga ctatcacata    5940
tttgcagcac acacactttg ccttgcctca ttacgattca tcagaatggg actggctgaa    6000
gggagctttg gcaactatgg acagagatta agcggccgca tgcctccaga aaagaaagaa    6060
attttcaagt ccttggaggg atgggcctcg gagtgggtcc taccgctgct gaagcccgtg    6120
gagcaatgct ggcagccaca aaacttcctc cctgaccct ccctccgca tgaagagttc     6180 agccatcagg tgaaggagct tcgcgaacgc actaaagagt tacctgatga gtactttgtg    6240
gtgctggtgg gtgatatggt caccgaggac gcgcttccca ttaccagac catgatcaac     6300 aaccttgatg gagtgaaaga tgacagcggc acgagcccga gcccgtgggc cgtgtggacc    6360
cgggcctgga ccgccgagga aaacagacac ggggatctgc tcagaactta tttgtatctc    6420
tctgggaggg ttgacatggc taaggtcgaa aagaccgtac attacctcat ttcagctggc    6480
atggaccctg ggcagacgag caacccatat ttggggtttg tgtacacgtc attccaagag    6540
cgagcaacat ttgtggcgca cgggaacacg gctcggctcg cgaaggaggg cggggatcca    6600
gtgctggcgc g                                                         6611
```

```
<210> SEQ ID NO 15
<211> LENGTH: 4097
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (1190)..(1190)
<223> OTHER INFORMATION: n is a, c, g, or t

<400> SEQUENCE: 15
cgcgccaagc ttggatcctc gaagagaagg gttaataaca cattttttaa cattttttaac    60 acaaattttta gttatttaaa aatttattaa aaaatttaaa ataagaagag gaactctttta   120 aataaatcta acttacaaaa tttatgattt taataagtt ttcaccaata aaaaatgtca      180
taaaaatatg ttaaaaagta tattatcaat attctcttta tgataaataa aaagaaaaaa    240
aaaataaaag ttaagtgaaa atgagattga agtgacttta ggtgtgtata aatatatcaa    300
ccccgccaac aatttattta atccaaatat attgaagtat attattccat agcctttatt    360
tatttatata tttattatat aaaagcttta tttgttctag gttgttcatg aaatattttt    420
ttggttttat ctccgttgta agaaaatcat gtgctttgtg tcgccactca ctattgcagc    480
tttttcatgc attggtcaga ttgacggttg attgtatttt tgttttttat ggttttgtgt    540
tatgacttaa gtcttcatct ctttatctct tcatcaggtt tgatggttac ctaatatggt    600
ccatgggtac atgcatggtt aaattaggtg gccaactttg ttgtgaacga tagaattttt    660
tttatattaa gtaaactatt tttatattat gaaataataa taaaaaaaat attttatcat    720
tattaacaaa atcatattag ttaatttgtt aactctataa taaaagaaat actgtaacat    780
tcacattaca tggtaacatc tttccaccct ttcattgtt ttttgtttga tgactttttt     840
tcttgtttaa atttattcc cttcttttaa atttggaata cattatcatc atatataaac    900
taaaatacta aaaacaggat tacacaaatg ataaataata acacaaatat ttataaatct    960
agctgcaata tatttaaact agctatatcg atattgtaaa ataaaactag ctgcattgat   1020
actgataaaa aaatatcatg tgctttctgg actgatgatg cagtatactt ttgacattgc   1080
ctttatttta tttttcagaa aagctttctt agttctgggt tcttcattat ttgtttccca   1140
tctccattgt gaattgaatc atttgcttcg tgtcacaaat acaatttagn taggtacatg   1200
cattggtcag attcacggtt tattatgtca tgacttaagt tcatggtagt acattacctg   1260
ccacgcatgc attatattgg ttagatttga taggcaaatt tggttgtcaa caatataaat   1320
ataaataatg tttttatatt acgaaataac agtgatcaaa acaaacagtt ttatctttat   1380
taacaagatt ttgttttttgt ttgatgacgt tttttaatgt ttacgctttc cccttcttt   1440 tgaatttaga acactttatc atcataaaat caaatactaa aaaaattaca tatttcataa   1500
ataataacac aaatattttt aaaaaatctg aaataataat gaacaatatt acatattatc   1560
acgaaaattc attaataaaa atattatata aataaaatgt aatagtagtt atatgtagga   1620
aaaaagtact gcacgcataa tatatacaaa aagattaaaa tgaactatta taaataataa   1680
cactaaatta atggtgaatc atatcaaaat aatgaaaaag taaataaaat ttgtaattaa   1740
cttctatatg tattacacac acaaataata aataatagta aaaaaaatta tgataaatat   1800
ttaccatctc ataagatatt taaaataatg ataaaaatat agattatttt ttatgcaact   1860
agctagccaa aaagagaaca cgggtatata taaaaagagt acctttaaat tctactgtac   1920
ttcctttatt cctgacgttt ttatatcaag tggacatacg tgaagatttt aattatcagt   1980
```

| | |
|---|---|
| ctaaatattt cattagcact taatactttt ctgttttatt cctatcctat aagtagtccc | 2040 |
| gattctccca acattgctta ttcacacaac taactaagaa agtcttccat agccccccaa | 2100 |
| gcggccggag ctggtcatct cgctcatcgt cgagtcggcg gccggagctg gtcatctcgc | 2160 |
| tcatcgtcga gtcggcggcc gctgagtgat tgctcacgag tgtggtcacc atgccttcag | 2220 |
| caagtaccaa tgggttgatg atgttgtggg tttgacccctt cactcaacac ttttagtccc | 2280 |
| ttatttctca tggaaaataa gccatcgccg ccatcactcc aacacaggtt cccttgaccg | 2340 |
| tgatgaagtg tttgtcccaa accaaaatc caaagttgca tggttttcca agtacttaaa | 2400 |
| caaccctcta ggaagggctg tttctcttct cgtcacactc acaatagggt ggcctatgta | 2460 |
| tttagccttc aatgtctctg gtagacccta tgatagtttt gcaagccact accaccctta | 2520 |
| tgctcccata tattctaacc gtgagaggct tctgatctat gtctctgatg ttgctttgtt | 2580 |
| ttctgtgact tactctctct accgtgttgc aaccctgaaa gggttggttt ggctgctatg | 2640 |
| tgtttatggg gtgcctttgc tcattgtgaa cggttttctt gtgactatca catatttgca | 2700 |
| gcacacacac tttgccttgc tcattacga ttcatcagaa tgggactggc tgaagggagc | 2760 |
| tttggcaact atggacagag attaagcggc cgcatgcctc cagaaaagaa agaaattttc | 2820 |
| aagtccttgg agggatgggc ctcggagtgg gtcctaccgc tgctgaagcc cgtggagcaa | 2880 |
| tgctggcagc cacaaaactt cctccctgac ccctcccttc cgcatgaaga gttcagccat | 2940 |
| caggtgaagg agcttcgcga acgcactaaa gagttacctg atgagtactt tgtggtgctg | 3000 |
| gtgggtgata tggtcaccga ggacgcgctt cccacttacc agaccatgat caacaacctt | 3060 |
| gatggagtga agatgacag cggcacgagc ccgagcccgt gggccgtgtg gacccgggcc | 3120 |
| tggaccgccg aggaaaacag acacggggat ctgctcagaa cttatttgta tctctctggg | 3180 |
| agggttgaca tggctaaggt cgaaaagacc gtacattacc tcatttcagc tggcatggac | 3240 |
| cctgggacag acaacaaccc atatttgggg tttgtgtaca cgtcattcca agagcgagca | 3300 |
| acatttgtgg cgcacgggaa cacggctcgg ctcgcgaagg agggcgggga tccagtgctg | 3360 |
| gcgcgcgcgc ctatgcggga ccatcgcagc ggacgagaag cggcacgaga acgcgtactc | 3420 |
| aagaatcgtg gagaagcttc tggaagtgga ccccaccggg gcaatggtgg ccataggaa | 3480 |
| catgatggag aagaagatca cgatgccggc gcaccttatg tacgatgggg atgaccccag | 3540 |
| gctattcgag cactactccg ctgtggcgca gcgcataggc gtgtacaccg ccaacgacta | 3600 |
| cgcagacatc ttggatttct cgttgacggt gaagattgga gaagcttgaa ggattgatgc | 3660 |
| ctgaggggaa gcgggcccca ggatttccgt gtgtgggttg ccccgagga ttaggaggtt | 3720 |
| ccaagaacgc gctgatgagc gagcgcgtaa gatgaagaag catcatgccg ttaagttcag | 3780 |
| ttggattttc aataaagaat tgcttttgtg agcggccgcc gactcgacga tgagcgagat | 3840 |
| gaccagctcc ggccgccgac tcgacgatga gcagatgac cagctccggc cgcgacacaa | 3900 |
| gtgtgagagt actaaataaa tgctttggtt gtacgaaatc attacactaa ataaataat | 3960 |
| caaagcttat atatgccttc cgctaaggcc gaatgcaaag aaattggttc tttctcgtta | 4020 |
| tcttttgcca cttttactag tacgtattaa ttactactta atcatctttg tttacggctc | 4080 |
| attatatccg tcgacgg | 4097 |

<210> SEQ ID NO 16
<211> LENGTH: 3964
<212> TYPE: DNA
<213> ORGANISM: artificial sequence
<220> FEATURE:
<223> OTHER INFORMATION: recombinant construct

<400> SEQUENCE: 16

```
ggtcgactct agtaagcttt gctctagatc aaactcacat ccaaacataa catggatatc    60
ttccttacca atcatactaa ttattttggg ttaaatatta atcattattt ttaagatatt   120
aattaagaaa ttaaaagatt ttttaaaaaa atgtataaaa ttatattatt catgatttt    180
catacatttg attttgataa taaatatatt ttttttaatt tcttaaaaaa tgttgcaaga   240
cacttattag acatagtctt gttctgttta caaaagcatt catcatttaa tacattaaaa   300
aatatttaat actaacagta gaatcttctt gtgagtggtg tgggagtagg caacctggca   360
ttgaaacgag agaaagagag tcagaaccag aagacaaata aaaagtatgc aacaaacaaa   420
tcaaaatcaa agggcaaagg ctggggttgg ctcaattggt tgctacattc aattttcaac   480
tcagtcaacg gttgagattc actctgactt ccccaatcta agccgcggat gcaaacggtt   540
gaatctaacc cacaatccaa tctcgttact taggggcttt tccgtcatta actcacccct   600
gccacccggt ttccctataa attggaactc aatgctcccc tctaaactcg tatcgcttca   660
gagttgagac caagacacac tcgttcatat atctctctgc tcttctcttc tcttctacct   720
ctcaaggtac ttttcttctc cctctaccaa atcctagatt ccgtggttca atttcggatc   780
ttgcacttct ggtttgcttt gccttgcttt ttcctcaact gggtccatct aggatccatg   840
tgaaactcta ctcttttcttt aatatctgcg gaatacgcgt tggactttca gatctagtcg   900
aaatcatttc ataattgcct ttctttcttt tagcttatga gaaataaaat cacttttttt   960
ttatttcaaa ataaaccttg ggccttgtgc tgactgagat ggggtttggt gattacagaa  1020
ttttagcgaa ttttgtaatt gtacttgttt gtctgtagtt ttgttttgtt ttcttgtttc  1080
tcatacattc cttaggcttc aattttattc gagtataggt cacaatagga attcaaactt  1140
tgagcagggg aattaatccc ttccttcaaa tccagtttgt ttgtatatat gtttaaaaaa  1200
tgaaactttt gctttaaatt ctattataac ttttttttatg gctgaaattt ttgcatgtgt  1260
ctttgctctc tgttgtaaat ttactgttta ggtactaact ctaggcttgt tgtgcagttt  1320
ttgaagtata accatgccac acaacacaat ggcggccacc gcttccagaa ccacccgatt  1380
ctcttcttcc tcttcacacc ccaccttccc caaacgcatt actagatcca cctcccctct  1440
ctctcatcaa accctcacca aacccaacca cgctctcaaa atcaaatgtt ccatctccaa  1500
accccccacg gcggcgccct tcaccaagga agcgccgacc acgagccct tcgtgtcacg   1560
gttcgcctcc ggcgaacctc gcaagggcgc ggacatcctt gtggaggcgc tggagaggca  1620
gggcgtgacg acggtgttcg cgtacccccgg cggtgcgtcg atggagatcc accaggcgct  1680
cacgcgctcc gccgccatcc gcaacgtgct cccgcgccac gagcagggcg gcgtcttcgc  1740
cgccgaaggc tacgcgcgtt cctccggcct ccccggcgtc tgcattgcca cctccggccc  1800
cggcgccacc aacctcgtga gcggcctcgc cgacgcttta atggacagcg tcccagtcgt  1860
cgccatcacc ggccaggtcg cccgccggat gatcggcacc gacgccttcc aagaaacccc  1920
gatcgtggag gtgagcagat ccatcacgaa gcacaactac ctcatcctcg acgtcgacga  1980
catccccgc gtcgtcgccg aggctttctt cgtcgccacc tccggccgcc ccggtccggt   2040
cctcatcgac attcccaaag acgttcagca gcaactcgcc gtgcctaatt gggacgagcc  2100
cgttaacctc cccggttacc tcgccaggct gcccaggccc ccgccgagg cccaattgga   2160
acacattgtc agactcatca tggaggccca aaagcccgtt ctctacgtcg gcggtggcag  2220
tttgaattcc agtgctgaat tgaggcgctt tgttgaactc actggtattc ccgttgctag  2280
cactttaatg ggtcttggaa cttttcctat tggtgatgaa tattccttc agatgctggg   2340
```

| tatgcatggt actgtttatg ctaactatgc tgttgacaat agtgatttgt tgcttgcctt | 2400 |
| tggggtaagg tttgatgacc gtgttactgg gaagcttgag gcttttgcta gtagggctaa | 2460 |
| gattgttcac attgatattg attctgccga gattgggaag aacaagcagg cgcacgtgtc | 2520 |
| ggtttgcgcg gatttgaagt tggccttgaa gggaattaat atgatttttgg aggagaaagg | 2580 |
| agtggagggt aagtttgatc ttggaggttg gagagaagag attaatgtgc agaaacacaa | 2640 |
| gtttccattg ggttacaaga cattccagga cgcgatttct ccgcagcatg ctatcgaggt | 2700 |
| tcttgatgag ttgactaatg gagatgctat tgttagtact ggggttgggc agcatcaaat | 2760 |
| gtgggctgcg cagttttaca agtacaagag accgaggcag tggttgacct caggggggtct | 2820 |
| tggagccatg ggttttggat tgcctgcggc tattggtgct gctgttgcta accctggggc | 2880 |
| tgttgtggtt gacattgatg gggatggtag tttcatcatg aatgttcagg agttggccac | 2940 |
| tataagagtg gagaatctcc cagttaagat attgttgttg aacaatcagc atttgggtat | 3000 |
| ggtggttcag ttggaggata ggttctacaa gtccaataga gctcacacct atcttggaga | 3060 |
| tccgtctagc gagagcgaga tattcccaaa catgctcaag tttgctgatg cttgtgggat | 3120 |
| accggcagcg cgagtgacga agaaggaaga gcttagagcg gcaattcaga gaatgttgga | 3180 |
| caccccctggc ccctaccttc ttgatgtcat tgtgccccat caggagcatg tgttgccgat | 3240 |
| gattcccagt aatggatcct tcaaggatgt gataactgag ggtgatggta gaacgaggta | 3300 |
| ctgattgcct agaccaaatg ttccttgatg cttgttttgt acaatatata taagataatg | 3360 |
| ctgtcctagt tgcaggattt ggcctgtggt gagcatcata gtctgtagta gttttggtag | 3420 |
| caagacattt tattttcctt ttatttaact tactacatgc agtagcatct atctatctct | 3480 |
| gtagtctgat atcctgtt gtctgtattg tgccgttgga ttttttgctg tagtgagact | 3540 |
| gaaaatgatg tgctagtaat aatatttctg ttagaaatct aagtagagaa tctgttgaag | 3600 |
| aagtcaaaag ctaatggaat caggttacat atcaatgttt ttcttttttt agcggttggt | 3660 |
| agacgtgtag attcaacttc tcttggagct cacctaggca atcagtaaaa tgcatattcc | 3720 |
| ttttttaact tgccatttat ttacttttag tggaaattgt gaccaatttg ttcatgtaga | 3780 |
| acggatttgg accattgcgt ccacaaaacg tctcttttgc tcgatcttca caaagcgata | 3840 |
| ccgaaatcca gagatagttt tcaaaagtca gaaatggcaa agttataaat agtaaaacag | 3900 |
| aatagatgct gtaatcgact tcaataacaa gtggcatcac gtttctagtt ctagacccgg | 3960 |
| gtac | 3964 |

```
<210> SEQ ID NO 17
<211> LENGTH: 656
<212> TYPE: PRT
<213> ORGANISM: artificial sequence
<220> FEATURE:
<223> OTHER INFORMATION: synthetic construct

<400> SEQUENCE: 17

Met Pro His Asn Thr Met Ala Ala Thr Ala Ser Arg Thr Thr Arg Phe
1               5                   10                  15

Ser Ser Ser Ser Ser His Pro Thr Phe Pro Lys Arg Ile Thr Arg Ser
            20                  25                  30

Thr Leu Pro Leu Ser His Gln Thr Leu Thr Lys Pro Asn His Ala Leu
        35                  40                  45

Lys Ile Lys Cys Ser Ile Ser Lys Pro Pro Thr Ala Ala Pro Phe Thr
    50                  55                  60
```

Lys Glu Ala Pro Thr Thr Glu Pro Phe Val Ser Arg Phe Ala Ser Gly
65                  70                  75                  80

Glu Pro Arg Lys Gly Ala Asp Ile Leu Val Glu Ala Leu Glu Arg Gln
            85                  90                  95

Gly Val Thr Thr Val Phe Ala Tyr Pro Gly Gly Ala Ser Met Glu Ile
            100                 105                 110

His Gln Ala Leu Thr Arg Ser Ala Ala Ile Arg Asn Val Leu Pro Arg
            115                 120                 125

His Glu Gln Gly Gly Val Phe Ala Ala Glu Gly Tyr Ala Arg Ser Ser
            130                 135                 140

Gly Leu Pro Gly Val Cys Ile Ala Thr Ser Gly Pro Gly Ala Thr Asn
145                 150                 155                 160

Leu Val Ser Gly Leu Ala Asp Ala Leu Met Asp Ser Val Pro Val Val
            165                 170                 175

Ala Ile Thr Gly Gln Val Ala Arg Arg Met Ile Gly Thr Asp Ala Phe
            180                 185                 190

Gln Glu Thr Pro Ile Val Glu Val Ser Arg Ser Ile Thr Lys His Asn
            195                 200                 205

Tyr Leu Ile Leu Asp Val Asp Asp Ile Pro Arg Val Val Ala Glu Ala
            210                 215                 220

Phe Phe Val Ala Thr Ser Gly Arg Pro Gly Pro Val Leu Ile Asp Ile
225                 230                 235                 240

Pro Lys Asp Val Gln Gln Gln Leu Ala Val Pro Asn Trp Asp Glu Pro
            245                 250                 255

Val Asn Leu Pro Gly Tyr Leu Ala Arg Leu Pro Arg Pro Pro Ala Glu
            260                 265                 270

Ala Gln Leu Glu His Ile Val Arg Leu Ile Met Glu Ala Gln Lys Pro
            275                 280                 285

Val Leu Tyr Val Gly Gly Gly Ser Leu Asn Ser Ser Ala Glu Leu Arg
            290                 295                 300

Arg Phe Val Glu Leu Thr Gly Ile Pro Val Ala Ser Thr Leu Met Gly
305                 310                 315                 320

Leu Gly Thr Phe Pro Ile Gly Asp Glu Tyr Ser Leu Gln Met Leu Gly
            325                 330                 335

Met His Gly Thr Val Tyr Ala Asn Tyr Ala Val Asp Asn Ser Asp Leu
            340                 345                 350

Leu Leu Ala Phe Gly Val Arg Phe Asp Asp Arg Val Thr Gly Lys Leu
            355                 360                 365

Glu Ala Phe Ala Ser Arg Ala Lys Ile Val His Ile Asp Ile Asp Ser
            370                 375                 380

Ala Glu Ile Gly Lys Asn Lys Gln Ala His Val Ser Val Cys Ala Asp
385                 390                 395                 400

Leu Lys Leu Ala Leu Lys Gly Ile Asn Met Ile Leu Glu Glu Lys Gly
            405                 410                 415

Val Glu Gly Lys Phe Asp Leu Gly Gly Trp Arg Glu Glu Ile Asn Val
            420                 425                 430

Gln Lys His Lys Phe Pro Leu Gly Tyr Lys Thr Phe Gln Asp Ala Ile
            435                 440                 445

Ser Pro Gln His Ala Ile Glu Val Leu Asp Glu Leu Thr Asn Gly Asp
            450                 455                 460

Ala Ile Val Ser Thr Gly Val Gly Gln His Gln Met Trp Ala Ala Gln
465                 470                 475                 480

```
Phe Tyr Lys Tyr Lys Arg Pro Arg Gln Trp Leu Thr Ser Gly Gly Leu
                485                 490                 495

Gly Ala Met Gly Phe Gly Leu Pro Ala Ala Ile Gly Ala Ala Val Ala
            500                 505                 510

Asn Pro Gly Ala Val Val Asp Ile Asp Gly Asp Gly Ser Phe Ile
            515                 520                 525

Met Asn Val Gln Glu Leu Ala Thr Ile Arg Val Glu Asn Leu Pro Val
    530                 535                 540

Lys Ile Leu Leu Leu Asn Asn Gln His Leu Gly Met Val Val Gln Leu
545                 550                 555                 560

Glu Asp Arg Phe Tyr Lys Ser Asn Arg Ala His Thr Tyr Leu Gly Asp
                565                 570                 575

Pro Ser Ser Glu Ser Glu Ile Phe Pro Asn Met Leu Lys Phe Ala Asp
            580                 585                 590

Ala Cys Gly Ile Pro Ala Ala Arg Val Thr Lys Lys Glu Glu Leu Arg
            595                 600                 605

Ala Ala Ile Gln Arg Met Leu Asp Thr Pro Gly Pro Tyr Leu Leu Asp
    610                 615                 620

Val Ile Val Pro His Gln Glu His Val Leu Pro Met Ile Pro Ser Asn
625                 630                 635                 640

Gly Ser Phe Lys Asp Val Ile Thr Glu Gly Asp Gly Arg Thr Arg Tyr
                645                 650                 655

<210> SEQ ID NO 18
<211> LENGTH: 4
<212> TYPE: PRT
<213> ORGANISM: artificial sequence
<220> FEATURE:
<223> OTHER INFORMATION: synthetic construct

<400> SEQUENCE: 18

Gly Gln Val Pro
1

<210> SEQ ID NO 19
<211> LENGTH: 10
<212> TYPE: PRT
<213> ORGANISM: artificial sequence
<220> FEATURE:
<223> OTHER INFORMATION: ALS subsequence F
<220> FEATURE:
<221> NAME/KEY: misc_feature
<222> LOCATION: (4)..(4)
<223> OTHER INFORMATION: Xaa can be any naturally occurring amino acid

<400> SEQUENCE: 19

Gly Met Val Xaa Gln Trp Glu Asp Arg Phe
1               5                   10

<210> SEQ ID NO 20
<211> LENGTH: 5
<212> TYPE: PRT
<213> ORGANISM: artificial sequence
<220> FEATURE:
<223> OTHER INFORMATION: synthetic construct

<400> SEQUENCE: 20

Met Pro His Asn Thr
1               5
```

```
<210> SEQ ID NO 21
<211> LENGTH: 6547
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (4842)..(4842)
<223> OTHER INFORMATION: n is a, c, g, or t
<220> FEATURE:
<221> NAME/KEY: misc_feature
<222> LOCATION: (5088)..(5088)
<223> OTHER INFORMATION: n is a, c, g, or t

<400> SEQUENCE: 21
gggcgaattg ggttacccgg accggaattc gggatctgag tctagaaatc cgtcaacatg      60
gtggagcacg acactctcgt ctactccaag aatatcaaag atacagtctc agaagaccaa     120
agggctattg agacttttca acaaagggta atatcgggaa acctcctcgg attccattgc     180
ccagctatct gtcacttcat caaaaggaca gtagaaaagg aaggtggcac ctacaaatgc     240
catcattgcg ataaaggaaa ggctatcgtt caagatgcct ctgccgacag tggtcccaaa     300
gatggacccc cacccacgag gagcatcgtg aaaaagaag acgttccaac cacgtcttca     360
aagcaagtgg attgatgtga tgatcctatg cgtatggtat gacgtgtgtt caagatgatg     420
acttcaaacc tacctatgac gtatggtatg aacgtgtgtc gactgatgac ttagatccac     480
tcgagcggct ataaatacgt acctacgcac cctgcgctac catccctaga gctgcagctt     540
atttttacaa caattaccaa caacaacaaa caacaaacaa cattacaatt actatttaca     600
attacagtcg acccgtaccc acacaacaca atggcggcca ccgcttccag aaccacccga     660
ttctcttctt cctcttcaca ccccaccttc cccaaacgca ttactagatc caccctccct     720
ctctctcatc aaaccctcac caaacccaac cacgctctca aaatcaaatg ttccatctcc     780
aaaccccca cggcggcgcc cttcaccaag gaagcgccga ccacggagcc cttcgtgtca     840
cggttcgcct ccggcgaacc tcgcaagggc gcggacatcc ttgtggaggc gctggagagg     900
cagggcgtga cgacggtgtt cgcgtacccc ggcggtgcgt cgatggagat ccaccaggcg     960
ctcacgcgct ccgccgccat ccgcaacgtg ctcccgcgcc acgagcaggg cggcgtcttc    1020
gccgccgaag gctacgcgcg ttcctccggc ctccccggcg tctgcattgc cacctccggc    1080
cccgcgcca ccaacctcgt gagcggcctc gccgacgctt taatgacag cgtcccagtc    1140
gtcgccatca ccggccaggt cgcccgccgg atgatcggca ccgacgcctt ccaagaaacc    1200
ccgatcgtgg aggtgagcag atccatcacg aagcacaact acctcatcct cgacgtcgac    1260
gacatccccc gcgtcgtcgc cgaggctttc ttcgtcgcca cctccggccg ccccggtccg    1320
gtcctcatcg acattcccaa agacgttcag cagcaactcg ccgtgcctaa ttgggacgag    1380
cccgttaacc tccccggtta cctcgccagg ctgcccaggc cccccgccga ggcccaattg    1440
gaacacattg tcagactcat catggaggcc caaaagcccg ttctctacgt cggcggtggc    1500
agtttgaatt ccagtgctga attgaggcgc tttgttgaac tcactggtat tcccgttgct    1560
agcacttaa tggtcttgg aacttttcct attggtgatg aatattccct tcagatgctg    1620
ggtatgcatg gtactgttta tgctaactat gctgttgaca atagtgattt gttgcttgcc    1680
tttgggtaa ggtttgatga ccgtgttact gggaagcttg aggcttttgc tagtagggct    1740
aagattgttc acattgatat tgattctgcc gagattggga gaacaagca ggcgcacgtg    1800
tcggtttgcg cggatttgaa gttggccttg aagggaatta atatgattt ggaggagaaa    1860
```

```
ggagtggagg gtaagtttga tcttggaggt tggagagaag agattaatgt gcagaaacac    1920
aagtttccat tgggttacaa gacattccag gacgcgattt ctccgcagca tgctatcgag    1980
gttcttgatg agttgactaa tggagatgct attgttagta ctggggttgg gcagcatcaa    2040
atgtgggctg cgcagtttta caagtacaag agaccgaggc agtggttgac ctcaggggt     2100 cttggagcca tgggttttgg attgcctgcg gctattggtg ctgctgttgc taaccctggg    2160
gctgttgtgg ttgacattga tggggatggt agtttcatca tgaatgttca ggagttggcc    2220
actataagag tggagaatct cccagttaag atattgttgt tgaacaatca gcatttgggt    2280
atggtggttc agttggagga taggttctac aagtccaata gagctcacac ctatcttgga    2340
gatccgtcta gcgagagcga gatattccca aacatgctca gtttgctga tgcttgtggg     2400 ataccggcag cgcgagtgac gaagaaggaa gagcttagag cggcaattca gagaatgttg    2460
gacacccctg gcccctacct tcttgatgtc attgtgcccc atcaggagca tgtgttgccg    2520
atgattccca gtaatggatc cttcaaggat gtgataactg agggtgatgg tagaacgagg    2580
tactgattgc ctagaccaaa tgttccttga tgcttgtttt gtacaatata tataagataa    2640
tgctgtccta gttgcaggat ttggcctgtg gtgagcatca tagtctgtag tagttttggt    2700
agcaagacat tttatttcc ttttatttaa cttactacat gcagtagcat ctatctatct     2760
ctgtagtctg atatctcctg ttgtctgtat tgtgccgttg gattttttgc tgtagtgaga    2820
ctgaaaatga tgtgctagta ataatatttc tgttagaaat ctaagtagag aatctgttga    2880
agaagtcaaa agctaatgga atcaggttac atatcaatgt ttttctttt  ttagcggttg    2940 gtagacgtgt agattcaact tctcttggag ctcacctagg caatcagtaa aatgcatatt    3000 cctttttaa cttgccattt atttactttt agtggaaatt gtgaccaatt tgttcatgta     3060
gaacggattt ggaccattgc gtccacaaaa cgtctctttt gctcgatctt cacaaagcga    3120
taccgaaatc cagagatagt tttcaaaagt cagaaatggc aaagttataa atagtaaaac    3180
agaatagatg ctgtaatcga cttcaataac aagtggcatc acgtttctag ttctagaccc    3240
gggtctagag tcgacctgca ggcatgcccg cggatatcga tgggcccgg ccgaagcttc     3300 ggtccgggtc acccagcttg agtattctat agtgtcacct aaatagcttg gcgtaatcat    3360
ggtcatagct gtttcctgtg tgaaattgtt atccgctcac aattccacac aacatacgag    3420
ccggaagcat aaagtgtaaa gcctggggtg cctaatgagt gagctaactc acattaattg    3480
cgttgcgctc actgcccgct ttccagtcgg gaaacctgtc gtgccagctg cattaatgaa    3540
tcggccaacg cgcggggaga ggcggtttgc gtattgggcg ctcttccgct tcctcgctca    3600
ctgactcgct gcgctcggtc gttcggctgc ggcgagcggt atcagctcac tcaaaggcgg    3660
taatacggtt atccacagaa tcaggggata acgcaggaaa gaacatgtga gcaaaaggcc    3720
agcaaaaggc caggaaccgt aaaaaggccg cgttgctggc gtttttcgat aggctccgcc    3780
cccctgacga gcatcacaaa aatcgacgct caagtcagag gtggcgaaac ccgacaggac    3840
tataaagata ccaggcgttt ccccctggaa gctccctcgt gcgctctcct gttccgaccc    3900
tgccgcttac cggatacctg tccgcctttc tcccttcggg aagcgtggcg ctttctcata    3960
gctcacgctg taggtatctc agttcggtgt aggtcgttcg ctccaagctg ggctgtgtgc    4020
acgaaccccc cgttcagccc gaccgctgcg ccttatccgg taactatcgt cttgagtcca    4080
acccggtaag acacgactta tcgccactgg cagcagccac tggtaacagg attagcagag    4140
cgaggtatgt aggcggtgct acagagttct tgaagtggtg gcctaactac ggctacacta    4200
gaaggacagt atttggtatc tgcgctctgc tgaagccagt taccttcgga aaaagagttg    4260
```

```
gtagctcttg atccggcaaa caaaccaccg ctggtagcgg tggttttttt gtttgcaagc   4320
agcagattac gcgcagaaaa aaaggatctc aagaagatcc tttgatcttt tctacggggt   4380
ctgacgctca gtggaacgaa aactcacgtt aagggatttt ggtcatggag ccacgttgtg   4440
tctcaaaatc tctgatgtta cattgcacaa gataaaaata tatcatcatg aacaataaaa   4500
ctgtctgctt acataaacag taatacaagg ggtgttatga gccatattca acgggaaacg   4560
tcttgctcga ggccgcgatt aaattccaac atggatgctg atttatatgc ctataaatgg   4620
gctcgcgata atgtcggcca atcaggtccg acaatctatc gattgtatgg gaagcccgat   4680
gcgccagact tgtttctgaa acatggcaaa ggtagccttg ccaatgatgt tacagatgag   4740
atggtcagac taaactgcct gacggaattt atgcctcttc cgaccatcaa gcattttatc   4800
cgtactcctg atgatgcatg gttactcacc actgcgatcc cngggaaaac agcattccag   4860
gtattagaag aatatcctga ttcaggtgaa aatattgttg atgcgctggc agtgttcctg   4920
cgccggttgc attcgattcc tctttgtaat tgtccttttaa acagcgatcg cgtatttcgt   4980
ctcgctcagg cgcaatcacg aatgaataac ggtttggttg atgcgagtga ttttgatgac   5040
gagcgtaatg gctggcctgt tgaacaagtc tggaaagaaa tgcataanct tttgccattc   5100
tcaccggatt cagtcgtcac tcatggtgat ttctcacttg ataaccttat ttttgaccag   5160
gcgaaattaa taggttgtat tgatcttcga cgagtcggaa tcgcagaccg ataccaggat   5220
cttgccatcc tatggaactg cctcggtgag ttttctcctt cattacagaa acggcttttt   5280
caaaaatatg gtattgataa tcctgatatg aataaattgc agtttcattt gatcctcgat   5340
gagttttcct aatcagaatt ggttaattgg ttgtaacact ggcagagcat tacgctgact   5400
tgacgggacg gcggctttgt tgaataaatc gaacttttgc tgacttgaag gatcagatca   5460
cgcatcttcc cgacaacgca gaccgttccg tggcaaagca aaagttcaaa atcaccaact   5520
ggtccaccta caacaaagct ctcatcaacc gtggctccct cactttctgg ctggatgatg   5580
gggcgattca ggcctggtat gagtcagcaa caccttcttc acgagccatg acattaacct   5640
ataaaaatag gcgtatcacg aggccctttc gtctcgcgcg tttcggtgat gacggtgaaa   5700
acctctgaca catgcagctc ccggagacgg tcacagcttg tctgtaagcg gatgccggga   5760
gcagacaagc ccgtcagggc gcgtcagcgg gtgttggcgg gtgtcggggc tggcttaact   5820
atgcggcatc agagcagatt gtactgagag tgcaccatat gcggtgtgaa ataccgcaca   5880
gatgcgtaag gagaaaatac cgcatcaggc gaaattgtaa acgttaatat tttgttaaaa   5940
ttcgcgttaa atatttgtta aatcagctca ttttttaacc aataggccga atcggcaaa    6000
atcccttata aatcaaaaga atagaccgag atagggttga gtgttgttcc agtttggaac   6060
aagagtccac tattaaagaa cgtggactcc aacgtcaaag ggcgaaaaac cgtctatcag   6120
ggcgatggcc cactacgtga accatcaccc aaatcaagtt ttttgcggtc gaggtgccgt   6180
aaagctctaa atcggaaccc taagggagc ccccgattta gagcttgacg ggaaagccg    6240
gcgaacgtgg cgagaaagga agggaagaaa gcgaaaggag cgggcgctag ggcgctggca   6300
agtgtagcgg tcacgctgcg cgtaaccacc acacccgccg cgcttaatgc gccgctacag   6360
ggcgcgtcca ttcgccattc aggctgcgca actgttggga agggcgatcg gtgcgggcct   6420
cttcgctatt acgccagctg gcgaaagggg gatgtgctgc aaggcgatta agttgggtaa   6480
cgccagggtt ttcccagtca cgacgttgta aaacgacggc cagtgaattg taatacgact   6540
cactata                                                            6547
```

<210> SEQ ID NO 22
<211> LENGTH: 3191
<212> TYPE: DNA
<213> ORGANISM: artificial sequence
<220> FEATURE:
<223> OTHER INFORMATION: recombinant construct

<400> SEQUENCE: 22

```
ctagaaatcc gtcaacatgg tggagcacga cactctcgtc tactccaaga atatcaaaga      60
tacagtctca gaagaccaaa gggctattga gacttttcaa caaagggtaa tatcgggaaa     120
cctcctcgga ttccattgcc cagctatctg tcacttcatc aaaaggacag tagaaaagga     180
aggtggcacc tacaaatgcc atcattgcga taaaggaaag gctatcgttc aagatgcctc     240
tgccgacagt ggtcccaaag atggacccccc acccacgagg agcatcgtgg aaaaagaaga     300
cgttccaacc acgtcttcaa agcaagtgga ttgatgtgat gatcctatgc gtatggtatg     360
acgtgtgttc aagatgatga cttcaaacct acctatgacg tatggtatga acgtgtgtcg     420
actgatgact tagatccact cgagcggcta taaatacgta cctacgcacc ctgcgctacc     480
atccctagag ctgcagctta tttttacaac aattaccaac aacaacaaac aacaaacaac     540
attacaatta ctatttacaa ttacagtcga cccgtaccca cacaacacaa tggcggccac     600
cgcttccaga accacccgat tctcttcttc ctcttcacac cccaccttcc ccaaacgcat     660
tactagatcc accctccctc tctctcatca acccctcacc aaacccaacc acgtctctcaa     720
aatcaaatgt tccatctcca aaccccccac ggcggcgccc ttcaccaagg aagcgccgac     780
cacggagccc ttcgtgtcac ggttcgcctc cggcgaacct cgcaagggcg cggacatcct     840
tgtggaggcg ctggagaggc agggcgtgac gacggtgttc gcgtaccccg gcggtgcgtc     900
gatggagatc caccaggcgc tcacgcgctc cgccgccatc gcaacgtgc tcccgcgcca     960
cgagcagggc ggcgtcttcg ccgccgaagg ctacgcgcgt tcctccggcc tccccggcgt    1020
ctgcattgcc acctccggcc ccggcgccac caacctcgtg agcggcctcg ccgacgcttt    1080
aatggacagc gtcccagtcg tcgccatcac cggccaggtc gcccgccgga tgatcggcac    1140
cgacgccttc caagaaaccc cgatcgtgga ggtgagcaga tccatcacga agcacaacta    1200
cctcatcctc gacgtcgacg acatccccccg cgtcgtcgcc gaggctttct tcgtcgccac    1260
ctccggccgc cccggtccgg tcctcatcga cattcccaaa gacgttcagc agcaactcgc    1320
cgtgcctaat tgggacgagc ccgttaacct ccccggttac ctcgccaggc tgcccaggcc    1380
ccccgccgag gcccaattgg aacacattgt cagactcatc atggaggccc aaaagcccgt    1440
tctctacgtc ggcggtggca gtttgaattc cagtgctgaa ttgaggcgct tgttgaact    1500
cactggtatt cccgttgcta gcactttaat gggtcttgga acttttccta ttggtgatga    1560
atattccctt cagatgctgg gtatgcatgg tactgtttat gctaactatg ctgttgacaa    1620
tagtgatttg ttgcttgcct ttgggtaag gtttgatgac cgtgttactg gaagcttga    1680
ggcttttgct agtagggcta agattgttca cattgatatt gattctgccg agattgggaa    1740
gaacaagcag gcgcacgtgt cggtttgcgc ggatttgaag ttggccttga agggaattaa    1800
tatgattttg gaggagaaag gagtggaggg taagtttgat cttggaggtt ggagagaaga    1860
gattaatgtg cagaaacaca gtttccatt gggttacaag acattccagg acgcgatttc    1920
tccgcagcat gctatcgagg ttcttgatga gttgactaat ggagatgcta ttgttagtac    1980
tggggttggg cagcatcaaa tgtgggctgc gcagttttac aagtacaaga gaccgaggca    2040
gtggttgacc tcaggggtc ttggagccat gggttttgga ttgcctgcgg ctattggtgc    2100
```

```
tgctgttgct aaccctgggg ctgttgtggt tgacattgat ggggatggta gtttcatcat    2160
gaatgttcag gagttggcca ctataagagt ggagaatctc ccagttaaga tattgttgtt    2220
gaacaatcag catttgggta tggtggttca gttggaggat aggttctaca agtccaatag    2280
agctcacacc tatcttggag atccgtctag cgagagcgag atattcccaa acatgctcaa    2340
gtttgctgat gcttgtggga taccggcagc gcgagtgacg aagaaggaag agcttagagc    2400
ggcaattcag agaatgttgg acacccctgg cccctacctt cttgatgtca ttgtgcccca    2460
tcaggagcat gtgttgccga tgattcccag taatggatcc ttcaaggatg tgataactga    2520
gggtgatggt agaacgaggt actgattgcc tagaccaaat gttccttgat gcttgttttg    2580
tacaatatat ataagataat gctgtcctag ttgcaggatt tggcctgtgg tgagcatcat    2640
agtctgtagt agttttggta gcaagacatt ttattttcct tttatttaac ttactacatg    2700
cagtagcatc tatctatctc tgtagtctga tatctcctgt tgtctgtatt gtgccgttgg    2760
attttttgct gtagtgagac tgaaaatgat gtgctagtaa taatatttct gttagaaatc    2820
taagtagaga atctgttgaa gaagtcaaaa gctaatggaa tcaggttaca tatcaatgtt    2880
tttcttttt tagcggttgg tagacgtgta gattcaactt ctcttggagc tcacctaggc     2940
aatcagtaaa atgcatattc cttttttaac ttgccattta tttacttta gtggaaattg     3000
tgaccaattt gttcatgtag aacggatttg gaccattgcg tccacaaaac gtctcttttg    3060
ctcgatcttc acaaagcgat accgaaatcc agagatagtt ttcaaaagtc agaaatggca    3120
aagttataaa tagtaaaaca gaatagatgc tgtaatcgac ttcaataaca agtggcatca    3180
cgtttctagt t                                                         3191

<210> SEQ ID NO 23
<211> LENGTH: 2924
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (1191)..(1191)
<223> OTHER INFORMATION: n is a, c, g, or t

<400> SEQUENCE: 23
cgcgccaagc ttggatcctc gaagagaagg gttaataaca cactttttta acatttttaa     60
cacaattttt agttatttaa aaatttatta aaaaatttaa aataagaaga ggaactcttt    120
aaataaatct aacttacaaa atttatgatt tttaataagt tttcaccaat aaaaaatgtc    180
ataaaaatat gttaaaaagt atattatcaa tattctcttt atgataaata aaagaaaaa    240
aaaaataaaa gttaagtgaa aatgagattg aagtgacttt aggtgtgtat aaatatatca    300
accccgccaa caatttattt aatccaaata tattgaagta tattattcca tagcctttat    360
ttatttatat atttattata taaaagcttt atttgttcta ggttgttcat gaaatatttt    420
tttggtttta tctccgttgt aagaaaatca tgtgctttgt gtcgccactc actattgcag    480
ctttttcatg cattggtcag attgacggtt gattgtattt tgttttttta tggttttgtg    540
ttatgactta agtcttcatc tctttatctc ttcatcaggt tgatggtta cctaatatgg     600
tccatgggta catgcatggt taaattaggt ggccaacttt gttgtgaacg atagaatttt    660
ttttatatta agtaaactat ttttatatta tgaaataata ataaaaaaaa tattttatca    720
ttattaacaa aatcatatta gttaatttgt taactctata ataaaagaaa tactgtaaca    780
ttcacattac atggtaacat ctttccaccc tttcatttgt tttttgtttg atgacttttt    840
```

```
ttcttgttta aatttatttc ccttcttta aatttggaat acattatcat catatataaa      900
ctaaaatact aaaaacagga ttacacaaat gataaaataat aacacaaata tttataaatc    960
tagctgcaat atatttaaac tagctatatc gatattgtaa aataaaacta gctgcattga    1020
tactgataaa aaaatatcat gtgctttctg gactgatgat gcagtatact tttgacattg   1080
cctttatttt attttcaga aaagctttct tagttctggg ttcttcatta tttgtttccc    1140
atctccattg tgaattgaat catttgcttc gtgtcacaaa tacaatttag ntaggtacat   1200
gcattggtca gattcacggt ttattatgtc atgacttaag ttcatggtag tacattacct   1260
gccacgcatg cattatattg gttagatttg ataggcaaat ttggttgtca acaatataaa   1320
tataataat gtttttatat tacgaaataa cagtgatcaa acaaacagt tttatcttta    1380
ttaacaagat tttgttttg tttgatgacg ttttttaatg tttacgcttt ccccttctt    1440
ttgaatttag aacactttat catcataaaa tcaaatacta aaaaattac atatttcata   1500
aataataaca caatatttt taaaaaatct gaaataataa tgaacaatat tacatatttat  1560
cacgaaaatt cattaataaa aatattat aaataaatg taatagtagt tatatgtagg     1620
aaaaaagtac tgcacgcata atatatacaa aaagattaaa atgaactatt ataaataata  1680
acactaaatt aatggtgaat catatcaaaa taatgaaaaa gtaaataaaa tttgtaatta  1740
acttctatat gtattacaca cacaaataat aaataatagt aaaaaaaatt atgataaata  1800
tttaccatct cataagatat ttaaaataat gataaaaata tagattattt tttatgcaac  1860
tagctagcca aaaagagaac acgggtatat ataaaaagag tacctttaaa ttctactgta  1920
cttcctttat tcctgacgtt tttatatcaa gtggacatac gtgaagattt taattatcag  1980
tctaaatatt tcattagcac ttaatacttt tctgttttat tcctatccta taagtagtcc  2040
cgattctccc aacattgctt attcacacaa ctaactaaga aagtcttcca tagccccca   2100
agcggccgct gagtgattgc tcacgagtgt ggtcaccatg ccttcagcaa gtaccaatgg  2160
gttgatgatg ttgtgggttt gacccttcac tcaacacttt tagtccctta tttctcatgg  2220
aaaataagcc atcgccgcca tcactccaac acaggttccc ttgaccgtga tgaagtgttt  2280
gtcccaaaac caaaatccaa agttgcatgg ttttccaagt acttaaacaa ccctctagga  2340
agggctgttt ctcttctcgt cacactcaca atagggtggc ctatgtattt agccttcaat  2400
gtctctggta gacccatgac tagttttgca agccactacc accctatgc tcccatatat   2460
tctaaccgtg agaggcttct gatctatgtc tctgatgttg ctttgttttc tgtgacttac  2520
tctctctacc gtgttgcaac cctgaaaggg ttggtttggc tgctatgtgt ttatggggtg  2580
cctttgctca ttgtgaacgg ttttcttgtg actatcacat atttgcagca cacacacttt  2640
gccttgcctc attacgattc atcagaatgg gactggctga agggagcttt ggcaactatg  2700
gacagagatt aagcggccgc gacacaagtg tgagagtact aaataaatgc tttggttgta  2760
cgaaatcatt acactaaata aaataatcaa agcttatata tgccttccgc taaggccgaa  2820
tgcaaagaaa ttggttcttt ctcgttatct tttgccactt ttactagtac gtattaatta  2880
ctacttaatc atctttgttt acggctcatt atatccgtcg acgg                   2924
```

<210> SEQ ID NO 24
<211> LENGTH: 4511
<212> TYPE: DNA
<213> ORGANISM: artificial sequence
<220> FEATURE:
<223> OTHER INFORMATION: recombinant construct

```
<400> SEQUENCE: 24
cgcgccaagc ttggatcccc cctcgaggtc gacggtatcg ataagcttct gcaggaattc      60
tgagctagcg aagttcctat tccgaagttc ctattcttca aaaagtatag gaacttcaga     120
cgtcctcgag tccgtcctgt agaaacccca acccgtgaaa tcaaaaaact cgacggcctg     180
tgggcattca gtctggatcg cgaaaactgt ggaattgatc cagaattcgc tagcgaagtt     240
cctattccga agttcctatt ctctagaaag tataggaact tcagatccag aattcggtcc     300
gggccatcgt ggcctcttgc tcttcaggat gaagagctat gtttcgcgcc aagcttggat     360
cctagaacta gaaacgtgat gccacttgtt attgaagtcg attacagcat ctattctgtt     420
ttactattta aactttgcc  atttctgact tttgaaaact atctctggat ttcggtatcg     480
ctttgtgaag atcgagcaaa agagacgttt tgtggacgca atggtccaaa tccgttctac     540
atgaacaaat tggtcacaat tccactaaa  agtaaataaa tggcaagtta aaaaggaat     600 atgcatttta ctgattgcct aggtgagctc aagagaagt  tgaatctaca cgtctaccaa     660
ccgctaaaaa agaaaaaaca ttgatatgta acctgattcc attagctttt gacttcttca     720
acagattctc tacttagatt tctaacagaa atattattac tagcacatca ttttcagtct     780
cactacagca aaaaatccaa cggcacaata cagacaacag gagatatcag actacagaga     840
tagatagatg ctactgcatg tagtaagtta aataaaagga aaataaaatg tcttgctacc     900
aaaactacta cagactatga tgctcaccac aggccaaatc ctgcaactag acagcatta     960 tcttatatat attgtacaaa acaagcatca aggaacattt ggtctaggca atcagtacct    1020
cgttctacca tcaccctcag ttatcacatc cttgaaggat ccattactgg gaatcatcgg    1080
caacacatgc tcctgatggg gcacaatgac atcaagaagg tagggccag  gggtgtccaa    1140 cattctctga attgccgctc taagctcttc cttcttcgtc actcgcgctg ccggtatccc    1200
acaagcatca gcaaacttga gcatgttggg gaatatctcg ctctcgctag acggatctcc    1260
aagataggtg tgagctctat tggacttgta gaacctatcc tccaactgaa ccaccatacc    1320
caaatgctga ttgttcaaca acaatatctt aactgggaga ttctccactc ttatagtggc    1380
caactcctga acattcatga tgaaactacc atccccatca atgtcaacca acagcccc     1440 agggttagca acagcagcac aatagccgc  aggcaatcca aaacccatgg ctccaagacc    1500
ccctgaggtc aaccactgcc tcggtctctt gtacttgtaa aactgcgcag cccacatttg    1560
atgctgccca accccagtac taacaatagc atctccatta gtcaactcat caagaacctc    1620
gatagcatgc tgcggagaaa tcgcgtcctg aatgtcttg  taacccaatg gaaacttgtg    1680
tttctgcaca ttaatctctt ctctccaacc tccaagatca aacttaccct ccactccttt    1740
ctcctccaaa atcatattaa ttcccttcaa ggccaacttc aaatccgcgc aaaccgacac    1800
gtgcgcctgc ttgttcttcc caatctcggc agaatcaata tcaatgtgaa caatcttagc    1860
cctactagca aaagcctcaa gcttcccagt aacacggtca tcaaacctta ccccaaaggc    1920
aagcaacaaa tcactattgt caacagcata gttagcataa acagtaccat gcatacccag    1980
catctgaagg gaatattcat caccaatagg aaaagttcca agacccatta aagtgctagc    2040
aacgggaata ccagtgagtt caacaaagcg cctcaattca gcactggaat tcaaactgcc    2100
accgccgacg tagagaacgg gcttttgggc ctccatgatg agtctgacaa tgtgttccaa    2160
ttgggcctcg gcgggggggcc tgggcagcct ggcgaggtaa ccggggaggt taacgggctc    2220
gtcccaatta ggcacggcga gttgctgctg aacgtctttg ggaatgtcga tgaggaccgg    2280
accggggcgg ccggaggtgg cgacgaagaa agcctcggcg acgacgcggg ggatgtcgtc    2340
```

```
gacgtcgagg atgaggtagt tgtgcttcgt gatggatctg ctcacctcca cgatcggggt    2400
ttcttggaag gcgtcggtgc cgatcatccg gcgggcgacc tggccggtga tggcgacgac    2460
tgggacgctg tccattaaag cgtcggcgag gccgctcacg aggttggtgg cgccggggcc    2520
ggaggtggca atgcagacgc cggggaggcc ggaggaacgc gcgtagcctt cggcggcgaa    2580
gacgccgccc tgctcgtggc gcgggagcac gttgcggatg gcggcggagc gcgtgagcgc    2640
ctggtggatc tccatcgacg caccgccggg gtacgcgaac accgtcgtca cgccctgcct    2700
ctccagcgcc tccacaagga tgtccgcgcc cttgcgaggt tcgccggagg cgaaccgtga    2760
cacgaagggc tccgtggtcg gcgcttcctt ggtgaagggc gccgccgtgg ggggtttgga    2820
gatggaacat ttgattttga gagcgtggtt gggtttggtg agggtttgat gagagagagg    2880
gagggtggat ctagtaatgc gtttggggaa ggtggggtgt gaagaggaag aagagaatcg    2940
ggtggttctg gaagcggtgg ccgccattgt gttgtgtggc atggttatac ttcaaaaact    3000
gcacaacaag cctagagtta gtacctaaac agtaaattta caacagagag caaagacaca    3060
tgcaaaaatt tcagccataa aaaagttat aatagaattt aaagcaaaag tttcattttt    3120
taaacatata tacaaacaaa ctggatttga aggaagggat taattcccct gctcaaagtt    3180
tgaattccta ttgtgaccta tactcgaata aaattgaagc ctaaggaatg tatgagaaac    3240
aagaaaacaa aacaaaacta cagacaaaca agtacaatta caaaattcgc taaaattctg    3300
taatcaccaa accccatctc agtcagcaca aggcccaagg tttattttga aataaaaaaa    3360
aagtgatttt atttctcata agctaaaaga aagaaaggca attatgaaat gatttcgact    3420
agatctgaaa gtccaacgcg tattccgcag atattaaaga aagagtagag tttcacatgg    3480
atcctagatg gacccagttg aggaaaaagc aaggcaaagc aaaccagaag tgcaagatcc    3540
gaaattgaac cacggaatct aggatttggt agagggagaa gaaagtacc ttgagaggta    3600 gaagagaaga gaagagcaga gagatatatg aacgagtgtg tcttggtctc aactctgaag    3660
cgatacgagt ttagagggga gcattgagtt ccaatttata gggaaaccgg gtggcagggg    3720
tgagttaatg acggaaaagc ccctaagtaa cgagattgga ttgtgggtta gattcaaccg    3780
tttgcatccg cggcttagat tggggaagtc agagtgaatc tcaaccgttg actgagttga    3840
aaattgaatg tagcaaccaa ttgagccaac cccagccttt gccctttgat tttgatttgt    3900
ttgttgcata cttttattt gtcttctggt tctgactctc tttctctcgt ttcaatgcca    3960
ggttgcctac tcccacacca ctcacaagaa gattctactg ttagtattaa atattttta    4020 atgtattaaa tgatgaatgc ttttgtaaac agaacaagac tatgtctaat aagtgtcttg    4080
caacattttt taagaaatta aaaaaaatat atttattatc aaaatcaaat gtatgaaaaa    4140
tcatgaataa tataatttta tacattttt taaaaaatct tttaatttct taattaatat    4200
cttaaaaata atgattaata tttaacccaa aataattagt atgattggta aggaagatat    4260
ccatgttatg tttggatgtg agtttgatct agagcaaagc ttactagagt cgaccgatcc    4320
gtcgacggcg cgcgcgcctc tagttgaaga cacgttcatg tcttcatcgt aagaagacac    4380
tcagtagtct tcggccagaa tggcccggac cgaagcttct gcaggaattc tgagctagcg    4440
aagttcctat tccgaagttc ctattctcta gaaagtatag gaacttcaga tccactagga    4500
tccgtcgacg g                                                         4511
```

<210> SEQ ID NO 25
<211> LENGTH: 5437
<212> TYPE: DNA
<213> ORGANISM: artificial sequence
<220> FEATURE:
<223> OTHER INFORMATION: recombinant construct
<220> FEATURE:
<221> NAME/KEY: misc_feature
<222> LOCATION: (3914)..(3914)
<223> OTHER INFORMATION: n is a, c, g, or t

<400> SEQUENCE: 25

```
ggccgcgaca caagtgtgag agtactaaat aaatgctttg gttgtacgaa atcattacac      60
taaataaaat aatcaaagct tatatatgcc ttccgctaag gccgaatgca aagaaattgg     120
ttctttctcg ttatcttttg ccacttttac tagtacgtat taattactac ttaatcatct    180
ttgtttacgg ctcattatat ccgtcgacgg cgcgcccgat catccggata tagttcctcc    240
tttcagcaaa aaaccccctca agacccgttt agaggcccca aggggttatg ctagttattg    300
ctcagcggtg gcagcagcca actcagcttc ctttcgggct tgttagcag ccggatcgat     360
ccaagctgta cctcactatt cctttgccct cggacgagtg ctggggcgtc ggtttccact    420
atcggcgagt acttctacac agccatcggt ccagacggcc gcgcttctgc gggcgatttg    480
tgtacgcccg acagtcccgg ctccggatcg acgattgcg tcgcatcgac cctgcgccca    540
agctgcatca tcgaaattgc cgtcaaccaa gctctgatag agttggtcaa gaccaatgcg    600
gagcatatac gcccggagcc gcggcgatcc tgcaagctcc ggatgcctcc gctcgaagta    660
gcgcgtctgc tgctccatac aagccaacca cggcctccag aagaagatgt tggcgacctc    720
gtattgggaa tccccgaaca tcgcctcgct ccagtcaatg accgctgtta tgcggccatt    780
gtccgtcagg acattgttgg agccgaaatc cgcgtgcacg aggtgccgga cttcggggca    840
gtcctcggcc caaagcatca gctcatcgag agcctgcgcg acggacgcac tgacggtgtc    900
gtccatcaca gtttgccagt gatacacatg gggatcagca atcgcgcata tgaaatcacg    960
ccatgtagtg tattgaccga ttccttgcgg tccgaatggg ccgaaccgc tcgtctggct    1020
aagatcggcc gcagcgatcg catccatagc ctccgcgacc ggctgcagaa cagcgggcag   1080
ttcggtttca ggcaggtctt gcaacgtgac accctgtgca cggcgggaga tgcaataggt   1140
caggctctcg ctgaattccc caatgtcaag cacttccgga atcgggagcg cggccgatgc   1200
aaagtgccga taaacataac gatctttgta gaaaccatcg gcgcagctat ttacccgcag   1260
gacatatcca cgccctccta catcgaagct gaaagcacga gattcttcgc cctccgagag   1320
ctgcatcagg tcggagacgc tgtcgaactt ttcgatcaga aacttctcga cagacgtcgc   1380
ggtgagttca ggcttttcca tgggtatatc tccttcttaa agttaaacaa aattatttct   1440
agagggaaac cgttgtggtc tccctatagt gagtcgtatt aatttcgcgg gatcgagatc   1500
tgatcaacct gcattaatga atcggccaac gcgcggggag aggcggtttg cgtattgggc   1560
gctcttccgc ttcctcgctc actgactcgc tgcgctcggt cgttcggctg cggcgagcgg   1620
tatcagctca ctcaaaggcg gtaatacggt tatccacaga atcaggggat aacgcaggaa   1680
agaacatgtg agcaaaaggc cagcaaaagg ccaggaaccg taaaaaggcc gcgttgctgg   1740
cgttttttcca taggctccgc ccccctgacg agcatcacaa aaatcgacgc tcaagtcaga   1800
ggtggcgaaa cccgacagga ctataaagat accaggcgtt tccccctgga agctccctcg   1860
tgcgctctcc tgttccgacc ctgccgctta ccggatacct gtccgccttt ctcccttcgg   1920
gaagcgtggc gctttctcaa tgctcacgct gtaggtatct cagttcggtg taggtcgttc   1980
gctccaagct gggctgtgtg cacgaacccc cgttcagcc cgaccgctgc gccttatccg    2040
gtaactatcg tcttgagtcc aacccggtaa gacacgactt atcgccactg gcagcagcca   2100
```

-continued

```
ctggtaacag gattagcaga gcgaggtatg taggcggtgc tacagagttc ttgaagtggt    2160
ggcctaacta cggctacact agaaggacag tatttggtat ctgcgctctg ctgaagccag    2220
ttaccttcgg aaaaagagtt ggtagctctt gatccggcaa acaaaccacc gctggtagcg    2280
gtggtttttt tgtttgcaag cagcagatta cgcgcagaaa aaaggatctc aagaagatc     2340
ctttgatctt ttctacgggg tctgacgctc agtggaacga aaactcacgt taagggattt    2400
tggtcatgac attaacctat aaaaataggc gtatcacgag gccctttcgt ctcgcgcgtt    2460
tcggtgatga cggtgaaaac ctctgacaca tgcagctccc ggagacggtc acagcttgtc    2520
tgtaagcgga tgccgggagc agacaagccc gtcagggcgc gtcagcgggt gttggcgggt    2580
gtcgggctg gcttaactat gcggcatcag agcagattgt actgagagtg caccatatgg     2640
acatattgtc gttagaacgc ggctacaatt aatacataac cttatgtatc atacacatac    2700
gatttaggtg acactataga acggcgcgcc aagcttggat cctcgaagag aagggttaat    2760
aacacatttt ttaacatttt taacacaaat tttagttatt taaaaattta ttaaaaaatt    2820
taaaataaga agaggaactc tttaaataaa tctaacttac aaaatttatg attttttaata   2880
agttttcacc aataaaaaat gtcataaaaa tatgttaaaa agtatattat caatattctc    2940
tttatgataa ataaaaagaa aaaaaaaata aaagttaagt gaaaatgaga ttgaagtgac    3000
tttaggtgtg tataaatata tcaacccgc caacaattta tttaatccaa atatattgaa     3060
gtatattatt ccatagcctt tatttattta tatatttatt atataaagc tttatttgtt     3120
ctaggttgtt catgaaatat ttttttggtt ttatctccgt tgtaagaaaa tcatgtgctt    3180
tgtgtcgcca ctcactattg cagcttttc atgcattggt cagattgacg ttgattgta     3240
tttttgtttt ttatggtttt gtgttatgac ttaagtcttc atctctttat ctcttcatca    3300
ggtttgatgg ttacctaata tggtccatgg gtacatgcat ggttaaatta ggtggccaac    3360
tttgttgtga acgatagaat tttttttata ttaagtaaac tatttttata ttatgaaata    3420
ataataaaaa aaatatttta tcattattaa caaaatcata ttagtaatt tgttaactct     3480
ataataaaag aaatactgta acattcacat tacatggtaa catctttcca cccttttcatt   3540
tgttttttgt ttgatgactt ttttttcttgt ttaaatttat ttcccttctt ttaaatttgg   3600
aatacattat catcatatat aaactaaaat actaaaaaca ggattacaca aatgataaat    3660
aataacacaa atatttataa atctagctgc aatatattta aactagctat atcgatattg    3720
taaaataaaa ctagctgcat tgatactgat aaaaaaatat catgtgcttt ctggactgat    3780
gatgcagtat acttttgaca ttgcctttat tttatttttc agaaaagctt tcttagttct    3840
gggttcttca ttatttgttt cccatctcca ttgtgaattg aatcatttgc ttcgtgtcac    3900
aaatacaatt tagntaggta catgcattgg tcagattcac ggtttattat gtcatgactt    3960
aagttcatgg tagtacatta cctgccacgc atgcattata ttggttagat ttgataggca    4020
aatttggttg tcaacaatat aaatataaat aatgttttta tattacgaaa taacagtgat    4080
caaaacaaac agtttatct ttattaacaa gatttgtttt ttgtttgatg acgttttta      4140
atgtttacgc tttccccctt cttttgaatt tagaacactt tatcatcata aaatcaaata    4200
ctaaaaaat tacatatttc ataaataata acacaaatat ttttaaaaaa tctgaaataa    4260
taatgaacaa tattacatat tatcacgaaa attcattaat aaaaatatta tataaataaa    4320
atgtaatagt agttatatgt aggaaaaaag tactgcacgc ataatatata caaaagatt     4380
aaaatgaact attataaata ataacactaa attaatggtg aatcatatca aaataatgaa    4440
aaagtaaata aaatttgtaa ttaacttcta tatgtattac acacacaaat aataaataat    4500
```

```
agtaaaaaaa attatgataa atatttacca tctcataaga tatttaaaat aatgataaaa      4560
atatagatta ttttttatgc aactagctag ccaaaaagag aacacgggta tatataaaaa      4620
gagtaccttt aaattctact gtacttcctt tattcctgac gttttttatat caagtggaca     4680 tacgtgaaga ttttaattat cagtctaaat atttcattag cacttaatac ttttctgttt     4740
tattcctatc ctataagtag tcccgattct cccaacattg cttattcaca caactaacta     4800
agaaagtctt ccatagcccc ccaagcggcc gctgagtgat tgctcacgag tgtggtcacc     4860
atgccttcag caagtaccaa tgggttgatg atgttgtggg tttgacccctt cactcaacac   4920 ttttagtccc ttatttctca tggaaaataa gccatcgccg ccatcactcc aacacaggtt    4980
cccttgaccg tgatgaagtg tttgtcccaa aaccaaaatc caaagttgca tggttttcca    5040
agtacttaaa caaccctcta ggaagggctg tttctcttct cgtcacactc acaatagggt    5100
ggcctatgta tttagccttc aatgtctctg gtagacccta tgatagtttt gcaagccact    5160 accacccctta tgctcccata tattctaacc gtgagaggct tctgatctat gtctctgatg   5220
ttgctttgtt ttctgtgact tactctctct accgtgttgc aaccctgaaa gggttggttt    5280
ggctgctatg tgtttatggg gtgcctttgc tcattgtgaa cggttttctt gtgactatca    5340
catatttgca gcacacacac tttgccttgc ctcattacga ttcatcagaa tgggactggc    5400
tgaagggagc tttggcaact atggacagag attaagc                              5437

<210> SEQ ID NO 26
<211> LENGTH: 7025
<212> TYPE: DNA
<213> ORGANISM: artificial sequence
<220> FEATURE:
<223> OTHER INFORMATION: recombinant construct

<400> SEQUENCE: 26
gatccgtcga cggcgcgccc gatcatccgg atatagttcc tcctttcagc aaaaaacccc       60
tcaagacccg tttagaggcc ccaagggggtt atgctagtta ttgctcagcg gtggcagcag     120
ccaactcagc ttcctttcgg gctttgttag cagccggatc gatccaagct gtacctcact     180
attcctttgc cctcggacga gtgctggggc gtcggttttcc actatcggcg agtacttcta    240
cacagccatc ggtccagacg gccgcgcttc tgcgggcgat ttgtgtacgc ccgacagtcc     300
cggctccgga tcgacgatt gcgtcgcatc gaccctgcgc ccaagctgca tcatcgaaat      360
tgccgtcaac caagctctga tagagttggt caagaccaat gcggagcata tacgcccgga    420
gccgcggcga tcctgcaagc tccgatgcc tccgctcgaa gtagcgcgtc tgctgctcca    480
tacaagccaa ccacggcctc cagaagaaga tgttggcgac ctcgtattgg gaatccccga    540
acatcgcctc gctccagtca atgaccgctg ttatgcggcc attgtccgtc aggacattgt    600
tggagccgaa atccgcgtgc acgaggtgcc ggacttcggg gcagtcctcg cccaaagca     660 tcagctcatc gagagcctgc gcgacggacg cactgacggt gtcgtccatc acagtttgcc   720
agtgatacac atgggggatca gcaatcgcgc atatgaaatc acgccatgta gtgtattgac   780
cgattccttg cggtccgaat gggccgaacc cgctcgtctg gctaagatcg gccgcagcga   840
tcgcatccat agcctccgcg accggctgca gaacagcggg cagttcggtt tcaggcaggt   900
cttgcaacgt gacaccctgt gcacggcggg agatgcaata ggtcaggctc tcgctgaatt   960
ccccaatgtc aagcacttcc ggaatcggga gcgcggccga tgcaaagtgc cgataaacat  1020
aacgatcttt gtagaaacca tcggcgcagc tatttacccg caggacatat ccacgccctc  1080
ctacatcgaa gctgaaagca cgagattctt cgccctccga gagctgcatc aggtcggaga  1140
```

```
cgctgtcgaa cttttcgatc agaaacttct cgacagacgt cgcggtgagt tcaggctttt   1200
ccatgggtat atctccttct taaagttaaa caaaattatt tctagaggga aaccgttgtg   1260
gtctccctat agtgagtcgt attaatttcg cgggatcgag atctgatcaa cctgcattaa   1320
tgaatcggcc aacgcgcggg gagaggcggt ttgcgtattg ggcgctcttc cgcttcctcg   1380
ctcactgact cgctgcgctc ggtcgttcgg ctgcggcgag cggtatcagc tcactcaaag   1440
gcggtaatac ggttatccac agaatcaggg gataacgcag gaaagaacat gtgagcaaaa   1500
ggccagcaaa aggccaggaa ccgtaaaaag gccgcgttgc tggcgttttt ccataggctc   1560
cgcccccctg acgagcatca caaaaatcga cgctcaagtc agaggtggcg aaacccgaca   1620
ggactataaa gataccaggc gtttccccct ggaagctccc tcgtgcgctc tcctgttccg   1680
accctgccgc ttaccggata cctgtccgcc tttctccctt cgggaagcgt ggcgctttct   1740
caatgctcac gctgtaggta tctcagttcg gtgtaggtcg ttcgctccaa gctgggctgt   1800
gtgcacgaac cccccgttca gcccgaccgc tgcgccttat ccggtaacta tcgtcttgag   1860
tccaacccgg taagacacga cttatcgcca ctggcagcag ccactggtaa caggattagc   1920
agagcgaggt atgtaggcgg tgctacagag ttcttgaagt ggtggcctaa ctacggctac   1980
actagaagga cagtatttgg tatctgcgct ctgctgaagc cagttacctt cggaaaaaga   2040
gttggtagct cttgatccgg caaacaaacc accgctggta gcggtggttt ttttgtttgc   2100
aagcagcaga ttacgcgcag aaaaaaagga tctcaagaag atcctttgat cttttctacg   2160
gggtctgacg ctcagtggaa cgaaaactca cgttaaggga ttttggtcat gacattaacc   2220
tataaaaata ggcgtatcac gaggcccttt cgtctcgcgc gtttcggtga tgacggtgaa   2280
aacctctgac acatgcagct cccggagacg gtcacagctt gtctgtaagc ggatgccggg   2340
agcagacaag cccgtcaggg cgcgtcagcg ggtgttggcg ggtgtcgggg ctggcttaac   2400
tatgcggcat cagagcagat tgtactgaga gtgcaccata tggacatatt gtcgttagaa   2460
cgcggctaca attaatacat aaccttatgt atcatacaca tacgatttag gtgacactat   2520
agaacggcgc gccaagcttg atcccccct cgaggtcgac ggtatcgata agcttctgca   2580
ggaattctga gctagcgaag ttcctattcc gaagttccta ttcttcaaaa agtataggaa   2640
cttcagacgt cctcgagtcc gtcctgtaga acccccaacc cgtgaaatca aaaaactcga   2700
cggcctgtgg gcattcagtc tggatcgcga aaactgtgga attgatccag aattcgctag   2760
cgaagttcct attccgaagt tcctattctc tagaaagtat aggaacttca gatccagaat   2820
tcggtccggg ccatcgtggc ctcttgctct tcaggatgaa gagctatgtt tcgcgccaag   2880
cttggatcct agaactagaa acgtgatgcc acttgttatt gaagtcgatt acagcatcta   2940
ttctgtttta ctatttataa ctttgccatt tctgactttt gaaaactatc tctggatttc   3000
ggtatcgctt tgtgaagatc gagcaaaaga gacgttttgt ggacgcaatg gtccaaatcc   3060
gttctacatg aacaaattgg tcacaatttc cactaaaagt aaataaatgg caagttaaaa   3120
aaggaatatg cattttactg attgcctagg tgagctccaa gagaagttga atctacacgt   3180
ctaccaaccg ctaaaaaaag aaaaacattg atatgtaacc tgattccatt agcttttgac   3240
ttcttcaaca gattctctac ttagatttct aacagaaata ttattactag cacatcattt   3300
tcagtctcac tacagcaaaa aatccaacgg cacaatacag acaacaggag atatcagact   3360
acagagatag atagatgcta ctgcatgtag taagttaaat aaaaggaaaa taaaatgtct   3420
tgctaccaaa actactacag actatgatgc tcaccacagg ccaaatcctg caactaggac   3480
agcattatct tatatatatt gtacaaaaca agcatcaagg aacatttggt ctaggcaatc   3540
```

```
agtacctcgt tctaccatca ccctcagtta tcacatcctt gaaggatcca ttactgggaa    3600
tcatcggcaa cacatgctcc tgatggggca caatgacatc aagaaggtag gggccagggg    3660
tgtccaacat tctctgaatt gccgctctaa gctcttcctt cttcgtcact cgcgctgccg    3720
gtatcccaca agcatcagca aacttgagca tgtttgggaa tatctcgctc tcgctagacg    3780
gatctccaag ataggtgtga gctctattgg acttgtagaa cctatcctcc aactgaacca    3840
ccatacccaa atgctgattg ttcaacaaca atatcttaac tgggagattc tccactctta    3900
tagtggccaa ctcctgaaca ttcatgatga aactaccatc cccatcaatg tcaaccacaa    3960
cagccccagg gttagcaaca gcagcaccaa tagccgcagg caatccaaaa cccatggctc    4020
caagaccccc tgaggtcaac cactgcctcg gtctcttgta cttgtaaaac tgcgcagccc    4080
acatttgatg ctgcccaacc ccagtactaa caatagcatc tccattagtc aactcatcaa    4140
gaacctcgat agcatgctgc ggagaaatcg cgtcctggaa tgtcttgtaa cccaatggaa    4200
acttgtgttt ctgcacatta atctcttctc tccaacctcc aagatcaaac ttaccctcca    4260
ctcctttctc ctccaaaatc atattaattc ccttcaaggc caacttcaaa tccgcgcaaa    4320
ccgacacgtg cgcctgcttg ttcttcccaa tctcggcaga atcaatatca atgtgaacaa    4380 tcttagcccct actagcaaaa gcctcaagct tcccagtaac acggtcatca aaccttaccc    4440
caaaggcaag caacaaatca ctattgtcaa cagcatagtt agcataaaca gtaccatgca    4500
tacccagcat ctgaagggaa tattcatcac caataggaaa agttccaaga cccattaaag    4560
tgctagcaac gggaatacca gtgagttcaa caaagcgcct caattcagca ctggaattca    4620
aactgccacc gccgacgtag agaacgggct tttgggcctc catgatgagt ctgacaatgt    4680
gttccaattg ggcctcggcg gggggcctgg gcagcctggc gaggtaaccg gggaggttaa    4740
cgggctcgtc ccaattaggc acggcgagtt gctgctgaac gtctttggga atgtcgatga    4800
ggaccggacc ggggcggccg gaggtggcga cgaagaaagc ctcggcgacg acgcggggga    4860
tgtcgtcgac gtcgaggatg aggtagttgt gcttcgtgat ggatctgctc acctccacga    4920
tcggggtttc ttggaaggcg tcggtgccga tcatccggcg ggcgacctgg ccggtgatgg    4980
cgacgactgg gacgctgtcc attaaagcgt cggcgaggcc gctcacgagg ttggtggcgc    5040
cggggccgga ggtggcaatg cagacgccgg ggaggccgga ggaacgcgcg tagccttcgg    5100
cggcgaagac gccgccctgc tcgtggcgcg ggagcacgtt gcggatggcg gcggagcgcg    5160
tgagcgcctg gtggatctcc atcgacgcac cgccgggta cgcgaacacc gtcgtcacgc    5220
cctgcctctc cagcgcctcc acaaggatgt ccgcgccctt gcgaggttcg ccggaggcga    5280
accgtgacac gaagggctcc gtggtcggcg cttccttggt gaagggcgcc gccgtggggg    5340
gtttggagat ggaacatttg attttgagag cgtggttggg tttggtgagg gtttgatgag    5400
agagagggag ggtggatcta gtaatgcgtt tggggaaggt ggggtgtgaa gaggaagaag    5460
agaatcgggt ggttctggaa gcggtggccg ccattgtgtt gtgtggcatg gttatacttc    5520
aaaaactgca caacaagcct agagttagta cctaaacagt aaatttacaa cagagagcaa    5580
agacacatgc aaaaatttca gccataaaaa aagttataat agaatttaaa gcaaagtttt    5640
cattttttaa acatatatac aaacaaactg gatttgaagg aagggattaa ttcccctgct    5700
caaagtttga attcctattg tgacctatac tcgaataaaa ttgaagccta aggaatgtat    5760
gagaaacaag aaaacaaaac aaaactacag acaaacaagt acaattacaa aattcgctaa    5820
aattctgtaa tcaccaaacc ccatctcagt cagcacaagg cccaaggttt attttgaaat    5880
aaaaaaaaag tgatttttatt tctcataagc taaaagaaag aaaggcaatt atgaaatgat    5940
```

-continued

```
ttcgactaga tctgaaagtc caacgcgtat tccgcagata ttaaagaaag agtagagttt    6000
cacatggatc ctagatggac ccagttgagg aaaaagcaag gcaaagcaaa ccagaagtgc    6060
aagatccgaa attgaaccac ggaatctagg atttggtaga gggagaagaa aagtaccttg    6120
agaggtagaa gagaagagaa gagcagagag atatatgaac gagtgtgtct tggtctcaac    6180
tctgaagcga tacgagttta gaggggagca ttgagttcca atttataggg aaaccgggtg    6240
gcaggggtga gttaatgacg gaaaagcccc taagtaacga gattggattg tgggttagat    6300
tcaaccgttt gcatccgcgg cttagattgg ggaagtcaga gtgaatctca accgttgact    6360
gagttgaaaa ttgaatgtag caaccaattg agccaacccc agcctttgcc ctttgatttt    6420
gatttgtttg ttgcatactt tttatttgtc ttctggttct gactctcttt ctctcgtttc    6480
aatgccaggt tgcctactcc cacaccactc acaagaagat tctactgtta gtattaaata    6540 tttttaatg tattaaatga tgaatgcttt tgtaaacaga acaagactat gtctaataag     6600
tgtcttgcaa cattttttaa gaaattaaaa aaaatatatt tattatcaaa atcaaatgta    6660
tgaaaaatca tgaataatat aattttatac atttttttaa aaaatctttt aatttcttaa    6720
ttaatatctt aaaaataatg attaatattt aacccaaaat aattagtatg attggtaagg    6780
aagatatcca tgttatgttt ggatgtgagt ttgatctaga gcaaagctta ctagagtcga    6840
ccgatccgtc gacggcgcgc gcgcctctag ttgaagacac gttcatgtct tcatcgtaag    6900
aagacactca gtagtcttcg gccagaatgg cccggaccga agcttctgca ggaattctga    6960
gctagcgaag ttcctattcc gaagttccta ttctctagaa agtataggaa cttcagatcc    7020
actag                                                                7025
```

SOY PROTEIN PRODUCTS HAVING ALTERED CHARACTERISTICS

CROSS-REFERENCE TO RELATED APPLICATION

This application is a continuation of U.S. application Ser. No. 13/630,303, filed Sep. 28, 2012, which is a continuation of U.S. application Ser. No. 12/337,897, filed Dec. 18, 2008 now abandoned, and claims the benefit of U.S. Provisional Application No. 61/015,750, filed Dec. 21, 2007, the entire contents of which are hereby incorporated by reference.

REFERENCE TO SEQUENCE LISTING SUBMITTED ELECTRONICALLY

The official copy of the sequence listing is submitted electronically via EFS-Web as an ASCII formatted sequence listing with a file named 20150521_BB1587USCNT2_ST25_SeqLst.txt created on May 21, 2015 and having a size of 95 kilobytes and is filed concurrently with the specification. The sequence listing contained in this ASCII formatted document is part of the specification and is herein incorporated by reference in its entirety.

FIELD OF THE INVENTION

This invention relates to soy protein products obtained from high oleic soybeans wherein the protein product(s) have improved whiteness, reduced viscosity and reduced gel-strength.

BACKGROUND OF THE INVENTION

Soybeans have the highest protein content of all cereals and legumes. In particular, soybeans have about 40% protein, while other legumes have 20-30%, and cereals have about 8-15% protein. Soybeans also contain about 20% oil with the remaining dry matter mostly carbohydrate (35%). On a wet basis (as is), soybeans contain about 35% protein, 17% oil, 31% carbohydrates and 4.4% ash. Soybean storage protein and lipid bodies are contained in the usable meat of the soybean called the cotyledon. The complex carbohydrate (or dietary fiber) is also contained in the cell walls of the cotyledon. The outer layer of cells (called the seed coat) makes up about 8% of the soybean's total weight. The raw, dehulled soybean is, depending on the variety, approximately 18% oil, 15% insoluble carbohydrates, 14% moisture and ash and 38% protein.

Plant protein materials are used as functional food ingredients, and have numerous applications in enhancing desirable characteristics in food products. Soy protein materials, in particular, have seen extensive use as functional food ingredients. Soy protein materials are used as an emulsifier in meats to bind the meat and give the meat a good texture and a firm bite. Another common application for soy protein materials as functional food ingredients is as a thickening agent to provide a creamy viscosity to the food product.

In general, soy protein materials include soy flakes, soy grits, soy meal, soy flour, soy protein concentrates, and soy protein isolates with a primary difference between these materials being the degree of refinement relative to whole soybeans.

Apart from the soy protein content, flavor, gel-strength, whiteness-index, and viscosity of a soy protein material are also a relevant criteria for the selection of a soy protein material as a functional food ingredient. Conventional soy protein material may have a strong beany, bitter flavor and odor as a result of the presence of certain volatile compounds and/or an undesired appearance due to the presence of other relatively low molecular weight compounds in the soy protein material.

The present disclosure generally relates to a soy protein-containing composition having reduced gel-strength, reduced viscosity, and improved whiteness.

U.S. Pat. No. 6,599,556 B2, issued to Stark et al. on Jul. 29, 2003, describes confectionary products, which include high protein content modified oilseed material.

U.S. Pat. No. 6,716,469 B2, issued to Stark et al. on Apr. 6, 2004, describes frozen dessert products, which include high protein content modified oilseed material.

U.S. Pat. No. 6,720,020 B2, issued to Karleskind et al. on Apr. 13, 2004, describes beverage compositions, which include high protein content modified oilseed material.

JP Patent No. 5,168,416 A1, issued to Takeshi et al. on Jul. 2, 1993, describes obtaining a concentrated soybean having improved taste, flavor and color tone and useful as a food material, etc., with simple operation at a low cost without changing the nature of the protein by washing soybeans, etc., with a water-containing alcohol under weakly acidic condition in the presence of an acid.

JP Patent No. 4,207,159 A1, issued to Hiroko et al on Jul. 29, 1992, describes the title raw material having bright and white color tone and useful for marine and knead eater—dispersed liquid of acid-precipitated soybean protein with an alkali metal hydroxide to control pH.

WO2007013146A1, published Feb. 1, 2007, describes compositions for processed soy protein foods.

SUMMARY OF THE INVENTION

In a first embodiment, the invention concerns a soy protein product obtained from a high oleic soybean wherein said product has at least one characteristic selected from the group consisting of improved whiteness, reduced gel strength and reduced viscosity when compared to a soy protein product obtained from a commodity soybean using the same process as that to obtain the soy protein product from a high oleic soybean.

In a second embodiment, the invention concerns a soy protein product derived from high oleic soybeans having an at least 3% increase in the whiteness index compared to a soy protein product derived from commodity soybean using the same process as that to obtain the soy protein product from a high oleic soybean.

In a third embodiment, the invention concerns an unhydrolyzed soy protein product derived from high oleic soybeans having a reduction of viscosity by at least 9% compared to a soy protein product obtained from a commodity soybean using the same process as that to obtain the soy protein product from a high oleic soybean.

In a fourth embodiment, the invention concerns a soy protein product derived from high oleic soybeans having reduction in gel strength by at least 25% compared to a soy protein product obtained from a commodity soybean using the same process as that to obtain the soy protein product from a high oleic soybean.

In a fifth embodiment the invention concerns soy protein products selected from the group consisting of a soy protein isolate, a soy protein concentrate, soy meal, full fat flour, defatted flour, soymilk powder, soymilk, textured proteins, textured flours, textured concentrates and textured isolates.

In a sixth embodiment the invention concerns a method for improving drying efficiency of a soy protein product, comprising feeding at least one soy protein product obtained from a high oleic soybean seed at higher feed solids to a pasteurizer or a dryer compared to feeding at least one soy protein product obtained from a commodity soybean.

In a seventh embodiment the invention concerns a method for improving drying efficiency of a soy protein product, comprising feeding at least one soy protein product obtained from a high oleic soybean seed at no less than 14% feed solids to a pasteurizer or a dryer.

Additional embodiments of the invention include soy protein products with at least 40%, 65%, or 90% protein (N×6.25) on a moisture-free basis.

In other aspects, the soy protein products of the invention can be used in food, beverages, and animal feed containing the soy protein product of the invention.

BRIEF DESCRIPTION OF THE DRAWINGS AND SEQUENCE LISTINGS

The invention can be more fully understood from the following detailed description and the accompanying drawings and Sequence Listing, which form a part of this application.

Figure 2:
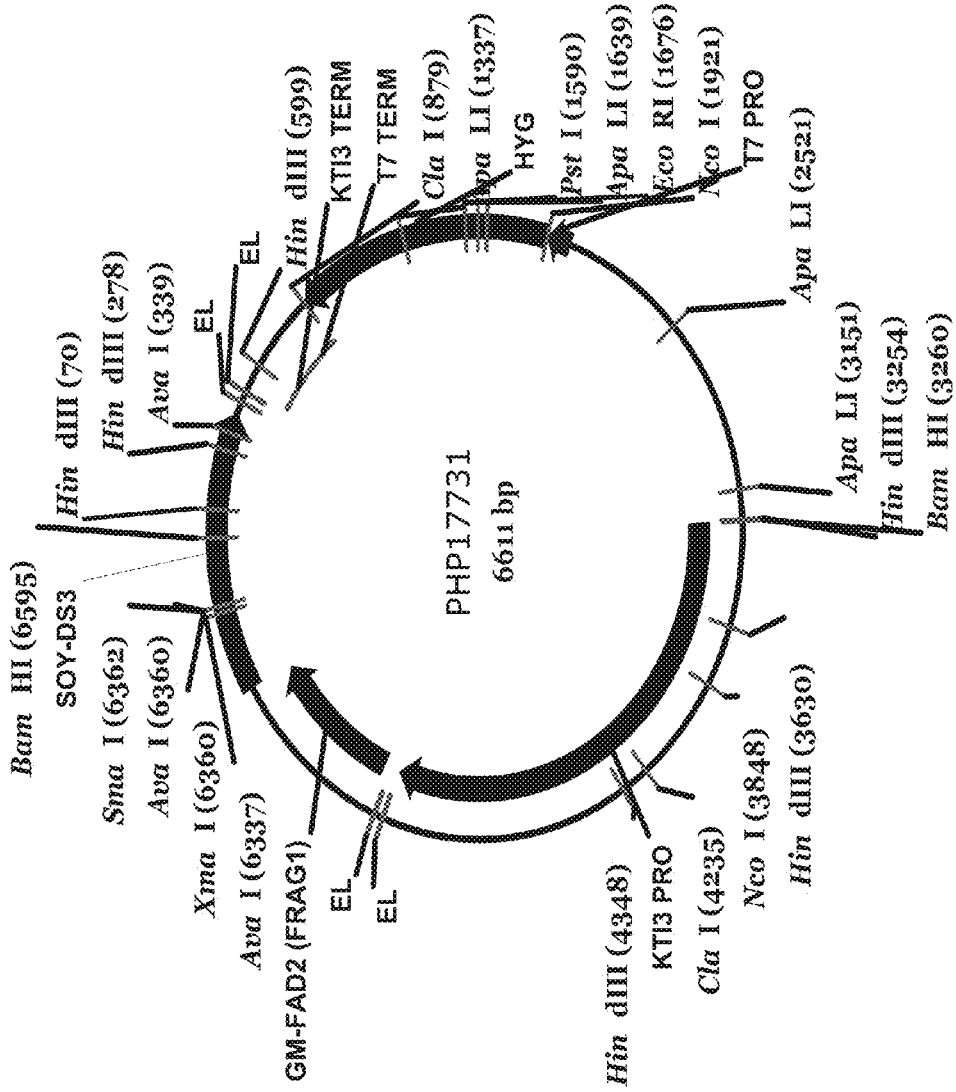
Figure 3:
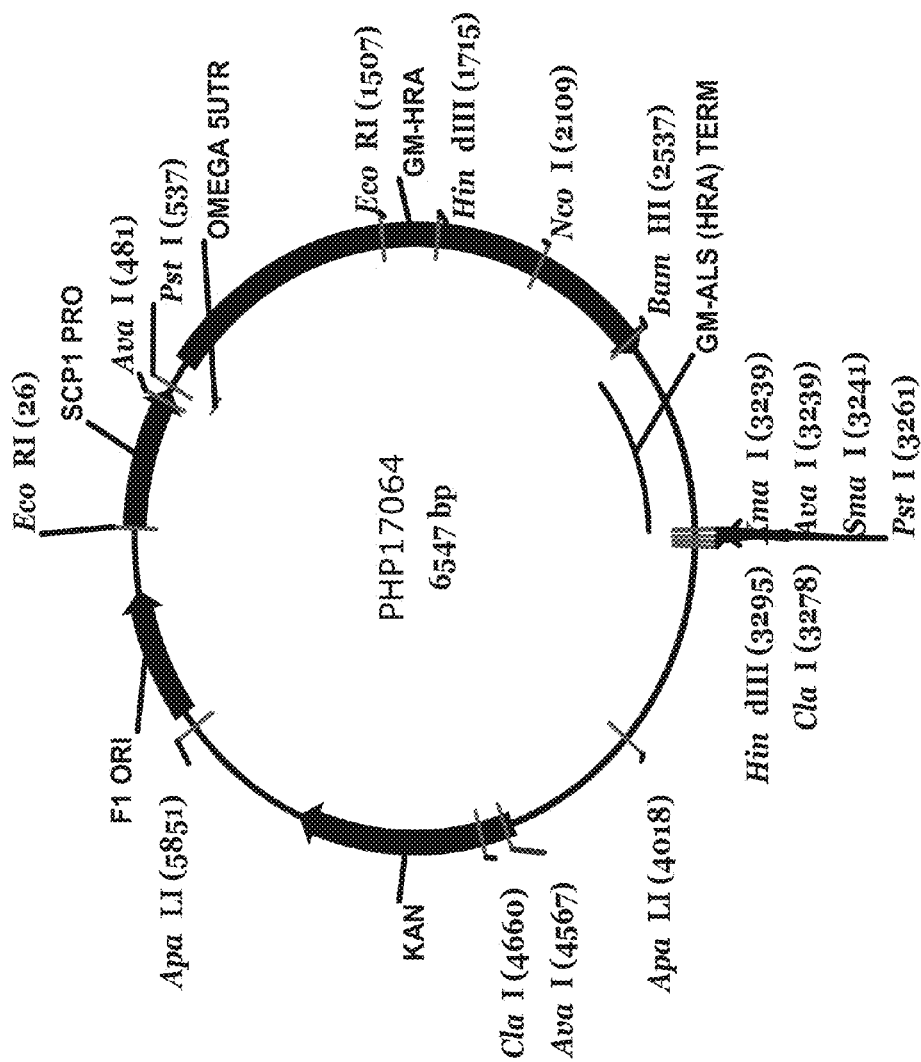
Figure 4:
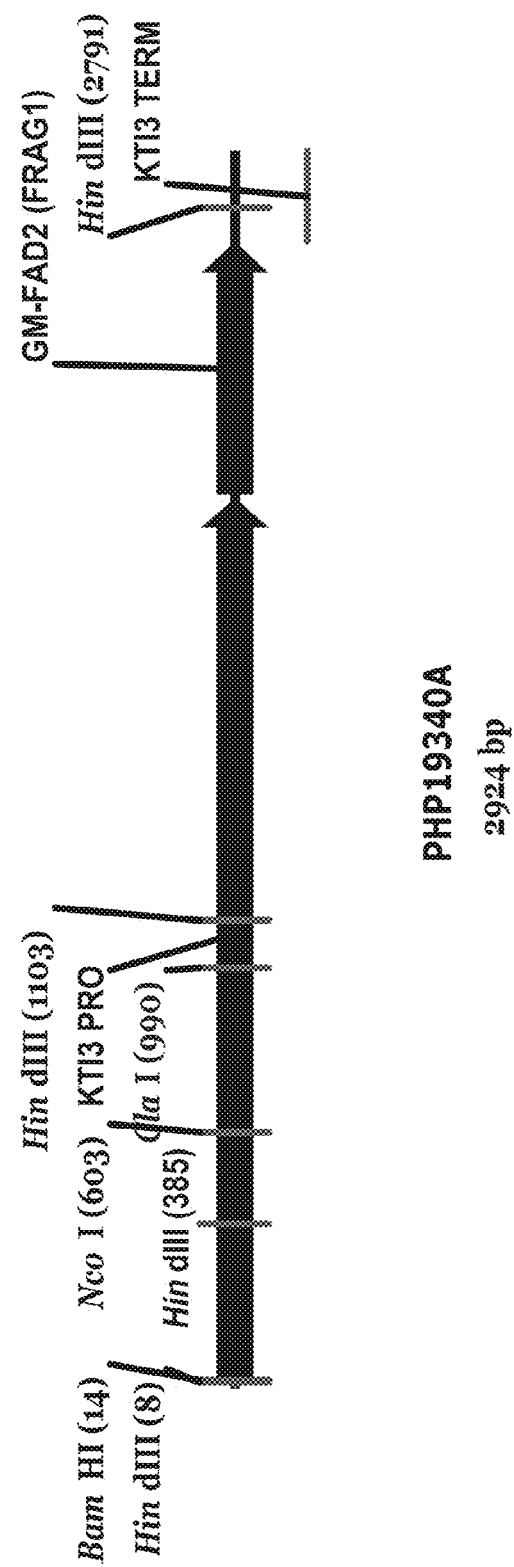
Figure 5:
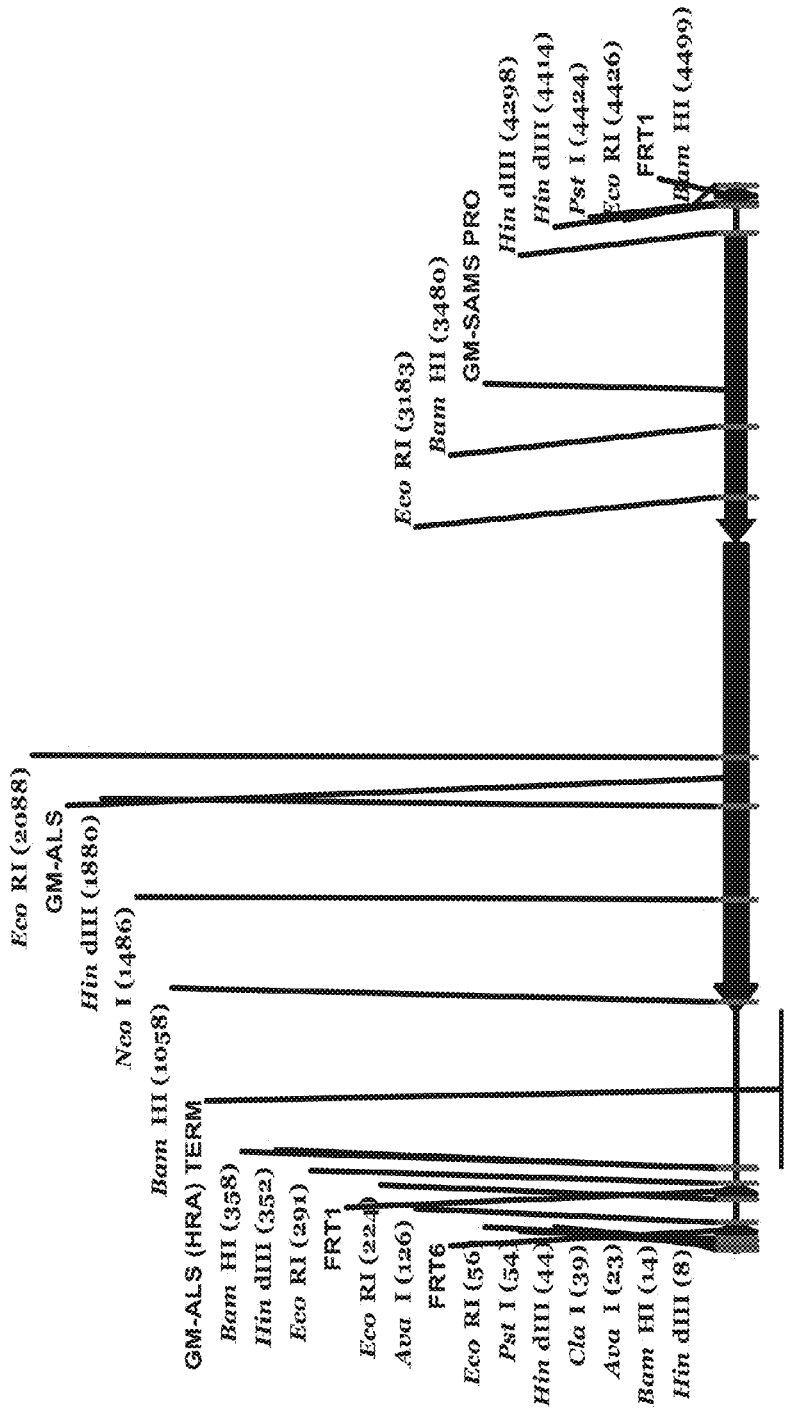
Figure 6:
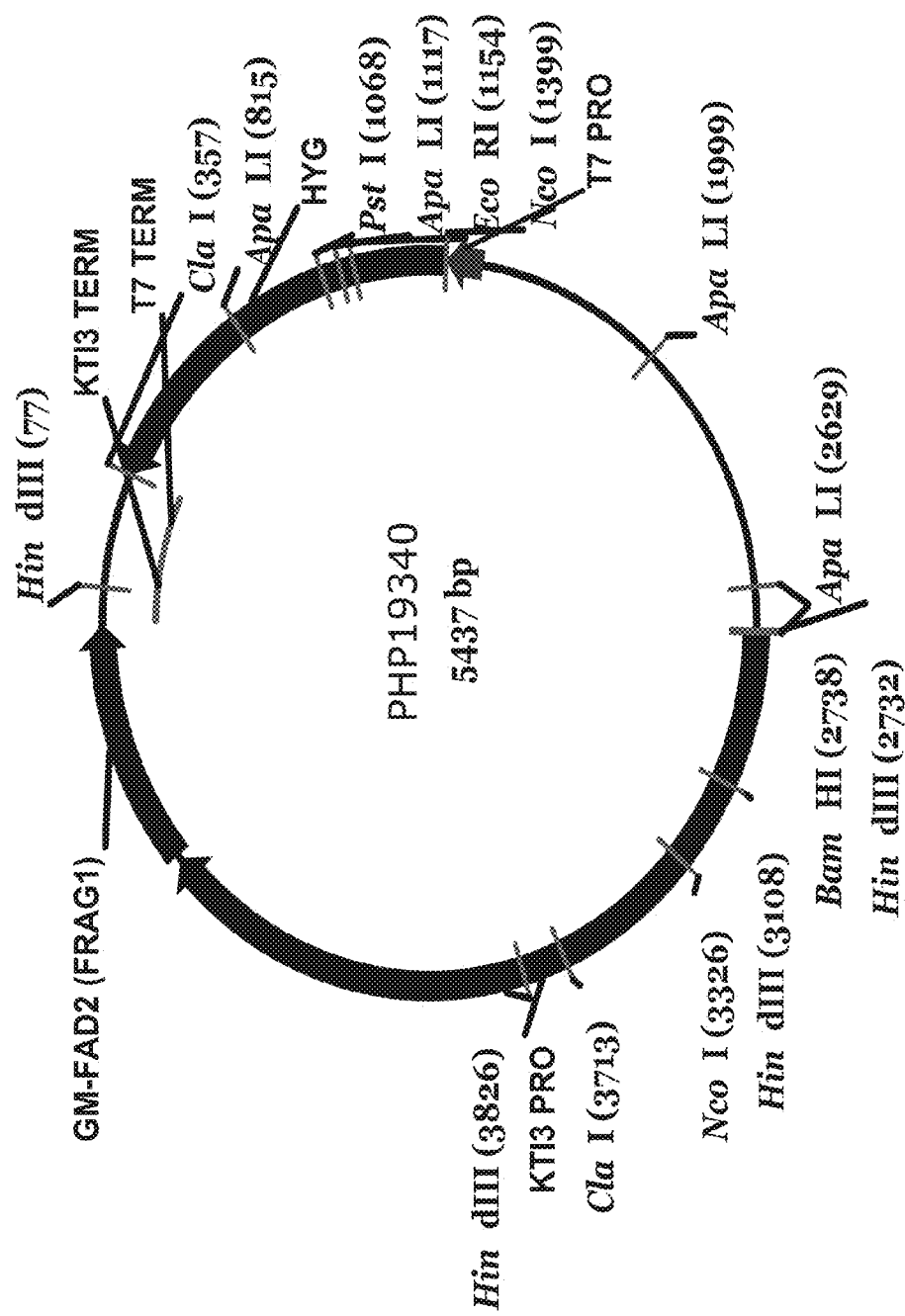
Figure 7:
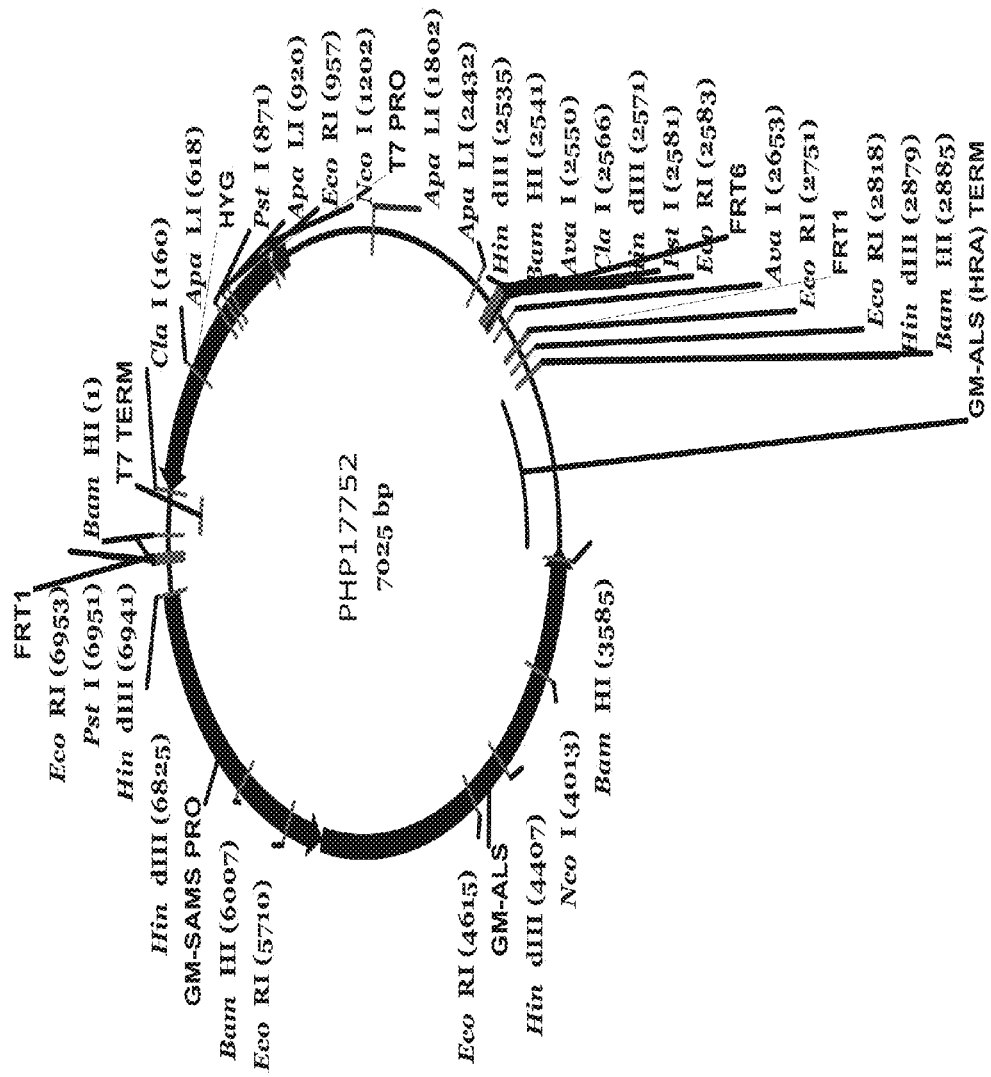

FIG. 1 depicts plasmid pKS210.
FIG. 2 depicts plasmid PHP17731.
FIG. 3 depicts plasmid PHP17064.
FIG. 4 depicts fragment PHP19340A.
FIG. 5 depicts fragment PHP17752A.
FIG. 6 depicts plasmid PHP19340.
FIG. 7 depicts plasmid PHP17752.

SEQ ID NO:1 sets forth the sequence of the recombinant DNA fragment PHP21676A

SEQ ID NO:2 sets forth the sequence of the 1533 polynucleotide fragment comprising 470 nucleotides from the soybean FAD2-2 gene, 420 nucleotides from the soybean FAD2-1 gene, 643 nucleotides from the soybean FAD3 gene.

SEQ ID NO:3 sets forth the nucleotide sequence of oligonucleotide primer BM35 used to amplify an approximately 0.9 Kb fragment from recombinant DNA fragment KSFAD2-hybrid.

SEQ ID NO:4 sets forth the nucleotide sequence of oligonucleotide primer BM39 used to amplify an approximately 0.9 kb fragment from recombinant DNA fragment KSFAD2-hybrid.

SEQ ID NO:5 sets forth the nucleotide sequence of oligonucleotide primer BM40 used to amplify an approximately 0.65 kb DNA fragment from plasmid XF1.

SEQ ID NO:6 sets forth the nucleotide sequence of oligonucleotide plasmid BM41 used to amplify an approximately 0.65 kb DNA fragment from plasmid pXF1.

SEQ ID NO:7 sets forth the nucleotide sequence of recombinant DNA fragment KSFAD2-hybrid which contains about 470 nucleotides from the soybean FAD2-2 gene and 420 nucleotides from the soybean FAD2-1 gene.

SEQ ID NO:8 sets forth the nucleotide sequence of oligonucleotide primer KS1 used to amplify about 470 nucleotides from the soybean FAD2-2 gene.

SEQ ID NO:9 sets forth the nucleotide sequence of oligonucleotide primer KS2 used to amplify about 470 nucleotides of the soybean FAD2-2 gene.

SEQ ID NO:10 sets forth the nucleotide sequence of oligonucleotide primer KS3 used to amplify about 420 nucleotides of the soybean FAD2-1 gene.

SEQ ID NO:11 sets forth the nucleotide sequence of oligonucleotide primer KS4 used to amplify about 420 nucleotides of the soybean FAD2-1 gene.

SEQ ID NO:12 sets forth the nucleotide sequence of the seed-specific gene expression-silencing cassette from pKS133 which comprises nucleotides for a Kti3 promoter and terminator bordering a string of nucleotides that promote formation of a stem structure which are surrounding a unique Not I restriction endonuclease site.

SEQ ID NO:13 sets forth the nucleotide sequence of plasmid pKS210.

SEQ ID NO:14 sets forth the nucleotide sequence of plasmid PHP17731.

SEQ ID NO:15 sets forth the nucleotide sequence of recombinant DNA fragment PHP17731A.

SEQ ID NO:16 sets forth the nucleotide sequence of the ALS selectable marker recombinant DNA fragment. This recombinant DNA fragment comprises a promoter operably linked to a nucleotide fragment encoding a soybean acetolactate synthase to which mutations have been introduced to make it resistant to treatment with sulfonylurea herbicides.

SEQ ID NO:17 sets forth the amino acid sequence of the soybean herbicide-resistant ALS including mutations in subsequences B and F.

SEQ ID NO:18 is the wild type amino acid sequence of conserved ALS "subsequence B" disclosed in U.S. Pat. No. 5,013,659.

SEQ ID NO:19 sets forth the wild type amino acid sequence of conserved ALS "subsequence F" disclosed in U.S. Pat. No. 5,013,659.

SEQ ID NO:20 sets forth the amino acid sequence of the additional five amino acids introduced during cloning at the amino-terminus of the soybean ALS.

SEQ ID NO:21 sets forth the nucleotide sequence of plasmid PHP17064 SEQ ID NO:22 sets forth the nucleotide sequence of recombinant DNA fragment PHP17064A.

SEQ ID NO:23 sets forth the nucleotide sequence of fragment PHP19340A.

SEQ ID NO:24 sets forth the nucleotide sequence of fragment PHP17752A.

SEQ ID NO:25 sets forth the nucleotide sequence of plasmid PHP19340.

SEQ ID NO:26 sets forth the nucleotide sequence of plasmid PHP17752.

The Sequence Listing contains the one letter code for nucleotide sequence characters and the three letter codes for amino acids as defined in conformity with the IUPAC-IUBMB standards described in *Nucleic Acids Res.* 13:3021-3030 (1985) and in the *Biochemical J.* 219 (No. 2):345-373 (1984) which are herein incorporated by reference. The symbols and format used for nucleotide and amino acid sequence data comply with the rules set forth in 37C.F.R. § 1.822.

DETAILED DESCRIPTION OF THE INVENTION

All patents, patent applications, and publications cited herein are incorporated by reference in their entirety.

In the context of this disclosure, a number of terms shall be utilized.

As used herein, "soybean" refers to the species *Glycine max, Glycine soja*, or any species that is sexually cross compatible with *Glycine max*. A "line" is a group of plants of similar parentage that display little or no genetic variation between individuals for a least one trait. Such lines may be created by one or more generations of self-pollination and selection, or vegetative propagation from a single parent including by tissue or cell culture techniques. An "agronomically elite line" or "elite line" refers to a line with desirable agronomic performance that may or may not be used commercially. A "variety", "cultivar", "elite variety", or "elite cultivar" refers to an agronomically superior elite line that has been extensively tested and is or was being used for commercial soybean production. "Mutation" refers to a detectable and heritable genetic change (either spontaneous or induced) not caused by segregation or genetic recombination. "Mutant" refers to an individual, or lineage of individuals, possessing a mutation.

The "whiteness index" of a soy protein product refers to the color of the soy-protein-containing composition. Many soy protein-containing feed compositions will have, to varying degrees, a yellowish or brownish color. In general, the color of these compositions can be "improved," i.e., the "whiteness index" of the product can be increased by the process of the present invention. In general, the whiteness index is determined using a colorimeter which provides the L, a, and b color values for the composition from which the whiteness index may be calculated using a standard expression of the Whiteness Index (WI), WI=L−3b. The L component generally indicates the whiteness or, "lightness", of the sample; L values near 0 indicate a black sample while L values near 100 indicate a white sample. The b value indicates yellow and blue colors present in the sample; positive b values indicate the presence of yellow colors while negative b values indicate the presence of blue colors. The a value, which may be used in other color measurements, indicates red and green colors; positive values indicate the presence of red colors while negative values indicate the presence of green colors. For the b and a values, the absolute value of the measurement increases directly as the intensity of the corresponding color increases. Generally, the colorimeter is standardized using a white standard tile provided with the colorimeter. A sample is then placed into a glass cell which is introduced to the colorimeter. The sample cell is covered with an opaque cover to minimize the possibility of ambient light reaching the detector through the sample and serves as a constant during measurement of the sample. After the reading is taken, the sample cell is emptied and typically refilled as multiple samples of the same material are generally measured and the whiteness index of the material expressed as the average of the measurements. Suitable colorimeters generally include those manufactured by HunterLab (Reston, Va.) including, for example, Model # DP-9000 with Optical Sensor D 25.

Whiteness index measurements of a 5% by weight solids sample of the suspension before and after treatment are determined using a HunterLab DP-9000 colorimeter including an optical sensor D-25, both manufactured by Hunter Associates Laboratory (HunterLab) (Reston, Va.). For the whiteness index measurement in the large scale production platform, protein samples are dispersed on a 5% w/w basis: (5.25 g) is added to deionized water (100 mL). For the whiteness index measurement in the small scale production platform, 1 g protein sample is dispersed in 19 mL of deionized water on a w/v basis. The results obtained using the Hunter Colorimeter are reported in units of L, a, and b. Whiteness Index is calculated from the L and b scale values using the following: Whiteness Index=L−3b.

In addition to the improved color, the soy protein product produced by the processes in the present disclosure can have a reduced viscosity.

Viscosity, gelation and other indicators of structure formation are important properties of soybean proteins since they contribute to the overall utility of the product in use. Proteins contribute to the solidity and elasticity of products by formation of a three dimensional network of aggregated protein molecules which entrap water. It is sometimes desirable to have these properties, for example in the case of meat-like products, or it may be desired to have less functionality, for example in beverage applications. For beverage applications, a lower viscosity may be desirable for sensory, mouthfeel and textural properties of the beverage. Lower viscosity soy protein-containing compositions may be intended for use in liquid products (i.e., beverages); and additionally, in some embodiments, lower viscosity soy protein-containing compositions may be desired for use in meat products.

As used herein, the term "viscosity" means the apparent viscosity of aqueous slurry or a solution as measured with a rotating spindle viscometer utilizing a large annulus, where a particularly preferred rotating spindly viscometer is a Brookfield viscometer. In another embodiment, the apparent viscosity can be measured using a Rapid Visco Analyzer (RVA) viscometer, or an AR-1000 Rheometer.

In general, the term viscosity refers to the apparent viscosity of a slurry or a solution as measured with a rotating spindle viscometer utilizing a large annulus, where a particularly preferred rotating spindle viscometer is a Brookfield viscometer. The apparent viscosity of a soy protein material may be measured, for example, by weighing a sample of the soy material and water to obtain a known ratio of the soy material to water (preferably 1 part soy material to 9 parts water, by weight), combining and mixing the soy material and water in a blender or mixer to form a homogenous slurry of the soy material and water at ambient temperature and neutral pH, and measuring the apparent viscosity of the slurry with the rotating spindle viscometer utilizing a large annulus, operated at approximately 60 revolutions per minute and at a torque of from 30 to 70%.

Another important functional characteristic is the gel forming property of a protein. Protein gelation is important to obtain desirable sensory and textural structures in foods.

The formation of a protein gel is a two step process which initiates through partial denaturation of the protein molecules. As the proteins denature, the viscosity of the slurry increases as a result of an increase in the molecular changes associated with the unfolding proteins. During the second part of the process there is a large increase in viscosity resulting from protein association and development of the molecular network.

Gelation phenomenon requires a driving force to unfold the native protein structure, followed by an aggregation retaining a certain degree of order in the matrix formed by association between protein strands. Protein gelation has been traditionally achieved by heating, but some physical and chemical processes form protein gels in an analogous way to heat-induction. A physical means, besides heat, is high pressure. Chemical means are acidification, enzymatic cross-linking, and use of salts and urea, causing modifications in protein—protein and protein—medium interactions. The characteristics of each gel are different and dependent upon factors like protein concentration, degree of denaturation caused by pH, temperature, ionic strength and/or pressure.

The term "gel-strength" refers to the ability or a measure of a protein to form gels.

The term "fatty acids" refers to long-chain aliphatic acids (alkanoic acids) of varying chain length, from about $C_{12}$ to $C_{22}$ (although both longer and shorter chain-length acids are known). The predominant chain lengths are between $C_{16}$ and $C_{22}$. The structure of a fatty acid is represented by a simple notation system of "X:Y", where X is the total number of C atoms in the particular fatty acid and Y is the number of double bonds.

Generally, fatty acids are classified as saturated or unsaturated. The term "saturated fatty acids" refers to those fatty acids that have no "double bonds" between their carbon backbone. In contrast, "unsaturated fatty acids" have "double bonds" along their carbon backbones (which are most commonly in the cis-configuration). "Monounsaturated fatty acids" have only one "double bond" along the carbon backbone (e.g., usually between the $9^{th}$ and $10^{th}$ carbon atom as for palmitoleic acid (16:1) and oleic acid (18:1)), while "polyunsaturated fatty acids" (or "PUFAs") have at least two double bonds along the carbon backbone (e.g., between the $9^{th}$ and $10^{th}$, and $12^{th}$ and $13^{th}$ carbon atoms for linoleic acid (18:2); and between the $9^{th}$ and $10^{th}$, $12^{th}$ and $13^{th}$, and $15^{th}$ and $16^{th}$ for α-linolenic acid (18:3)).

The term "total fatty acid content" refers to the sum of the five major fatty acid components found in soybeans, namely C16:0, C18:0, C18:1, C18:2, and C18:3. The term "total polyunsaturated fatty acid content" refers to the total C18:2 plus C18:3 content.

For the purposes of the present disclosure, the omega-reference system will be used to indicate the number of carbons, the number of double bonds and the position of the double bond closest to the omega carbon, counting from the omega carbon (which is the terminal carbon of the aliphatic chain and is numbered 1 for this purpose). This nomenclature is shown below in Table 1, in the column titled "Shorthand Notation".

TABLE 1

Nomenclature of Polyunsaturated Fatty Acids

| Common Name | Abbreviation | Chemical Name | Shorthand Notation |
|---|---|---|---|
| Linoleic | LA | cis-9,12-octadecadienoic | 18:2 ω-6 |
| α-Linolenic | αLIN | cis-9,12,15-octadecatrienoic | 18:3 ω-3 |

The term "desaturase" refers to a polypeptide that can desaturate, i.e., introduce a double bond, in one or more fatty acids to produce a mono- or polyunsaturated fatty acid or precursor which is of interest. Despite use of the omega-reference system throughout the specification in reference to specific fatty acids, it is more convenient to indicate the activity of a desaturase by counting from the carboxyl end of the substrate using the Δ-system.

The terms "FAD" and fatty acid desaturase are used interchangeably and refer to membrane bound microsomal oleoyl- and linoleoyl-phosphatidylcholine desaturases that convert oleic acid to linoleic acid and linoleic acid to linolenic acid, respectively, in reactions that reduce molecular oxygen to water and require the presence of NADH.

The term "high oleic soybean" refers to soybean seeds that have an oleic acid content of at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 95% of the seed by weight. Preferred high oleic soybean oil starting materials are disclosed in World Patent Publication WO94/11516, the disclosure of which is hereby incorporated by reference.

The term enzyme "activity" refers to the ability of an enzyme to convert a substrate to a product.

The terms "polynucleotide", "polynucleotide sequence", "nucleic acid sequence", "nucleic acid fragment", and "isolated nucleic acid fragment" are used interchangeably herein. These terms encompass nucleotide sequences and the like. A polynucleotide may be a polymer of RNA or DNA that is single- or double-stranded, that optionally contains synthetic, non-natural or altered nucleotide bases. A polynucleotide in the form of a polymer of DNA may be comprised of one or more segments of cDNA, genomic DNA, synthetic DNA, or mixtures thereof. Nucleotides (usually found in their 5'-monophosphate form) are referred to by a single letter designation as follows: "A" for adenylate or deoxyadenylate (for RNA or DNA, respectively), "C" for cytidylate or deoxycytidylate, "G" for guanylate or deoxyguanylate, "U" for uridylate, "T" for deoxythymidylate, "R" for purines (A or G), "Y" for pyrimidines (C or T), "K" for G or T, "H" for A or C or T, "I" for inosine, and "N" for any nucleotide.

The terms "subfragment that is functionally equivalent" and "functionally equivalent subfragment" are used interchangeably herein. These terms refer to a portion or subsequence of an isolated nucleic acid fragment in which the ability to alter gene expression or produce a certain phenotype is retained whether or not the fragment or subfragment encodes an active enzyme. For example, the fragment or subfragment can be used in the design of chimeric genes to produce the desired phenotype in a transformed plant.

Chimeric genes can be designed for use in suppression by linking a nucleic acid fragment or subfragment thereof, whether or not it encodes an active enzyme, in the sense or antisense orientation relative to a plant promoter sequence.

The terms "homology", "homologous", "substantially similar" and "corresponding substantially" are used interchangeably herein. They refer to nucleic acid fragments wherein changes in one or more nucleotide bases do not affect the ability of the nucleic acid fragment to mediate gene expression or produce a certain phenotype. These terms also refer to modifications of the nucleic acid fragments of the instant invention such as deletion or insertion of one or more nucleotides that do not substantially alter the functional properties of the resulting nucleic acid fragment relative to the initial, unmodified fragment. It is therefore understood, as those skilled in the art will appreciate, that the invention encompasses more than the specific exemplary sequences.

"Gene" refers to a nucleic acid fragment that expresses a specific protein, including regulatory sequences preceding (5' non-coding sequences) and following (3' non-coding sequences) the coding sequence. "Native gene" refers to a gene as found in nature with its own regulatory sequences. "Chimeric gene" refers to any gene that is not a native gene, comprising regulatory and coding sequences that are not found together in nature. Accordingly, a chimeric gene may comprise regulatory sequences and coding sequences that are derived from different sources, or regulatory sequences and coding sequences derived from the same source, but arranged in a manner different than that found in nature. A "foreign" gene refers to a gene not normally found in the host organism, but that is introduced into the host organism by gene transfer. Foreign genes can comprise native genes inserted into a non-native organism, or chimeric genes. A "transgene" is a gene that has been introduced into the genome by a transformation procedure. An "allele" is one of several alternative forms of a gene occupying a given locus on a chromosome. When all the alleles present at a given locus on a chromosome are the same that plant is homozygous at that locus. If the alleles present at a given locus on a chromosome differ that plant is heterozygous at that locus. A "codon-optimized gene" is a gene having its frequency of codon usage designed to mimic the frequency of preferred codon usage of the host cell.

"Coding sequence" refers to a DNA sequence that codes for a specific amino acid sequence. "Regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include, but are not limited to, promoters, translation leader sequences, introns, and polyadenylation recognition sequences.

"Promoter" refers to a region of DNA capable of controlling the expression of a coding sequence or functional RNA. The promoter sequence consists of proximal and more distal upstream elements. These upstream elements are often referred to as enhancers. Accordingly, an "enhancer" is a DNA sequence that can stimulate promoter activity, and may be an innate element of the promoter or a heterologous element inserted to enhance the level or tissue-specificity of a promoter. Promoters may be derived in their entirety from a native gene, or be composed of different elements derived from different promoters found in nature, or even comprise synthetic DNA segments. It is understood by those skilled in the art that different promoters may direct the expression of a gene in different tissues or cell types, or at different stages of development, or in response to different environmental conditions. It is further recognized that since in most cases the exact boundaries of regulatory sequences have not been completely defined, DNA fragments of some variation may have identical promoter activity. Promoters that cause a gene to be expressed in most cell types at most times are commonly referred to as "constitutive promoters". New promoters of various types useful in plant cells are constantly being discovered; numerous examples may be found in the compilation by Okamuro and Goldberg (1989) *Biochemistry of Plants* 15:1-82.

Any seed-specific promoter can be used in accordance with the method of the invention. Thus, the origin of the promoter chosen to drive expression of the recombinant DNA fragment is not critical as long as it is capable of accomplishing the invention by transcribing enough RNA from the desired nucleic acid fragment(s) in the seed.

A plethora of promoters is described in WO 00/18963, published on Apr. 6, 2000, the disclosure of which is hereby incorporated by reference. Examples of seed-specific promoters include, and are not limited to, the promoter for soybean Kunitz trypsin inhibitor (Kti3, Jofuku and Goldberg (1989) *Plant Cell* 1:1079-1093) β-conglycinin (Chen et al. (1989) *Dev. Genet.* 10: 112-122), the napin promoter, and the phaseolin promoter.

Specific examples of promoters that may be useful in expressing the nucleic acid fragments of the invention include, but are not limited to, the SAM synthetase promoter (PCT Publication WO00/37662, published Jun. 29, 2000), the CaMV 35S (Odell et al (1985) *Nature* 313:810-812), and the promoter described in PCT Publication WO02/099063 published Dec. 12, 2002.

The "translation leader sequence" refers to a polynucleotide sequence located between the promoter sequence of a gene and the coding sequence. The translation leader sequence is present in the fully processed mRNA upstream of the translation start sequence. The translation leader sequence may affect processing of the primary transcript to mRNA, mRNA stability or translation efficiency. Examples of translation leader sequences have been described (Turner and Foster (1995) *Mol. Biotechnol.* 3:225-236).

The "3' non-coding sequences" or "transcription terminator/termination sequences" refer to DNA sequences located downstream of a coding sequence and include polyadenylation recognition sequences and other sequences encoding regulatory signals capable of affecting mRNA processing or gene expression. The polyadenylation signal is usually characterized by affecting the addition of polyadenylic acid tracts to the 3' end of the mRNA precursor. The use of different 3'non-coding sequences is exemplified by Ingelbrecht et al. (1989) *Plant Cell* 1:671-680.

An "intron" is an intervening sequence in a gene that does not encode a portion of the protein sequence. Thus, such sequences are transcribed into RNA but are then excised and are not translated. The term is also used for the excised RNA sequences. An "exon" is a portion of the sequence of a gene that is transcribed and is found in the mature messenger RNA derived from the gene, but is not necessarily a part of the sequence that encodes the final gene product.

"RNA transcript" refers to the product resulting from RNA polymerase-catalyzed transcription of a DNA sequence. When the RNA transcript is a perfect complementary copy of the DNA sequence, it is referred to as the primary transcript. An RNA transcript is referred to as the mature RNA when it is an RNA sequence derived from post-transcriptional processing of the primary transcript. "Messenger RNA (mRNA)" refers to the RNA that is without introns and that can be translated into protein by the cell. "cDNA" refers to a DNA that is complementary to and synthesized from a mRNA template using the enzyme reverse transcriptase. The cDNA can be single-stranded or converted into the double-stranded form using the Klenow fragment of DNA polymerase I. "Sense" RNA refers to RNA transcript that includes the mRNA and can be translated into protein within a cell or in vitro. "Antisense RNA" refers to an RNA transcript that is complementary to all or part of a target primary transcript or mRNA, and that blocks the expression of a target gene (U.S. Pat. No. 5,107,065). The complementarity of an antisense RNA may be with any part of the specific gene transcript, i.e., at the 5' non-coding sequence, 3' non-coding sequence, introns, or the coding sequence. "Functional RNA" refers to antisense RNA, ribozyme RNA, or other RNA that may not be translated but yet has an effect on cellular processes. The terms "complement" and "reverse complement" are used interchangeably herein with respect to mRNA transcripts, and are meant to define the antisense RNA of the message.

The term "operably linked" refers to the association of nucleic acid sequences on a single nucleic acid fragment so that the function of one is regulated by the other. For example, a promoter is operably linked with a coding sequence when it is capable of regulating the expression of that coding sequence (i.e., that the coding sequence is under the transcriptional control of the promoter). Coding sequences can be operably linked to regulatory sequences in a sense or antisense orientation. In another example, the complementary RNA regions of the invention can be operably linked, either directly or indirectly, 5' to the target mRNA, or 3' to the target mRNA, or within the target mRNA, or a first complementary region is 5' and its complement is 3' to the target mRNA.

The term "endogenous RNA" refers to any RNA which is encoded by any nucleic acid sequence present in the genome of the host prior to transformation with the recombinant construct of the present invention, whether naturally-occurring or non-naturally occurring, i.e., introduced by recombinant means, mutagenesis, etc.

The term "non-naturally occurring" means artificial, not consistent with what is normally found in nature.

Standard recombinant DNA and molecular cloning techniques used herein are well known in the art and are described more fully in Sambrook et al., Molecular Cloning: A Laboratory Manual; Cold Spring Harbor Laboratory Press: Cold Spring Harbor, 1989. Transformation methods are well known to those skilled in the art and are described below.

"PCR" or "Polymerase Chain Reaction" is a technique for the synthesis of large quantities of specific DNA segments, consists of a series of repetitive cycles (Perkin Elmer Cetus Instruments, Norwalk, Conn.). Typically, the double stranded DNA is heat denatured, the two primers complementary to the 3' boundaries of the target segment are annealed at low temperature and then extended at an intermediate temperature. One set of these three consecutive steps is referred to as a cycle.

The term "recombinant" refers to an artificial combination of two otherwise separated segments of sequence, e.g., by chemical synthesis or by the manipulation of isolated segments of nucleic acids by genetic engineering techniques.

The terms "plasmid", "vector" and "cassette" refer to an extra chromosomal element often carrying genes that are not part of the central metabolism of the cell, and usually in the form of circular double-stranded DNA fragments. Such elements may be autonomously replicating sequences, genome integrating sequences, phage or nucleotide sequences, linear or circular, of a single- or double-stranded DNA or RNA, derived from any source, in which a number of nucleotide sequences have been joined or recombined into a unique construction which is capable of introducing a promoter fragment and DNA sequence for a selected gene product along with appropriate 3'untranslated sequence into a cell. "Transformation cassette" refers to a specific vector containing a foreign gene and having elements in addition to the foreign gene that facilitates transformation of a particular host cell. "Expression cassette" refers to a specific vector containing a foreign gene and having elements in addition to the foreign gene that allow for enhanced expression of that gene in a foreign host.

The terms "recombinant construct", "expression construct", "chimeric construct", "construct", and "recombinant DNA construct" are used interchangeably herein. A recombinant construct comprises an artificial combination of nucleic acid fragments, e.g., regulatory and coding sequences that are not found together in nature. For example, a chimeric construct may comprise regulatory sequences and coding sequences that are derived from different sources, or regulatory sequences and coding sequences derived from the same source, but arranged in a manner different than that found in nature. Such construct may be used by itself or may be used in conjunction with a vector. If a vector is used then the choice of vector is dependent upon the method that will be used to transform host cells as is well known to those skilled in the art. For example, a plasmid vector can be used. The skilled artisan is well aware of the genetic elements that must be present on the vector in order to successfully transform, select and propagate host cells comprising any of the isolated nucleic acid fragments of the invention. The skilled artisan will also recognize that different independent transformation events will result in different levels and patterns of expression (Jones et al., (1985) *EMBO J.* 4:2411-2418; De Almeida et al., (1989) *Mol. Gen. Genetics* 218:78-86), and thus that multiple events must be screened in order to obtain lines displaying the desired expression level and pattern. Such screening may be accomplished by Southern analysis of DNA, Northern analysis of mRNA expression, immunoblotting analysis of protein expression, or phenotypic analysis, among others.

The term "expression", as used herein, refers to the production of a functional end-product e.g., a mRNA or a protein (precursor or mature).

The term "expression cassette" as used herein, refers to a discrete nucleic acid fragment into which a nucleic acid sequence or fragment can be moved.

"Mature" protein refers to a post-translationally processed polypeptide; i.e., one from which any pre- or propeptides present in the primary translation product have been removed. "Precursor" protein refers to the primary product of translation of mRNA; i.e., with pre- and propeptides still present. Pre- and propeptides may be but are not limited to intracellular localization signals.

"Cosuppression" refers to the production of sense RNA transcripts capable of suppressing the expression of identical or substantially similar native genes (U.S. Pat. No. 5,231,020, which issued to Jorgensen et al. on Jul. 27, 1999). Co-suppression constructs in plants have been previously designed by focusing on overexpression of a nucleic acid sequence having homology to a native mRNA, in the sense orientation, which results in the reduction of all RNA having homology to the overexpressed sequence (see Vaucheret et al. (1998) *Plant J.* 16:651-659; and Gura (2000) *Nature* 404:804-808). "Antisense inhibition" refers to the production of antisense RNA transcripts capable of suppressing the expression of the target protein. Plant viral sequences may be used to direct the suppression of proximal mRNA encoding sequences (PCT Publication WO 98/36083 published on Aug. 20, 1998). "Hairpin" structures that incorporate all, or part, of an mRNA encoding sequence in a complementary orientation resulting in a potential "stem-loop" structure for the expressed RNA have been described (PCT Publication WO 99/53050 published on Oct. 21, 1999). In this case the stem is formed by polynucleotides corresponding to the gene of interest inserted in either sense or anti-sense orientation with respect to the promoter and the loop is formed by some polynucleotides of the gene of interest, which do not have a complement in the construct. This increases the frequency of cosuppression or silencing in the recovered transgenic plants. For review of hairpin suppression see Wesley et al. (2003) Methods in Molecular Biology, Plant Functional Genomics: Methods and Protocols 236:273-286. A construct where the stem is formed by at least 30 nucleotides from a gene to be suppressed and the loop is formed by a random nucleotide sequence has also effectively been used for suppression (WO 99/61632 published on Dec. 2, 1999). The use of poly-T and poly-A sequences to generate the stem in the stem-loop structure has also been described (WO 02/00894 published Jan. 3, 2002). Yet another variation includes using synthetic repeats to promote formation of a stem in the stem-loop structure. Transgenic organisms prepared with such recombinant DNA fragment show reduced levels of the protein encoded by the polynucleotide from which the nucleotide fragment forming the loop is derived as described in PCT Publication WO 02/00904, published Jan. 3, 2002. The use of constructs that result in dsRNA has also been described. In these constructs convergent promoters direct transcription of gene-specific sense and antisense RNAs inducing gene suppression (see for example Shi et al. (2000) *RNA* 6:1069-1076; Bastin et al. (2000) *J. Cell Sci.* 113:3321-3328; Giordano et al. (2002) *Genetics* 160:637-

648; LaCountand Donelson, US patent Application No. 20020182223, published Dec. 5, 2002; Tran et al. (2003) *BMC Biotechnol.* 3:21; and Applicant's U.S. Provisional Application No. 60/578,404, filed Jun. 9, 2004).

Other methods for suppressing an enzyme include, but are not limited to, use of polynucleotides that may form a catalytic RNA or may have ribozyme activity (U.S. Pat. No. 4,987,071 issued Jan. 22, 1991), and micro RNA (also called miRNA) interference (Javier et al. (2003) *Nature* 425:257-263).

MicroRNAs (miRNA) are small regulatory RNAs that control gene expression. miRNAs bind to regions of target RNAs and inhibit their translation and, thus, interfere with production of the polypeptide encoded by the target RNA. miRNAs can be designed to be complementary to any region of the target sequence RNA including the 3' untranslated region, coding region, etc. miRNAs are processed from highly structured RNA precursors that are processed by the action of a ribonuclease III termed DICER. While the exact mechanism of action of miRNAs is unknown, it appears that they function to regulate expression of the target gene. See, e.g., U.S. Patent Publication No. 2004/0268441 A1 which was published on Dec. 30, 2004.

The term "expression", as used herein, refers to the production of a functional end-product, be it mRNA or translation of mRNA into a polypeptide.

"Antisense inhibition" refers to the production of antisense RNA transcripts capable of suppressing the expression of the target protein. "Co-suppression" refers to the production of sense RNA transcripts capable of suppressing the expression of identical or substantially similar foreign or endogenous genes (U.S. Pat. No. 5,231,020).

"Overexpression" refers to the production of a functional end-product in transgenic organisms that exceeds levels of production when compared to expression of that functional end-product in a normal, wild type or non-transformed organism.

"Stable transformation" refers to the transfer of a nucleic acid fragment into a genome of a host organism, including both nuclear and organellar genomes, resulting in genetically stable inheritance. In contrast, "transient transformation" refers to the transfer of a nucleic acid fragment into the nucleus, or DNA-containing organelle, of a host organism resulting in gene expression without integration or stable inheritance. Host organisms containing the transformed nucleic acid fragments are referred to as "transgenic" organisms.

Standard recombinant DNA and molecular cloning techniques used herein are well known in the art and are described by Sambrook et al., Molecular Cloning: A Laboratory Manual, 2nd ed., Cold Spring Harbor Laboratory: Cold Spring Harbor, N.Y. (1989); by Silhavy et al., Experiments with Gene Fusions, Cold Spring Harbor Laboratory: Cold Spring Harbor, N.Y. (1984); and by Ausubel et al., Current Protocols in Molecular Biology, published by Greene Publishing Assoc. and Wiley-Interscience (1987). Once the recombinant construct has been made, it may then be introduced into a plant cell or yeast cell of choice by methods well known to those of ordinary skill in the art including, for example, transfection, transformation and electroporation (see below). Oilseed plant cells are the preferred plant cells. The transformed plant cell is then cultured and regenerated under suitable conditions permitting expression of the recombinant construct which is then recovered and purified.

Recombinant constructs may be introduced into one plant cell or, alternatively, a construct may be introduced into separate plant cells.

Expression in a plant cell may be accomplished in a transient or stable fashion as is described above.

Plant parts include differentiated and undifferentiated tissues, including but not limited to: roots, stems, shoots, leaves, pollen, seeds, tumor tissue, and various forms of cells and culture such as single cells, protoplasts, embryos, and callus tissue. The plant tissue may be in plant or in organ, tissue or cell culture.

The term "plant organ" refers to plant tissue or group of tissues that constitute a morphologically and functionally distinct part of a plant. The term "genome" refers to the following: 1. The entire complement of genetic material (genes and non-coding sequences) is present in each cell of an organism, or virus or organelle. 2. A complete set of chromosomes inherited as a (haploid) unit from one parent. The term "stably integrated" refers to the transfer of a nucleic acid fragment into the genome of a host organism or cell resulting in genetically stable inheritance.

Methods for transforming dicots, primarily by use of *Agrobacterium tumefaciens*, and obtaining transgenic plants have been published, among others, for cotton (U.S. Pat. No. 5,004,863, U.S. Pat. No. 5,159,135); soybean (U.S. Pat. No. 5,569,834, U.S. Pat. No. 5,416,011); *Brassica* (U.S. Pat. No. 5,463,174); peanut (Cheng et al. (1996) *Plant Cell Rep.* 15:653-657, McKently et al. (1995) *Plant Cell Rep.* 14:699-703); papaya (Ling et al. (1991) Bio/technology 9:752-758); and pea (Grant et al. (1995) *Plant Cell Rep.* 15:254-258). For a review of other commonly used methods of plant transformation see Newell (2000) Mol. Biotechnol. 16:53-65. One of these methods of transformation uses *Agrobacterium rhizogenes* (Tepfler, and Casse-Delbart (1987) *Microbiol. Sci.* 4:24-28). Transformation of soybeans using direct delivery of DNA has been published using PEG fusion (PCT publication WO 92/17598), electroporation (Chowrira et al. (1995) *Mol. Biotechnol.* 3:17-23; Christou et al. (1987) *Proc. Natl. Acad. Sci. U.S.A.* 84:3962-3966), microinjection, or particle bombardment (McCabe et. al. (1988) *Bio/Technology* 6:923; Christou et al. (1988) *Plant Physiol.* 87:671-674).

There are a variety of methods for the regeneration of plants from plant tissue. The particular method of regeneration will depend on the starting plant tissue and the particular plant species to be regenerated. The regeneration, development and cultivation of plants from single plant protoplast transformants or from various transformed explants is well known in the art (Weissbach and Weissbach, (1988) In: Methods for Plant Molecular Biology, (Eds.), Academic: San Diego, Calif.). This regeneration and growth process typically includes the steps of selection of transformed cells, culturing those individualized cells through the usual stages of embryonic development through the rooted plantlet stage. Transgenic embryos and seeds are similarly regenerated. The resulting transgenic rooted shoots are thereafter planted in an appropriate plant growth medium such as soil. Preferably, the regenerated plants are self-pollinated to provide homozygous transgenic plants. Otherwise, pollen obtained from the regenerated plants is crossed to seed-grown plants of agronomically important lines. Conversely, pollen from plants of these important lines is used to pollinate regenerated plants. A transgenic plant of the present invention containing a desired polypeptide is cultivated using methods well known to one skilled in the art.

In addition to the above discussed procedures, practitioners are familiar with the standard resource materials which describe specific conditions and procedures for the construction, manipulation and isolation of macromolecules (e.g., DNA molecules, plasmids, etc.), generation of recombinant DNA fragments and recombinant expression constructs and the screening and isolating of clones, (see for example, Sambrook et al. (1989) Molecular Cloning: A Laboratory Manual, Cold Spring Harbor: NY; Maliga et al. (1995) Methods in Plant Molecular Biology, Cold Spring Harbor: NY; Birren et al. (1998) Genome Analysis: Detecting Genes, 1, Cold Spring Harbor: NY; Birren et al. (1998) Genome Analysis: Analyzing DNA, 2, Cold Spring Harbor:NY; Plant Molecular Biology: A Laboratory Manual, eds. Clark, Springer: NY (1997)).

In one aspect, the present invention includes protein products derived from high oleic soybeans.

The present invention includes a protein product obtained from high oleic soybeans wherein said product has at least one characteristic selected from the group consisting of improved whiteness, reduced gel strength and reduced viscosity when compared to a soy protein product obtained from a commodity soybean using the same process as that to obtain the soy protein product from a high oleic soybean.

Another embodiment concerns a protein product obtained from high oleic soybeans, wherein the whiteness index is increased by at least 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% when compared to a soy protein product obtained from a commodity soybean using the same process as that to obtain the soy protein product from a high oleic soybean.

An additional embodiment concerns a protein product obtained from high oleic soybeans, wherein the gel strength is reduced by at least 25%, 26%, 27%, 28%, 29%, 30%, 31%, 32%, 33%, 34%, 35%, 36%, 37%, 38%, 39%. 40%, 41%, 42%, 43%, 44%, 45%, 46%, 47%, 48%, 49%, 50%, 51%, 52%, 53%, 54%, 55%, 56%, 57%, 58%, 59%, or 60% when compared to a soy protein product obtained from a commodity soybean using the same process as that to obtain the soy protein product from a high oleic soybean.

An additional embodiment concerns an unhydrolyzed protein product obtained from high oleic soybeans, wherein the gel strength is reduced when compared to a soy protein product obtained from a commodity soybean using the same process as that to obtain the soy protein product from a high oleic soybean.

An additional embodiment concerns an unhydrolyzed protein product obtained from high oleic soybeans, wherein the gel strength is reduced by at least 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% when compared to a soy protein product obtained from a commodity soybean using the same process as that to obtain the soy protein product from a high oleic soybean.

Yet another embodiment concerns a protein product obtained from high oleic soybeans, wherein the viscosity is reduced by at least 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 58%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, or 87%, when compared to a soy protein product obtained from a commodity soybean using the same process as that to obtain the soy protein product from a high oleic soybean.

One advantage to having reduced viscosity is that it improves drying efficiency. Currently with commodity soy there is a limitation in the feed solids concentration that can be fed to the dryer as a result of the viscosity and propensity to aggregate and form a gel as a result of exposure to heat. If commodity soy must be dried at high solids, it is necessary to increase the temperature of the feed solids to prevent protein aggregation with resultant gelling; this increased heat is costly and results in severe damage to the solubility of the protein.

Reduced viscosity and gel properties allow the operator to significantly increase the feed solid concentration, because the slurry can be easily pumped through the equipment at normal temperatures without gelling.

That means that during the drying process, less water has to be removed for every pound fed to the dryer. This translates into decreased energy usage and more solids that can be dried per hour resulting in more protein product for sale.

Another embodiment of the invention concerns a soy protein product selected from the group consisting of a soy protein isolate, a soy protein concentrate, soy meal, full fat flour, defatted flour, soymilk, textured proteins, textured flours, textured concentrates and textured isolates.

As used herein, "soymilk" refers to an aqueous mixture of any one or more of the following, finely ground soybeans, soy flour, soy flakes, soy concentrate, isolated soy protein, soy whey protein, and aqueous extracts of any one or more of the following, soybeans, soy flakes and soy flour where insoluble material has been removed. Soymilk may comprise additional components including but not limited to fats, carbohydrates, sweeteners, colorants, stabilizers, thickeners, flavorings, acids, bases.

One way to prepare soymilk is described below.

The stabilizers (carboxymethylcellulose and carrageenan) are dry-blended with some sugar and added to 90% water. The mix is agitated with moderate to high shear for one minute or until no lumps are observed. Sequestrants agents (potassium citrate, sodium hexametaphosphate and potassium phosphate) are added mixed for one minute. The protein is added and dispersed well. The slurry is heated to 170° F. and hold for 10 minutes. The remaining dry ingredients are added to the protein slurry and mixed for 5 minutes. The soybean oil is added with constant agitation and mixed for three minutes. Vitamins and minerals blend is disperse in 10% water, added to the protein slurry and mixed for 5 minutes. The pH of the slurry is adjusted to 7.0-7.2 using NaOH as needed. The slurry is homogenized at 500 psi (second stage) and 2500 psi (first stage). The slurry is pasteurized by ultra-high temperature (UHT) processing at 141° C. (286° F.) for 6 seconds. The mixture is cooled to 31° C. (88° F.) and packaged in sterilized bottles. The product is stored at refrigerated temperatures.

As used herein, "soymilk powder" refers to a dewatered soymilk. Soymilk may be dewatered by many processes that include but are not limited to spray drying, tray drying, tunnel drying, and freeze drying.

Another embodiment of the invention concerns a method for improving drying efficiency of a soy protein product, comprising feeding at least one soy protein product obtained from a high oleic soybean seed at higher feed solids to a pasteurizer or a dryer compared to feeding at least one soy protein product obtained from a commodity soybean to a pasteurizer or dryer.

An additional embodiment of the invention concerns a method for improving drying efficiency, comprising feeding high oleic soy protein products to a pasteurizer or a dryer at no less than 14%, 15%, 15%, 17%, 18%, 19%, 20%, 21%, 22%, 23%, 24%, 25%, 26%, 27%, 28%, 29%, or 30% feed solids compared to feeding commodity soy protein products using the same process as that to obtain the soy protein product from a high oleic soybean.

Soy protein products fall into three major groups. These groups are based on protein content, and range from 40% to over 90%. All three basic soy protein product groups (except full-fat flours) are derived from defatted flakes. They are the following: soy flours and grits, soy protein concentrates and soy protein isolates. These are discussed more fully below.

As used herein the term "unhydrolyzed protein product", "unhydrolyzed soy protein product" refers to a protein product that has not undergone an enzymatic protein hydrolysis step.

As used herein the term "enzymatic hydrolysis" refers to the breakdown of proteins or chemical compounds by the addition of specific enzymes.

Additional embodiments of the invention include soy protein products with at least 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%,%, 89%, 90%, 91%, 92%, 93%, 94%, 95%, 96% or 97% protein (N×6.25) on a moisture-free basis.

The soy protein products of the invention can be incorporated into food, beverages, and animal feed.

The term "animal feed" refers to food that is given to animals, such as livestock and pets. Some feeds provide a healthy and nutritious diet, while others may be lacking in nutrients. Animals are given a wide range of different feeds, but the two major types of animal feed are processed animal feeds (compound feed) and fodder.

Compound feeds are feedstuffs that are blended from various raw materials and additives. The main ingredients used in commercially prepared feed are the feed grains, which include corn, soybeans, sorghum, oats, and barley. These blends are formulated according to the specific requirements of the target animal (including different types of livestock and pets).

They are manufactured by feed compounders as meal type, pellets or crumbles.

Compound feeds can be complete feeds that provide all the daily required nutrients, concentrates that provide a part of the ration (protein, energy) or supplements that only provide additional micro-nutrients such as minerals and vitamins.

Oxidation and therefore the shelf life of animal feed ingredients is a common problem in the industry. Oxidation is an irreversible chemical reaction in which oxygen reacts with feed and feed components and can result in decreased animal health and performance. The negative effects of oxidation can be seen in loss of palatability, degradation of the oil component, development of unwanted breakdown products, changes in color, and loss of energy. Meat obtained from animals grown on oxidized feed has significantly lower oxidative status compared to animals fed a feed that has not undergone significant oxidation. Meat from animals fed diets containing high oleic corn products show extended shelf life and greater oxidative stability (PCT Publication WO/2006/002052, published Jan. 5, 2006), particularly when combined with antioxidants such as tocols. Therefore it is highly desirable to prevent oxidation of feed and feed ingredients to protect both nutritional value and organoleptic quality.

Synthetic antioxidants are used to preserve feed quality by preventing the oxidation of lipids, which can lead to improved animal performance.

Generally, synthetic antioxidants can act as free radical scavengers and thereby reduce lipid oxidation. Synthetic antioxidants can prolong animal feed shelf-life and protect nutritional and organoleptic quality There are multiple methods to test the oxidation status of solid materials including soybean meal and other soybean protein products including accelerating aging methods which predict a material's shelf-life. One test which can be used is to age a material either at room temperature or elevated temperatures and to measure the oxidative status of the material at specific time points. The OSI instrument is useful in this regard in that it reflects the length of time needed to start the oxidation process known as the induction time. A longer induction time means that the material has greater oxidative stability and thereby shelf-life. Other methods include the measurement of volatiles and color change.

Methods for obtaining soy protein products are well known to those skilled in the art. For example soybean protein products can be obtained in a variety of ways. Conditions typically used to prepare soy protein isolates have been described by (Cho, et al, (1981) U.S. Pat. No. 4,278,597; Goodnight, et al. (1978) U.S. Pat. No. 4,072, 670). Soy protein concentrates are produced by three basic processes: acid leaching (at about pH 4.5), extraction with alcohol (about 55-80%), and denaturing the protein with moist heat prior to extraction with water. Conditions typically used to prepare soy protein concentrates have been described by Pass ((1975) U.S. Pat. No. 8,897,574) and Campbell et al. ((1985) in New Protein Foods, ed. by Altschul and Wilcke, Academic Press, Vol., Chapter 10, *Seed Storage Proteins, pp* 302-338).

"Soybean-containing products" or "Soy products" can be defined as those products containing/incorporating a soy protein product.

For example, "soy protein products" can include, and are not limited to, those items listed in Table 2.

TABLE 2

| Soy Protein Products Derived from Soybean Seeds[a] | |
|---|---|
| Whole Soybean Products | Processed Soy Protein Products |
| Roasted Soybeans | Full Fat and Defatted Flours |
| Baked Soybeans | Soy Grits |
| Soy Sprouts | Soy Hypocotyls |
| Soy Milk | Soybean Meal |
| | Soy Milk |
| | Soy Milk Powder |
| | Soy Protein Isolates |
| Specialty Soy Foods/Ingredients | |
| Soy Milk | Soy Protein Concentrates |
| Tofu | Textured Soy Proteins |
| Tempeh | Textured Flours and Concentrates |
| Miso | Textured Concentrates |
| Soy Sauce | Textured Isolates |
| Hydrolyzed Vegetable Protein | Soy Crisps |
| Whipping Protein | |

[a]See Soy Protein Products: Characteristics, Nutritional Aspects and Utilization (1987). Soy Protein Council.

"Processing" refers to any physical and chemical methods used to obtain the products listed in Table 2 and includes, and is not limited to, heat conditioning, flaking and grinding, extrusion, solvent extraction, or aqueous soaking and extraction of whole or partial seeds. Furthermore, "processing" includes the methods used to concentrate and isolate soy protein from whole or partial seeds, as well as the various traditional Oriental methods in preparing fermented soy food products. Trading Standards and Specifications have been established for many of these products (see National Oilseed Processors Association Yearbook and Trading Rules 1991-1992).

Defatted flakes refer to flaked, dehulled cotyledons that have been defatted and treated with controlled heat to remove the remaining hexane. This term can also refer to a flour or grit that has been ground.

"White" flakes refer to flaked, dehulled cotyledons that have been defatted and treated with controlled heat to remove the remaining hexane. This term can also refer to a flour that has been ground.

"Grits" refer to defatted, dehulled cotyledons having a U.S. Standard screen size of between No. 10 and 80.

"Soy Protein Concentrates" refer to those products produced from dehulled, defatted soybeans and typically contain 65 wt % to 90 wt % soy protein on a moisture free basis. Soy protein concentrates are typically manufactured by three basic processes: acid leaching (at about pH 4.5), extraction with alcohol (about 55-80%), and denaturing the protein with moist heat prior to extraction with water. Conditions typically used to prepare soy protein concentrates have been described by Pass (1975) U.S. Pat. No. 3,897,574; Campbell et al., (1985) in New Protein Foods, ed. by Altschul and Wilcke, Academic Press, Vol. 5, Chapter 10, *Seed Storage Proteins*, pp 302-338).

As used herein, the term "soy protein isolate" or "isolated soy protein" refers to a soy protein containing material that contains at least 90% soy protein by weight on a moisture free basis.

"Extrusion" refers to processes whereby material (grits, flour or concentrate) is passed through a jacketed auger using high pressures and temperatures as a means of altering the texture of the material. "Texturing" and "structuring" refer to extrusion processes used to modify the physical characteristics of the material. The characteristics of these processes, including thermoplastic extrusion, have been described previously (Atkinson (1970) U.S. Pat. No. 3,488,770, Horan (1985) In *New Protein Foods*, ed. by Altschul and Wilcke, Academic Press, Vol. 1A, Chapter 8, pp 367-414). Moreover, conditions used during extrusion processing of complex foodstuff mixtures that include soy protein products have been described previously (Rokey (1983) *Feed Manufacturing Technology III*, 222-237; McCulloch, U.S. Pat. No. 4,454,804).

Residual fatty acid analysis. The commercial process used to de-fat soy flakes with hexane leaves a residue of fatty acids that can act as substrate for generation of off-flavor compounds. Depending on the method of analysis, the residual fat content of hexane-defatted soy flakes can range from, 0.6-1.0% (W:W) (ether extractable; AOCS Method 920.39 (Official Methods of Analysis of the AOAC International (1995), 16$^{th}$ Edition, Method 920.39C, Locator #4.2.01 (modified)) to 2.5-3% (W:W) (acid hydrolysable; AOAC Method 922.06 (Official Methods of Analysis of the AOAC International (1995), 16$^{th}$ Edition, Method 922.06, Locator 32.1.13 (modified)). The principle reason for the discrepancy between these two methods of estimating residual fatty acids is the chemical nature of the fat classes associated with the protein matrix after hexane extraction. A small proportion of the residual fatty acid is in the form of neutral lipid (i.e., triglyceride) and the remainder is present as polar lipid (e.g., phospholipids, a.k.a., lecithin). Because of its polar nature the phospholipid is inaccessible to ether extraction and is only removed from the protein matrix if acid hydrolysis or some other stringent extraction protocol is performed. Therefore, the ether extraction technique gives an estimation of the neutral lipid fraction whereas the acid hydrolysable method gives a better estimate of the total residual fatty acid content (i.e., neutral and polar fractions).

Both of the AOAC methods described above rely on gravimetric determinations of the residual fatty acids and, although in combination they give an indication of the fat classes (neutral vs. polar), such estimates are crude and are subject to interference from other hydrophobic materials (e.g. saponins). Further, no information is obtained on the fatty acid composition and how it may have been affected by various experimental treatments or by the genetics of the starting material. AOAC methods for the determination of the fatty acid composition of residual fatty acids are available (Official Methods of Analysis of the AOAC International (2000), 17$^{th}$ Edition, Method 983.23 Locator 45.4.02, Method 969.33 Locator 41.1.28, Method 996.06 Locator 41.1.28A). These are based on the conversion of residual fatty acids, extracted by acid hydrolysis, to fatty acid methyl esters prior to analysis by gas chromatography. Such techniques are rarely used to assess the residual fatty acid content of food materials in commercial settings although they are used for fatty acid evaluations in support of nutritional labeling. A report in which these methods have been used to determine the residual fatty acid composition of commercial soy protein isolates has recently been published (Solina et al. (2005) Volatile aroma components of soy protein isolate and acid-hydrolysed vegetable protein Food Chemistry 90: 861-873)

A facile method for determining the fatty acid composition of the residual fats in soy protein products is described in Example 24. The advantage of this method over others is that it requires no extraction of the residual fats from the matrix prior to derivatization for GC analysis. Further, the technique is suitable for all forms of fatty acids i.e., whether they are initially present as free fatty acids or as fatty acid esters e.g., tri-glycerides or phospholipids (Chistie (1989) *Gas Chromatography and Lipids*; The Oily Press. Ayr, Scotland). The technique will also remove fatty acids from the protein matrix even if the polar head group of the phospholipid is covalently bound to the protein.

Also, within the scope of this invention are food, food supplements, food bars, and beverages as well as animal feed (such as pet foods) that have incorporated therein a soybean protein product of the invention. The beverage can be in a liquid or in a dry powdered form.

The foods to which the soybean protein product of the invention can be incorporated/added include almost all foods, beverages and feed (such as pet foods). For example, there can be mentioned food supplements, food bars, meats such as meat alternatives, ground meats, emulsified meats, marinated meats, and meats injected with a soybean protein product of the invention. Included may be beverages such as nutritional beverages, sports beverages, protein-fortified beverages, juices, milk, milk alternatives, and weight loss beverages. Mentioned may also be cheeses such as hard and soft cheeses, cream cheese, and cottage cheese. Included may also be frozen desserts such as ice cream, ice milk, low fat frozen desserts, and non-dairy frozen desserts. Finally, yogurts, soups, puddings, bakery products, salad dressings, spreads, and dips (such as mayonnaise and chip dips) may be included.

A soy protein product can be added in an amount selected to deliver a desired amount to a food and/or beverage. The terms "soybean protein product" and "soy protein product" are used interchangeably herein.

Any high oleic soybean seed, whether transgenic or non-transgenic, can be used as a source of soy protein product.

Soybeans with decreased levels of saturated fatty acids have been described resulting from mutation breeding (Erickson et al. (1994) *J. Hered.* 79:465-468; Schnebly et al. (1994) *Crop Sci.* 34:829-833; and Fehr et al. (1991) *Crop Sci.* 31:88-89) and transgenic modification (U.S. Pat. No. 5,530,186). Soybeans with decreased levels of polyunsaturated fatty acids have been described resulting from mutation breeding and selection. Reduced levels of linolenic acid have been achieved at relatively constant linoleic acid (U.S. Pat. No. 5,710,369 and U.S. Pat. No. 5,986,118). Decreased linoleic and linolenic acids combined have also been achieved using mutation breeding, genetic crosses and selection (Rahman, S. M. et al. (2001) Crop Sci. 41:26-29). These methods produced soybean seeds with oil profiles having linolenic acid contents of from 1% to 3% of the total fatty acids and total levels of polyunsaturated fatty acids of about 30 to 35% as compared to greater than 6% linolenic acid and greater than 50% total polyunsaturated fatty acids in commodity soybeans.

The discovery of a method for altering the expression of the enzymes responsible for introduction of the second (international patent publication WO 94/11516) and third (international patent publication WO 93/11245) double bonds into soybean seed storage lipid in a directed manner has allowed the production of soybeans with a high monounsaturated, very low polyunsaturated fatty acid content and especially a very low linolenic acid content. The genetic combination of these two transgene profiles described in U.S. Pat. No. 6,426,448 leads to a soybean line with minimal poly-unsaturates and high mono-unsaturates and extreme environmental stability of the seed fatty acid profile.

The gene for microsomal delta-12 fatty acid desaturases described in WO 94/11516, can be used to make a high oleic acid soybean variety. The resulting high oleic acid soybean variety was one in which the polyunsaturated fatty acids were reduced from 70% of the total fatty acids to less than 5%.

Two soybean fatty acid desaturases, designated FAD2-1 and FAD2-2, are Δ-12 desaturases that introduce a second double bond into oleic acid to form linoleic acid, a polyunsaturated fatty acid. FAD2-1 is expressed only in the developing seed (Heppard et al. (1996) Plant Physiol. 110:311-319). The expression of this gene increases during the period of oil deposition, starting around 19 days after flowering, and its gene product is responsible for the synthesis of the polyunsaturated fatty acids found in soybean oil. GmFad 2-1 is described in detail by Okuley, J. et al. (1994) Plant Cell 6:147-158 and in WO94/11516. It is available from the ATCC in the form of plasmid pSF2-169K (ATCC accession number 69092). FAD 2-2 is expressed in the seed, leaf, root and stem of the soy plant at a constant level and is the "housekeeping" 12-desaturase gene. The Fad 2-2 gene product is responsible for the synthesis of polyunsaturated fatty acids for cell membranes.

Since FAD2-1 is the major enzyme of this type in soybean seeds, reduction in the expression of FAD2-1 results in increased accumulation of oleic acid (18:1) and a corresponding decrease in polyunsaturated fatty acid content.

Reduction of expression of FAD2-2 in combination with FAD2-1 leads to a greater accumulation of oleic acid and corresponding decrease in polyunsaturated fatty acid content.

FAD3 is a Δ-15 desaturase that introduces a third double bond into linoleic acid (18:2) to form linolenic acid (18:3). Reduction of expression of FAD3 in combination with reduction of FAD2-1 and FAD2-2 leads to a greater accumulation of oleic acid and corresponding decrease in polyunsaturated fatty acid content, especially linolenic acid.

Nucleic acid fragments encoding FAD2-1, FAD2-2, and FAD3 have been described in WO 94/11516 and WO 93/11245. Chimeric recombinant constructs comprising all or a part of these nucleic acid fragments or the reverse complements thereof operably linked to at least one suitable regulatory sequence can be constructed wherein expression of the chimeric gene results in an altered fatty acid phenotype. A chimeric recombinant construct can be introduced into soybean plants via transformation techniques well known to those skilled in the art.

Transgenic soybean plants resulting from a transformation with a recombinant DNA are assayed to select plants with altered fatty acid profiles. The recombinant construct may contain all or part of 1) the FAD2-1 gene or 2) the FAD2-2 gene or 3) the FAD3 gene or 4) combinations of all or portions of the FAD2-1, Fad2-2, or FAD3 genes.

Recombinant constructs comprising all or part of 1) the FAD2-1 gene with or without 2) all or part of the Fad2-2 gene with or without all or part of the FAD3 gene can be used in making a transgenic soybean plant having a high oleic phenotype. An altered fatty acid profile, specifically an increase in the proportion of oleic acid and a decrease in the proportion of the polyunsaturated fatty acids, indicates that one or more of the soybean seed FAD genes (FAD2-1, Fad2-2, FAD3) have been suppressed. Assays may be conducted on soybean somatic embryo cultures and seeds to determine suppression of FAD2-1, Fad2-2, or FAD3.

It is well understood by those skilled in the art that recombinant constructs comprising sequences other than those specifically exemplified which have similar functions, may be used. These constructs may include any seed-specific promoter. These constructs may or may not also include any nucleotides that promote stem-loop formation. These constructs may contain a polynucleotide having a nucleotide sequence identical to any portion of the gene or genes mentioned above inserted in sense or anti-sense orientation with respect to the promoter. Finally, these constructs may or may not contain any transcription termination signal.

Once sufficient transgenic seeds having the desired phenotype have been obtained, soy protein products such as protein isolates or whole bean soymilk may be prepared.

EXAMPLES

The present invention is further defined in the following Examples, in which parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. Thus, various modifications of the invention in addition to those shown and described herein will be apparent to those skilled in the art from the foregoing description. Such modifications are also intended to fall within the scope of the appended claims.

The production high oleic soybean lines is described in detail in Examples 3, 5 and 8, but is not limited to the methods described therein.

Example 1

Transformation of Soybean (*Glycine max*)

Embryo Cultures and Regeneration of Soybean Plants.

Soybean embryogenic suspension cultures are transformed by the method of particle gun bombardment using procedures known in the art (Klein et al. (1987) Nature (London) 327:70-73; U.S. Pat. No. 4,945,050; Hazel et al. (1998) Plant Cell. Rep. 17:765-772; Samoylov et al. (1998) In Vitro Cell Dev. Biol.-Plant 34:8-13). In particle gun bombardment procedures it is possible to use purified 1) entire plasmid DNA or, 2) DNA fragments containing only the recombinant DNA expression cassette(s) of interest.

Stock tissue for transformation experiments are obtained by initiation from soybean immature seeds. Secondary embryos are excised from explants after 6 to 8 weeks on culture initiation medium. The initiation medium is an agar-solidified modified MS (Murashige and Skoog (1962) *Physiol. Plant.* 15:473-497) medium supplemented with vitamins, 2,4-D and glucose. Secondary embryos are placed in flasks in liquid culture maintenance medium and maintained for 7-9 days on a gyratory shaker at 26+/−2° C. under ~80 µEm-2s-1 light intensity. The culture maintenance medium is a modified MS medium supplemented with vitamins, 2,4-D, sucrose and asparagine. Prior to bombardment, clumps of tissue are removed from the flasks and moved to an empty 60×15 mm petri dish for bombardment. Tissue is dried by blotting on Whatman #2 filter paper. Approximately 100-200 mg of tissue corresponding to 10-20 clumps (1-5 mm in size each) are used per plate of bombarded tissue.

After bombardment, tissue from each bombarded plate is divided and placed into two flasks of liquid culture maintenance medium per plate of bombarded tissue. Seven days post bombardment, the liquid medium in each flask is replaced with fresh culture maintenance medium supplemented with 100 ng/ml selective agent (selection medium). For selection of transformed soybean cells the selective agent used can be a sulfonylurea (SU) compound with the chemical name, 2-chloro-N-((4-methoxy-6 methy-1,3,5-triazine-2-yl)aminocarbonyl)benzenesulfonamide (common names: DPX-W4189 and chlorsulfuron). Chlorsulfuron is the active ingredient in the DuPont sulfonylurea herbicide, GLEAN®. The selection medium containing SU is replaced every week for 6-8 weeks. After the 6-8 week selection period, islands of green, transformed tissue are observed growing from untransformed, necrotic embryogenic clusters. These putative transgenic events are isolated and kept in media with SU at 100 ng/ml for another 2-6 weeks with media changes every 1-2 weeks to generate new, clonally propagated, transformed embryogenic suspension cultures. Embryos spend a total of around 8-12 weeks in contact with SU. Suspension cultures are subcultured and maintained as clusters of immature embryos and also regenerated into whole plants by maturation and germination of individual somatic embryos.

Example 2

Fatty Acid Analysis of Soybeans

In order to determine altered fatty acid composition as a result of suppression of the fatty acid desaturase, the relative amounts of the fatty acids, palmitic, stearic, oleic, linoleic and linolenic, can be determined as follows. Fatty acid methyl esters are prepared from single, mature, somatic soybean embryos or soybean seed chips by transesterification. One embryo, or a chip from a seed, is placed in a vial containing 50 µL of trimethylsulfonium hydroxide and incubated for 30 minutes at room temperature while shaking. After 30 minutes 0.5 mL of hexane is added, the sample is mixed and allowed to settle for 15 to 30 minutes to allow the fatty acids to partition into the hexane phase. Fatty acid methyl esters (5 µL from hexane layer) are injected, separated, and quantified using a Hewlett-Packard 6890 Gas Chromatograph fitted with an Omegawax 320 fused silica capillary column (Supelco Inc., Cat#24152). The oven temperature is programmed to hold at 220° C. for 2.7 minutes, increase to 240° C. at 20° C. per minute, and then hold for an additional 2.3 minutes. Carrier gas is supplied with a Whatman hydrogen generator. Retention times were compared to those for methyl esters of commercially available standards (Nu-Chek Prep, Inc. catalog #U-99-A).

Example 3

Production of Soybeans with High Levels Oleic Acid and/or High Levels of Stearic Acid and/or Low Levels of Polyunsaturated Fatty Acids by Suppression of Fatty Acid Desaturases Recombinant DNA fragments were prepared and used in transformation of soybean for the simultaneous suppression of fatty acid desaturases FAD2-1 and FAD2-2 and fatty acid desaturase FAD3. A description of the construction of the recombinant DNA fragments follows.

A. Recombinant DNA Fragment PHP21676A

Recombinant DNA fragment PHP21676A contains a gene expression silencing cassette designed to silence expression of the FAD2-1 and FAD2-2 genes, and the FAD3 gene, linked in a head to head configuration to the ALS selectable marker recombinant DNA fragment of Example 1D below. The nucleotide sequence of recombinant DNA fragment PHP21676A is shown in SEQ ID NO:1. Recombinant DNA fragment PHP21676A contains in 5' to 3' orientation:

a) the complementary strand of the ALS selectable marker recombinant DNA fragment of Example 1D below,
b) about 2088 nucleotides of the Kti3 promoter,
c) a 74-nucleotide synthetic sequence,
d) an approximately 1500 polynucleotide fragment comprising about 470 nucleotides from the soybean FAD2-2 gene, 420 nucleotides from the soybean FAD2-1 gene, and 643 nucleotides from the soybean FAD3 gene inserted at a unique Not I restriction endonuclease site,
e) an inverted repeat of the 74-nucleotide synthetic sequence in c), and
f) about 202 nucleotides of the Kti3 transcription terminator.

The sequence of the approximately 1500 polynucleotide fragment of item d) above is shown in SEQ ID NO:2. The approximately 1500 polynucleotide fragment comprising about 470 nucleotides from the soybean FAD2-2 gene, about 420 nucleotides from the soybean FAD2-1 gene, about 643 nucleotides from the soybean FAD3 gene was constructed by PCR amplification as follows.

An approximately 0.9 kb DNA fragment, comprising a portion of the soybean FAD2-2 gene and a portion of the soybean FAD2-1 gene, was obtained by PCR amplification using primers BM35 (SEQ ID NO:3) and BM39 (SEQ ID NO:4) and using as a template, recombinant DNA fragment KSFAD2-hybrid, described in Example 1B below.

An approximately 0.65 kb DNA fragment, comprising a portion of a FAD3 gene, was obtained by PCR amplification using primers BM40 (SEQ ID NO:5) and BM41 (SEQ ID NO:6) and using plasmid pXF1 as template. Plasmid pXF1 comprises a polynucleotide encoding a soybean delta-15 desaturase (FAD3) and is described in U.S. Pat. No. 5,952,544 issued on Sep. 14, 1999. Plasmid pXF1 was deposited with the American Type Culture Collection (ATCC) of Rockville, Md. on Dec. 3, 1991 under the provisions of the Budapest Treaty, and bears Accession Number ATCC 68874.

The approximately 0.9 kb fragment, comprising a portion of the soybean FAD2-2 gene and a portion of the soybean FAD2-1 gene, and the approximately 0.65 kb fragment, comprising a portion of a FAD3 gene, were mixed and used as template for a PCR amplification with BM35 and BM41 as primers to yield an approximately 1533 bp fragment that was cloned into the commercially available plasmid pCR2.1 using the TOPO TA Cloning Kit (Invitrogen).

After digestion with NotI the approximately 1500 bp fragment having the nucleotide sequence shown in SEQ ID NO:2 was ligated into the NotI site of plasmid pKS210 (Example 1C below).

B. Recombinant DNA Fragment KSFAD2-Hybrid

Recombinant DNA Fragment KSFAD2-hybrid contains an approximately 890 polynucleotide fragment comprising about 470 nucleotides from the soybean FAD2-2 gene and 420 nucleotides from the soybean FAD2-1 gene. The nucleotide sequence of recombinant DNA fragment KSFAD2-hybrid is shown in SEQ ID NO:7 Recombinant DNA Fragment KSFAD2-hybrid was constructed as follows.

An approximately 0.47 kb DNA fragment comprising a portion of the soybean FAD2-2 gene was obtained by PCR amplification using primers KS1 (SEQ ID NO:8) and KS2 (SEQ ID NO:9) and using genomic DNA purified from leaves of *Glycine max* cv. Jack as a template.

An approximately 0.42 kb DNA fragment comprising a portion of the soybean FAD2-1 gene was obtained by PCR amplification using primers KS3 (SEQ ID NO:10) and KS4 (SEQ ID NO:11) and using genomic DNA purified from leaves of *Glycine max* cv. Jack as a template.

The 0.47 kb fragment comprising a portion of the soybean FAD2-2 gene and the 0.42 kb fragment comprising a portion of the soybean FAD2-1 gene were gel purified using GeneClean (Qbiogene, Irvine, Calif.), mixed, and used as template for PCR amplification with KS1 and KS4 as primers to yield an approximately 890 bp fragment that was cloned into the commercially available plasmid pGEM-T Easy (Promega, Madison, Wis.) to create a plasmid comprising recombinant DNA Fragment KSFAD2-hybrid.

C. Preparation of Plasmid pKS210 and Plasmid PHP17731

Plasmid pKS210 is derived from the commercially available cloning vector pSP72 (Promega). The beta lactamase coding region has been replaced by a hygromycin phosphotransferase gene for use as a selectable marker in *E. coli*. In addition, a gene expression silencing cassette linked in a head to head configuration to the ALS selectable marker recombinant DNA fragment of Example 1B has been added. The gene expression silencing cassette in plasmid pKS210 comprises the KTi3 promoter, a 74 nucleotide synthetic sequence, a unique NotI restriction endonuclease site, an inverted repeat of the 74 nucleotide synthetic sequence, and the Kti3 terminator region. The gene encoding Kti3 has been described (Jofuku and Goldberg (1989) *Plant Cell* 1:1079-1093). The 74-nucleotide synthetic sequences of c) and e) (above) promote formation of a stem structure. Insertion of a nucleotide fragment from a desired gene in the unique Not I site has been shown to result in suppression of the desired gene as described in PCT Publication WO 02/00904, published 3 Jan. 2002. The nucleotide sequence of this seed-specific gene expression-silencing cassette from pKS133 is shown in SEQ ID NO:12. A map of plasmid pKS210 is shown in FIG. 1 and its nucleotide sequence is disclosed in SEQ ID NO:13.

The recombinant plasmid PHP17731, containing gene sequences for the simultaneous silencing of one of the soybean delta-9 desaturase genes and the soybean delta-12 desaturase gene FAD2-1, was prepared. The soybean KTI promoter, terminator regions along with a synthetic inverted repeat sequence were taken from plasmid KS133 (WO 2002016565A2, A3). A fragment of the FAD2-1 gene was amplified by PCR using soybean genomic DNA and the sequence in SEQ ID NO 5 of U.S. Pat. No. 6,372,965 B1 as template to produce the fragment of base pairs 5423 to 6033 of SEQ ID NO:14 (PHP17731). Adjacent to that fragment a portion of the coding sequence of copy 3 of the soybean delta-9 desaturase (sequence 1 of WO 2002016565A2, A3) was placed, which now comprises bases 6054 to 411 of PHP17731. Fragment PHP17731A (SEQ ID NO:15) was removed from cloning vector PHP17731 bp digestion with restriction endonuclease AscI and purified as described in section E below. A map of plasmid PHP17731 is shown in FIG. 2.

D. ALS Selectable Marker Recombinant DNA Fragment

A recombinant DNA fragment comprising a constitutive promoter directing expression of a mutant soybean acetolactate synthase (ALS) gene followed by the soybean ALS 3' transcription terminator was used as a selectable marker for soybean transformation. The constitutive promoter used is a 1.3-Kb DNA fragment that functions as the promoter for a soybean S-adenosylmethionine synthase (SAMS) gene and is described in PCT publication No. WO 00/37662 published 29 Jun. 2000. The nucleotide sequence of this recombinant DNA fragment used as a selectable marker is shown in SEQ ID NO:16. The mutant soybean ALS gene encodes an enzyme that is resistant to inhibitors of ALS, such as sulfonylurea herbicides. The deduced amino acid sequence of the mutant soybean ALS present in the recombinant DNA fragment used as a selectable marker is shown in SEQ ID NO:17.

Mutant plant ALS genes encoding enzymes resistant to sulfonylurea herbicides are described in U.S. Pat. No. 5,013,659. One such mutant is the tobacco SURB-Hra gene, which encodes a herbicide-resistant ALS with two substitutions in the amino acid sequence of the protein. This tobacco herbicide-resistant ALS contains alanine instead of proline at position 191 in the conserved "subsequence B" (SEQ ID NO:18) and leucine instead of tryptophan at position 568 in the conserved "subsequence F" (SEQ ID NO:19) (U.S. Pat. No. 5,013,659; Lee et al. (1988) EMBO J 7:1241-1248).

The ALS selectable marker recombinant DNA fragment was constructed using a polynucleotide for a soybean ALS to which the two Hra-like mutations were introduced by site directed mutagenesis. Thus, this recombinant DNA fragment will translate to a soybean ALS having alanine instead of proline at position 183 and leucine instead of tryptophan at position 560.

In addition, during construction of the SAMS promoter-mutant ALS expression cassette, the coding region of the soybean ALS gene was extended at the 5'-end by five additional codons, resulting in five amino acids (M-P-H-N-T; SEQ ID NO:20), added to the amino-terminus of the ALS protein. These extra amino acids are adjacent to and presumably removed with the transit peptide during targeting of the mutant soybean ALS protein to the plastid. A DNA fragment comprising a polynucleotide encoding the soybean ALS was digested with KpnI, blunt ended with T4 DNA polymerase, digested with SalI, and inserted into a plasmid containing the SAMS promoter which had been previously digested with NcoI and blunt ended by filling-in with Klenow DNA polymerase.

A second selectable marker plasmid and subsequent fragment was prepared by substituting an alternative constitutively expressed plant promoter for the SAMS promoter described above. The synthetic promoter SCP1 (U.S. Pat. No. 6,072,050) was placed in front of the mutant soybean ALS coding sequence to form plasmid PHP17064 (SEQ ID NO 21 and FIG. 3). For use in soybean transformation fragment PHP17064A (SEQ ID NO:22) was excised from its cloning vector using restriction endonuclease XbaI and purified as described in section E below.

E. Preparation of Recombinant DNA Fragments, PHP21676A, PHP17731A and PHP17064A, for Soybean Transformation.

For use in plant transformation experiments, the 7993 bp recombinant DNA fragment PHP21676A was removed from its cloning plasmid using restriction endonuclease AscI. Each one of the recombinant DNA fragments PHP21676A, PHP17731A and PHP17064A was separated from the remaining plasmid DNA by agarose gel electrophoresis. Precipitation of the recombinant DNA fragment onto gold particles and soybean transformation was performed as described in Example 1. For every eight bombardment transformations, 30 μl of solution were prepared with 3 mg of 0.6 μm gold particles and 1 to 90 picograms (pg) of DNA fragment per base pair of DNA fragment.

Alternatively, mixtures of fragments PHP17064A and PHP17731A at either equal parts or two parts PHP17731A to PHP17064A were added to gold particles at the same weight per base pair as described above and used in transformation to silence the delta-9 and delta-12 desaturase genes.

Example 4

Fatty Acid Analysis of Soybean Transformed with Recombinant DNA Fragments PHP21676A and with PHP17064A and PHP17731A Combined In a soybean transformation experiment using recombinant DNA fragment PHP21676A as described above, 67 independently transformed embryogenic suspension cultures found to be resistant to sulfonylurea herbicide were obtained. An increase in oleic acid as a percentage of the five major fatty acids, palmitic, stearic, oleic, linoleic and linolenic, is indicative of suppression of the FAD2 genes. Thirteen of the 67 herbicide resistant embryogenic suspension cultures (19%) produced somatic embryos with greater than 25% oleic acid, compared to about 8% oleic acid for untransformed embryos.

Plants were regenerated and T1 seeds were produced from 9 of the 13 events. Seeds were tested for suppression of fatty acid desaturases by measuring fatty acid composition of the seed oil as described in Example 2. Plants derived from 5 transformation events produced seeds exhibiting the high oleic acid-low polyunsaturated fatty acid phenotype.

In a soybean transformation experiment, using the mixture of recombinant DNA fragments PHP17064A and PHP17731A, transformed embryogenic suspension cultures found to be resistant to sulfonylurea herbicide were obtained, screened for the number of copies of the transgene fragments present by southern analysis and then by fatty acid profile of the somatic embryo. A rise in the level of stearic and of oleic acid was taken as indicator of silencing of the seed expressed delta-9 desaturase and delta-12 desaturase. Thirty-three transformed candidate lines were regenerated to mature soybean plants and seed from the initial transformants was analyzed for fatty acid profile. From these lines further selections were made from seed obtained from selfed plants in two additional generations. One candidate line was chosen in which the sum of linoleic and linolenic acid was less than 14% of total fatty acids and in which the stearic acid content was greater than 16% of total fatty acids.

Example 5

Genetic Material Used to Produce the High Oleic Trait (Version 1)

High oleic soybeans were prepared by recombinant manipulation of the activity of oleoyl 12-desaturase.

GmFad 2-1 was placed under the control of a strong, seed-specific promoter derived from the α'-subunit of the soybean (*Glycine max*) β-conglycinin gene. This promoter allows high level, seed specific expression of the trait gene. It spans the 606 bp upstream of the start codon of the α' subunit of the *Glycine max* β-congylcinin storage protein. The β-conglycinin promoter sequence represents an allele of the published β-conglycinin gene (Doyle et al., (1986) J. Biol. Chem. 261:9228-9238) having differences at 27 nucleotide positions. It has been shown to maintain seed specific expression patterns in transgenic plants (Barker et al., (1988) Proc. Natl. Acad. Sci. 85:458-462 and Beachy et al., (1985) EMBO J. 4:3047-3053). The reading frame was terminated with a 3' fragment from the phaseolin gene of green bean (*Phaseolus vulgaris*). This is a 1174 bp stretch of sequences 3' of the *Phaseolus vulgaris* phaseolin gene stop codon (originated from clone described in Doyle et al., 1986).

The GmFad 2-1 open reading frame (ORF) was in a sense orientation with respect to the promoter so as to produce a gene silencing of the sense GmFad 2-1 cDNA and the endogenous GmFad 2-1 gene. This phenomenon, known as "sense suppression" is an effective method for deliberately turning off genes in plants and is described in U.S. Pat. No. 5,034,323.

For maintenance and replication of the plasmid in *E. coli* the GmFad 2-1 transcriptional unit described above was cloned into plasmid pGEM-9z(−) (Promega Biotech, Madison Wis., USA).

For identification of transformed soybean plants the β-glucuronidase gene (GUS) from *E. coli* was used. The cassette used consisted of the three modules; the Cauliflower Mosaic Virus 35S promoter, the β-glucuronidase gene (GUS) from *E. coli* and a 0.77 kb DNA fragment containing the gene terminator from the nopaline synthase (NOS) gene of the Ti-plasmid of *Agrobacterium tumefaciens*. The 35S promoter is a 1.4 kb promoter region from CaMV for constitutive gene expression in most plant tissues (Odell et al. (1985) Nature 303:810-812), the GUS gene a 1.85 kb fragment encoding the enzyme β-glucuronidase (Jefferson et al. (1986) PNAS USA 83:8447-8451) and the NOS terminator a portion of the 3' end of the nopaline synthase coding region (Fraley et al., (1983) PNAS US 80:4803-4807). The GUS cassette was cloned into the GmFad 2-1/pGEM-9z(-) construct and was designated pBS43.

Plasmid pBS43 was transformed into meristems of the elite soybean line A2396, by the method of particle bombardment as described in Example 1. Fertile plants were regenerated using methods well known in the art.

From the initial population of transformed plants, a plant was selected which was expressing GUS activity and which was also positive for the GmFad 2-1 gene (Event 260-05) when evaluated by PCR. Small chips were taken from a number of R1 seeds of plant 260-05 and screened for fatty acid composition. The chipped seed was then planted and germinated. Genomic DNA was extracted from the leaves of the resulting plants and cut with the restriction enzyme Bam HI. The blots were probed with a phaseolin probe.

From the DNA hybridization pattern it was clear that in the original transformation event the GmFad 2-1 construct had become integrated at two different loci in the soybean genome. At one locus (Locus A) the GmFad 2-1 construct was causing a silencing of the endogenous GmFad 2-1 gene, resulting in oleic acid contents as shown in Table 3. For comparison elite soybean varieties have an oleic acid content of about 20%. At locus A there were two copies of pBS43. On the DNA hybridization blot this was seen as two cosegregating bands. At the other integration locus (Locus B) the GmFad 2-1 was over-expressing, thus decreasing the oleic acid content to about 4%.

Fourth generation segregant lines (R4 plants), generated from the original transformant, were allowed to grow to maturity. R4 seeds, which contained only the silencing Locus A (e.g., G94-1) did not contain any detectable GmFad 2-1 mRNA (when measured by Northern blotting) in samples recovered 20 days after flowering. GmFad 2-2 mRNA, although reduced somewhat compared with controls, was not suppressed. Thus the GmFad 2-1 sense construct had the desired effect of preventing the expression of the GmFad 2-1 gene and thus increasing the oleic acid content of the seed. All plants homozygous for the GmFad 2-1 silencing locus had an identical Southern blot profile over a number of generations. This indicates that the insert was stable and at the same position in the genome over at least four generations.

Example 6

Fatty Acid Analysis High Oleic Trait (Version 1)

A summary of the oleic acid contents found in the different generations of recombinant soybean plants and seeds is presented in Table 7. The Fatty Acid composition was determined as described in Example 2.

TABLE 3

| Plant ID | Generation Planted[a] | Seed Analyzed[a] | Bulk Oleic Acid (%) |
|---|---|---|---|
| G253 | R0:1 | R1:2 | 84.1% |
| G276 | R0:1 | R1:2 | 84.2% |
| G296 | R0:1 | R1:2 | 84.1% |

TABLE 3-continued

| Plant ID | Generation Planted[a] | Seed Analyzed[a] | Bulk Oleic Acid (%) |
|---|---|---|---|
| G313 | R0:1 | R1:2 | 83.8% |
| G328 | R0:1 | R1:2 | 84.0% |
| G168-187 | R1:2 | R2:3 | 84.4% |
| G168-171 | R1:2 | R2:3 | 85.2% |
| G168-59-4 | R2:3 | R3:4 | 84.0% |
| G168-72-1 | R2:3 | R3:4 | 84.1% |
| G168-72-2 | R2:3 | R3:4 | 84.5% |
| G168-72-3 | R2:3 | R3:4 | 84.3% |
| G168-72-4 | R2:3 | R3:4 | 83.3% |

[a]R0:1 indicates the seed and the plant grown from seed after selfing of the first generation transformant. R1:2 indicates the seed and the plant grown from seed after selfing of the second generation transformant. R2:3 indicates the seed and the plant grown from seed after selfing of the third generation transformant. R3:4 indicates the seed and the plant grown from seed after selfing of the fourth generation transformant.

Example 7

Genetic Material Used to Produce the High Oleic Trait (Version 2)

A Soybean (*Glycine max*) event was produced by particle co-bombardment as described in Example 1 with fragments PHP19340A (FIG. 4; SEQ ID NO:23) and PHP17752A (FIG. 5; SEQ ID NO:24). These fragments were obtained by Asc I digestion from a source plasmid. Fragment PHP19340A was obtained from plasmid PHP19340 (FIG. 6; SEQ ID NO:25) and fragment PHP17752A was obtained from plasmid PHP17752 (FIG. 7; SEQ ID NO:26). The PHP19340A fragment contains a cassette with a 597 bp fragment of the soybean microsomal omega-6 desaturase gene 1 (gm-fad2-1) (Heppard et al., 1996, *Plant Physiol.* 110: 311-319).

The presence of the gm-fad2-1 fragment in the expression cassette acts to suppress expression of the endogenous omega-6 desaturases, resulting in an increased level of oleic acid and decreased levels of palmitic, linoleic, and linolenic acid levels. Upstream of the gm-fad2-1 fragment is the promoter region from the Kunitz trypsin inhibitor gene 3 (KTi3) (Jofuku and Goldberg, 1989, *Plant Cell* 1: 1079-1093; Jofuku et al., 1989, *Plant Cell* 1: 427-435) regulating expression of the transcript. The KTi3 promoter is highly active in soy embryos and 1000-fold less active in leaf tissue (Jofuku and Goldberg, 1989, *Plant Cell* 1: 1079-1093). The 3' untranslated region of the KTi3 gene (KTi3 terminator) (Jofuku and Goldberg, 1989, *Plant Cell* 1: 1079-1093) terminates expression from this cassette.

The PHP17752A fragment contains a cassette with a modified version of the soybean acetolactate synthase gene (gm-hra) encoding the GM-HRA protein with two amino acid residues modified from the endogenous enzyme and five additional amino acids at the N-terminal region of the protein derived from the translation of the soybean acetolactate synthase gene 5' untranslated region (Falco and Li, 2003, US Patent Application: 2003/0226166). The gm-hra gene encodes a form of acetolactate synthase, which is tolerant to the sulfonylurea class of herbicides. The GM-HRA protein is comprised of 656 amino acids and has a molecular weight of approximately 71 kDa.

The expression of the gm-hra gene is controlled by the 5' promoter region of the S-adenosyl-L-methionine synthetase (SAMS) gene from soybean (Falco and Li, 2003, US Patent Application: 2003/0226166). This 5' region consists of a constitutive promoter and an intron that interrupts the SAMS 5' untranslated region (Falco and Li, 2003). The terminator for the gm-hra gene is the endogenous soybean acetolactate synthase terminator (als terminator) (Falco and Li, 2003, US Patent Application: 2003/0226166).

Example 8

Transformation and Selection for the Soybean High Oleic Event (Version 2)

For transformation of soybean tissue, a linear portion of DNA, containing the gm-fad2-1 gene sequence and the regulatory components necessary for expression, was excised from the plasmid PHP19340 through the use of the restriction enzyme Asc I and purified using agarose gel electrophoresis. A linear portion of DNA, containing the gm-hra gene sequences and the regulatory components necessary for expression, was excised from the plasmid PHP17752 through the use of the restriction enzyme Asc I and purified using agarose gel electrophoresis. The linear portion of DNA containing the gm-fad2-1 gene is designated insert PHP19340A and is 2924 bp in size. The linear portion of DNA containing the gm-hra gene is designated insert PHP17752A and is 4511 bp in size. The only DNA introduced into transformation event DP-305423-1 was the DNA of the inserts described above.

The transgenic plants from event DP-305423-1 were obtained by microprojectile bombardment as described in Example 1. Embryogenic tissue samples were taken for molecular analysis to confirm the presence of the gm-fad2-1 and gm-hra transgenes by Southern analysis. Plants were regenerated from tissue derived from each unique event and transferred to the greenhouse for seed production.

Example 9

Southern Analysis of Plants Containing the High Oleic Event Version 2

Materials and Methods:

Genomic DNA was extracted from frozen soybean leaf tissue of individual plants of the T4 and T5 generations of DP-305423-1 and of control (variety: Jack) using a standard Urea Extraction Buffer method. Genomic DNA was quantified on a spectrofluorometer using Pico Green® reagent (Molecular Probes, Invitrogen). Approximately 4 μg of DNA per sample was digested with Hind III or NcoI. For positive control samples, approximately 3 pg (2 genome copy equivalents) of plasmid PHP19340 or PHP17752 was added to control soybean genomic DNA prior to digestion. Negative control samples consisted of unmodified soybean genomic DNA (variety: Jack). DNA fragments were separated by size using agarose gel electrophoresis.

Following agarose gel electrophoresis, the separated DNA fragments were depurinated, denatured, neutralized in situ, and transferred to a nylon membrane in 20×SSC buffer using the method as described for TURBOBLOTTER™ Rapid Downward Transfer System (Schleicher & Schuell). Following transfer to the membrane, the DNA was bound to the membrane by UV crosslinking.

DNA probes for gm-fad2-1 and gm-hra were labeled with digoxigenin (DIG) by PCR using the PCR DIG Probe Synthesis Kit (Roche).

Labeled probes were hybridized to the target DNA on the nylon membranes for detection of the specific fragments using DIG Easy Hyb solution (Roche) essentially as described by manufacturer. Post-hybridization washes were carried out at high stringency. DIG-labeled probes hybridized to the bound fragments were detected using the CDP-Star Chemiluminescent Nucleic Acid Detection System (Roche). Blots were exposed to X-ray film at room temperature for one or more time points to detect hybridizing fragments. The fatty Acid composition of the event was determined as described in Example 2. Oleic acid levels determined in 29 different events (T1 generation) ranged from 61.5-84.6%. Oleic acid level from one event (T4-T5 generation) ranged from 72-82%.

Example 10

Small Scale Soy Protein Isolate Preparation

Soy protein isolate preparation is performed as described below.

a) Production of Yellow flake:

Full fat soy flake is prepared in the following manner. A volume of soybeans is placed in a closed container, with a small amount of water to prevent drying of the beans during subsequent microwave heating. Soybeans are heated in a microwave until the temperature reaches 150° F. and then held for 1 minute. The beans are quickly cooled to room temperature in a fluid bed cooler for about 1 minute. The soybeans are then fed through a cracker to produce ½ and ¼ cracks. Hulls are removed in an aspirator and the resulting "meats" carried forward to produce flakes. The meats are placed in a sealed container with a small amount of water and heated in a microwave until the temperature reaches 150° F. and then held for 1 minute. The hot meats are then fed through a flaker to produce soybean flakes that are then cooled quickly to room temperature in a fluid bed cooler for about 1 minute. Flakes with a high Protein Dispersibility Index (PDI) are produced with sufficient character for oil removal by solvent extraction. Flakes with lower PDI are produced by increasing the amount of water, temperature and time of exposure during production.

b) Production of White flake:

White flake may be produced by contacting yellow flake with hexane to remove oil. In addition to hexane, flakes are extracted solely, or in combination with, other solvent systems that have some degree of oil solubility such as ethanol, ethanol water mixtures, hexane ethanol mixtures, supercritical CO2 ethanol water mixtures, etc. Yellow flake is loaded into a batch or a semi continuous extractor at a solvent:flake ratio, temperature, and extraction time number, sufficient to remove oil. In a batch extractor, hexane warmed to 60° C. is added at a 3:1 solvent:flake ratio and circulated through a bed of flake for 45 minutes. The used solvent miscella is removed and the solvent extraction procedure described above is repeated. The flakes are given a final one to one rinse with fresh solvent. The semi continuous extractor uses approximately the same solvent to flake ratio but fresh solvent is continuously regenerated through the use of a solid/liquid in-vessel filter followed by vaporization of the solvent from the oils and recycle of the condensate back to the extractor. This semi continuous extractor is used to generate any number of solvent turnovers. In either apparatus, the resulting hexane-laden white flake is allowed to air dry in a fume hood overnight. If desired, commercial steam treatment during desolventization is simulated by adding water to the flake (typically 5-10% dry flake basis), and placing the wetted flake in a sealed container and heating for 6 minutes at 100° C. in the microwave. The hot flakes are then placed in a vacuum oven and quickly cooled to about 50° C. to produce high PDI flake. Increasing the amount of water, time, or temperature during this step produced low PDI flakes. Flakes are milled into flour to a particle size suitable for efficient protein extraction or this step may be skipped entirely.

c) Production of Wet Curd:

A quantity of soy flour is extracted with water (may be warmed, typically 33° C.) at a water to flour ratio at least sufficient to make a movable slurry (typically 6:1) in a vessel capable of imparting good water flake contact and/or further flour grinding capability (typically a colloid mill). If desired, the extraction pH may be increased with a base (typically $Ca(OH)_2$ up to a pH of about 9.7) or decreased with an acid to a pH of about 2.0. Defoaming agents at a quantity sufficient to prevent foaming (typically less than 1% on a flake basis) and sulfite ($Na_2SO_3$, typically less than 1% on a flake basis) may be added at this point to aid extraction. The extract is mixed (typically in a colloid mill) for approximately 10-15 minutes. The slurry is fed into a centrifuge (either batch or semi continuous) at rpm's and time sufficient to separate solids (typically above Log 4.0 Gsec. at 33° C.). The liquid is decanted and the solids re-extracted at a water to solids ratio at least sufficient to make a movable slurry (typically 4 to 1). The slurry (typically 33° C.) is mixed (typically in a colloid mill) and separated in a centrifuge as described above. If desired, the pH of the second extract may also be increased or decreased at this point. Following centrifugation, the liquid is decanted and the spent flake discarded. The first and second liquid extracts are combined and carried forward. Additional extractions can be done if desired. To precipitate the protein, the pH is adjusted to a pH sufficient to separate the proteins of interest (typically to 4.5) with an acid (typically 1M HCl) and fed into a semi-continuous or batch centrifuge at the conditions described above. The liquid is decanted and discarded and the solids resuspended with fresh water (typically in a homogenizer). The re-slurry water may be warmed if desired (typical wash water temperature is about 50-60° C.). The wash described above may be repeated if desired.

d) Production of Isolated Soy Protein:

The wet curd is re-suspended to a solids content suitable for pasteurization of the protein slurry. Typically, the solids content will be approximately 10-20%. The slurry is mixed (typically in a colloid mill or homogenizer) and the pH adjusted with a base (typically NaOH) to approximately 6.8-7.2. The slurry is pasteurized continuously with steam injection at a temperature and time sufficient to reduce microbial counts and trypsin inhibitor activity to safe levels for human ingestion. Typical conditions may be approximately 120-160° C. for 4-60 seconds. The pasteurized slurry is cooled (typically flash cooled to 50-60° C. by use of 100-150 mm vacuum). The slurry is fed into a spray drier at conditions necessary to achieve a dry product of less than about 5% moisture. Typical conditions include an inlet temperature of about 250-300° C. and an outlet temperature of about 90-100° C.

The conditions set forth in this examples comprise the process parameters that are used to produce the Supro® 760, Supro® 670 and Supro® 500E—type protein isolates in the small scale production platform.

Example 11

Large Scale Defatted Flake Production

The soy flake material may be formed from soybeans according to the following process. The soybeans are detrashed by passing the soybeans through a magnetic separator to remove iron, steel, and other magnetically susceptible objects, followed by shaking the soybeans on progressively smaller meshed screens to remove soil residues, pods, stems, weed seeds, undersized beans, and other trash. The detrashed soybeans are then cracked by passing the soybeans through cracking rolls. Cracking rolls are spiral-cut corrugated cylinders which loosen the hull as the soybeans pass through the rolls and crack the soybean material into several pieces. Preferably the cracked soybeans are conditioned to 10% to 11% moisture at 63 to 74° C. to improve the storage quality retention of the soybean material. The cracked soybeans are then dehulled, preferably by aspiration. Soy hypocotyls, which are much smaller than the cotyledons of the soybeans, may be removed by shaking the dehulled soybeans on a screen of sufficiently small mesh size to remove the hypocotyls and retain the cotyledons of the beans. The hypocotyls need not be removed since they comprise only about 2%, by weight, of the soybeans while the cotyledons comprise about 90% of the soybeans by weight, however, it is preferred to remove the hypocotyls since they are associated with the beany taste of soybeans. The dehulled soybeans, with or without hypocotyls, are then flaked by passing the soybeans through flaking rolls. The flaking rolls are smooth cylindrical rolls positioned to form flakes of the soybeans as they pass through the rolls having a thickness of from about 0.01 inch to about 0.015 inch.

The flakes are then defatted. The flakes are defatted by extracting the flakes with a suitable solvent to remove the oil from the flakes. Preferably the flakes are extracted with n-hexane or n-heptane in a countercurrent extraction. The defatted flakes should contain less than 1.5% fat or oil content, and preferably less than 0.75%. The solvent-extracted defatted flakes are then desolventized to remove any residual solvent using conventional desolventizing methods, including desolventizing with a flash desolventizer-deodorizer stripper, a vapor desolventizer-vacuum deodorizer, or desolventizing by down-draft desolventization.

Preferably, the defatted flakes are comminuted into a soy flour or a soy grit to improve the protein extraction yield from the flakes. The flakes are comminuted by grinding the flakes to the desired particle size using conventional milling and grinding equipment such as a hammer mill or an air jet mill. Soy flour has a particle size wherein at least 97%, by weight, of the flour has a particle size of 150 microns or less (is capable of passing through a No. 100 mesh U.S. Standard Screen). Soy grits, more coarsely ground than soy flour, have a particle size greater than soy flour but smaller than soy flakes. Preferably the soy grit has a particle size of from 150 microns to about 1000 microns (is capable of passing though a No. 10-No. 80 U.S. Standard Screen).

Example 12

Large Scale Soy Protein Isolate Preparation

To produce the soy protein curd material, the HO defatted soy flour is extracted with water or an aqueous solution having a pH of from 6.5 to 10 to extract the protein in the flour from insoluble materials such as fiber. The soy flour is preferably extracted with an aqueous sodium hydroxide solution having a pH from about 8 to about 10, although other aqueous alkaline extractants such as ammonium hydroxide are also effective. Preferably the weight ratio of the extractant to the soy flour material is from about 8:1 to about 16:1.

After extraction, the extract is separated from the insoluble materials. Preferably the separation is effected by filtration or by centrifugation and separation of the extract from the insoluble materials. The pH of the separated extract is then adjusted to about the isoelectric point of soy protein to precipitate a soy protein curd so that the soy protein can be separated from soy solubles including flatulence inducing oligosaccharides and other water soluble carbohydrates. The pH of the separated extract is adjusted with a suitable acid to the isoelectric point of soy protein, preferably to a pH of from about pH 4 to about pH 5, most preferably from about pH 4.4 to about pH 4.6. Suitable edible acids for adjusting the pH of the extract to about the isoelectric point of soy protein include hydrochloric acid, phosphoric acid, sulfuric acid, nitric acid, or acetic acid. The protein material is precipitated preferably with hydrochloric acid or phosphoric acid. The precipitated protein material (curd) is separated from the extract (whey), preferably by centrifugation or filtration to produce the soy protein curd material. The separated soy protein curd material is preferably washed with water to remove residual solubles, preferably at a weight ratio of water to protein material of about 4:1 to about 10:1. The conditions set forth in examples 11 and 12 describe essentially the process parameters that are used to produce the Supro® 760, Supro® 1610, Supro® 651, Supro® 500E and Supro® 670-type protein isolates in the large scale production platform. A detailed description of the production of Supro® 760 is described in Examples 13 and 14.

The production of Supro® 670 includes a hydrolization step that was not applied in the production of the other isolates and is described In Examples 16-18.

Example 13

Process for Solae Supro® 760 Type Protein from Defatted HO Flours

To produce the Supro® 760 type protein material, the soy protein curd material produced as described in Example 12 is first neutralized to a pH of 6.8 to 7.2 with an aqueous alkaline solution or an aqueous alkaline earth solution, preferably a sodium hydroxide solution or a potassium hydroxide solution. The neutralized soy protein curd material is then heated. Preferably the neutralized soy curd is heated at a temperature of from about 75° C. to about 160° C. for a period of from about 2 seconds to about 2 hours, where the curd is heated for a longer time period at lower temperatures and a shorter period at higher temperatures. More preferably the soy protein curd material is treated at an elevated temperature and under a positive pressure greater than atmospheric pressure.

The preferred method of heating the soy protein curd material is treating the soy curd at a temperature elevated above ambient temperatures by injecting pressurized steam into the curd, hereafter referred to as "jet-cooking." The following description is a preferred method of jet-cooking the soy protein curd material, however, the invention is not limited to the described method and includes any obvious modifications which may be made by one skilled in the art.

The soy protein curd material is introduced into a jet-cooker feed tank where the soy curd is kept in suspension with a mixer which agitates the soy curd. The curd is directed from the feed tank to a pump which forces the curd through a reactor tube. Steam is injected into the curd under pressure as the curd enters the reactor tube, instantly heating the curd to the desired temperature. The temperature is controlled by adjusting the pressure of the injected steam, and preferably is from about 75° C. to about 160° C., more preferably from about 100° C. to about 155° C. The curd is treated at the elevated temperature for treatment time being controlled by the flow rate of the slurry through the tube. Preferably the flow rate is about 18.5 lbs./minute, and the cook time is about 9 seconds at about 150° C.

To produce the protein material of the present invention the heated neutralized curd is then cooled and dried. The curd may be cooled and dried in any conventional manner known in the art. In a preferred embodiment of the present invention, the curd is cooled by flash vaporization. The heated curd is flash vaporized by introducing the hot curd into a vacuumized chamber having an internal temperature of from 20° C. to 85° C., which instantly drops the pressure about the curd to a pressure of from about 25 mm to about 100 mm Hg, and more preferably to a pressure of from about 25 mm Hg to about 30 mm Hg. Most preferably the hot curd is discharged from the reactor tube of the jet-cooker into the vacuumized chamber, resulting in an instantaneous large pressure and temperature drop which vaporizes a substantial portion of water from the curd, instantly cooling the curd to a temperature. Preferably the vaccumized chamber has an elevated temperature up to about 85° C. to prevent the gelation of the soy protein curd material upon introduction of the curd into the vacuumized chamber. The heat treatment under pressure followed by the rapid pressure drop and vaporization of water also causes vaporization of substantial amounts of the volatile components from the soy material, and thereby improving the taste of the soy material.

The flash vaporized protein material may then be dried, preferably by spray drying. Preferably the spray-dryer is a co-current flow dryer where hot inlet air and the structural protein material, atomized by being injected into the dryer under pressure through an atomizer, pass through the dryer in a co-current flow.

In a preferred embodiment, the protein material is injected into the dryer through a nozzle atomizer. Although a nozzle atomizer is preferred, other spray-dry atomizers, such as a rotary atomizer, may be utilized. The curd is injected into the dryer under enough pressure to atomize the slurry. Preferably the slurry is atomized under a pressure of about 3000 psig to about 5500 psig, and most preferably about 3500 to 5000 psig. Hot air is injected into the dryer through a hot air inlet located so the hot air entering the dryer flows co-currently with the atomized soy curd sprayed from the atomizer. The hot air has a temperature of about 285° C. to about 315° C., and preferably has a temperature of about 290° C. to about 300° C.

The dried soy protein material is collected from the spray dryer. Conventional means and methods may be used to collect the soy material, including cyclones, bag filters, electrostatic precipitators, and gravity collection.

Example 14

Production of the SUPRO® 760-Type High Oleic Soy Protein Isolate

The SUPRO® 760-type High Oleic Soy Protein Isolate was produced from High Oleic Soybeans according to the following process. 100 lbs of defatted High Oleic soybean flakes were placed in an extraction tank and extracted with 1,000 lbs of water heated to 32° C. This provided a weight ratio of water to flakes of 10:1. The flakes were separated from the extract and re-extracted with 600 lbs of water heated to 32° C. and having sufficient calcium hydroxide added to adjust the pH to 9.7. This second extraction step provided a weight ratio of water to flakes of 6:1. The flakes were removed by centrifugation, and the first and second extracts were combined and adjusted to a pH of 4.5 with hydrochloric acid to precipitate a protein curd. The acid precipitated curd was separated from the extract by centrifugation, leaving aqueous whey (discarded), and then was washed with water in a weight amount of seven times that of the starting flake material to provide an isoelectric protein isolate.

To produce the SUPRO® 760-type High Oleic protein material, water was added to the bioelectric soy protein material and the pH was adjusted to between 6.9 and 7.3 with an aqueous solution of sodium hydroxide to produce a neutralized soy protein slurry and then heated by injecting pressurized steam into the slurry, hereafter referred to as "jet-cooking." The neutral soy protein slurry was introduced into a jet-cooker feed tank where it was kept in suspension with a mixer that agitated the slurry. The slurry was directed from the feed tank to a pump that forced the slurry through a reactor tube. Steam was injected into the slurry under pressure as the slurry entered the reactor tube, instantly heating the slurry to the desired temperature. The temperature was controlled by adjusting the pressure of the injected steam. The heat treatment was about 9 seconds at about 150° C. The heated neutral slurry was then cooled by flash vaporization, which vaporized a substantial portion of water from the hot neutral protein slurry, instantly cooling the neutral protein material.

The cooled neutral protein slurry was then homogenized and transferred to a spray dryer wherein most of the moisture was evaporated by the addition of heat to achieve the final SUPRO® 760-type soy protein isolate.

Example 15

Process of Production of Solae Supro® 760 Type Protein from Defatted HO Flours

To produce the Supro® 760-type protein product of the present invention, 60 lbs of HO soy flour were extracted with 600 lbs of 32° C. water at a 10:1 water to flour ratio in a mixer which agitates the soy flour for good water-flake contact. Defoaming agent was added at a quantity sufficient to prevent foaming and 54.48 g sulfite ($Na_2SO_3$) was added at this point. Slurry pH was 6.6. The slurry was mixed 10 minutes. The slurry was fed into a batch centrifuge at 12.2 lb/min at 8.1% solids to separate solids from liquid. The liquid was decanted and the solids were returned to the mixing vessel, and re-extracted at a 5:1 water to flake ratio at 32° C. The pH of the slurry was increased with NaOH to 9.7 and the slurry was mixed for 10 min and separated in a batch centrifuge at 12.2 lb/min with 3.9% feed solids. Following centrifugation the liquid was decanted and the spent flake discarded. The first and second liquid extracts were combined and carried forward. To precipitate the protein, the pH was adjusted to 4.5 with HCl and held for 10 minutes. The material was fed into a batch centrifuge at 25 lb/min, 6.0% solids and 55° C. to separate liquid whey from curd. The liquid was decanted and discarded and the solids reslurried with fresh water in a 7:1 water to flake ratio and passed through a Dispax grinder to ensure effective washing. The ground slurry was fed into a batch centrifuge at 25 lb/min at 59° C. to separate the liquid wash from the curd. The wet curd was resuspended with water to 11.3% solids suitable for pasteurization of the protein slurry. The pH of the slurry was increased with NaOH to a pH of 7.1 and the slurry was homogenized at 550 psig. The slurry was introduced into a jet-cooker feed tank where the soy curd was kept in suspension with a mixer which agitated the soy curd.

The curd slurry was directed from the feed tank to a pump which forced the curd through a reactor tube 0.94 inches in diameter and 33 inches long. Steam was injected into the curd under pressure as the curd entered the reactor tube, instantly heating the curd to the desired temperature. The temperature was controlled by adjusting the pressure of the injected steam and was 149° C. The curd was treated at the elevated temperature for 9 seconds. The heated curd was then cooled and dried. The curd was cooled by flash vaporization. The heated curd was flash vaporized by introducing the hot curd into a vacuumized chamber having an internal temperature of 63° C. which instantly dropped the pressure to 26 mm Hg. The instantaneous large pressure and temperature drop vaporized a substantial portion of water from the curd, instantly cooling the curd to 68° C.

The flash vaporized protein material was spray dried using a co-current flow dryer where hot inlet air and protein material was atomized by being injected into the dryer under pressure through an atomizer and passed through the dryer in a co-current flow.

The curd slurry was fed into a homogenizer and homogenized at 1500 psig at 57° C. The homogenized slurry was injected into the dryer through a nozzle atomizer at an atomization pressure of 4000 psig. Hot air was injected into the dryer through a hot air inlet located so the hot air entering the dryer flowed co-currently with the atomized soy curd sprayed from the atomizer. The hot air had a temperature of 265° C. The dryer outlet temperature was 89° C.

The dried High Oleic Supro®760-type isolated soy protein was collected by gravity collection from the outlet of the spray dryer.

Example 16

Process for Production of Solae Supro® 670 Type Protein from Defatted HO Flours Including an Enzymatic Hydrolization Step The Supro® 670 type protein material is formed from the soy protein curd material in much the same manner as the Supro®670 protein material described in Example 15, however, an enzymatic protein hydrolysis step is included to hydrolyze the protein. The soy protein curd material is first diluted to about 12-15% solids and neutralized to a pH of from 7.5 to 8.1 with an aqueous alkaline solution or an aqueous alkaline earth solution, preferably a sodium hydroxide solution or a potassium hydroxide solution. The neutralized soy protein curd is heated and cooled, preferably by jet cooking and flash cooling, in the same manner as described above with respect to preparation of the Supro® 760 protein material. Preferably the curd is cooled to 55° C. to 60° C. after heating.

After the flash cooling, an enzyme (Bromelain) having an activity of about 2400 TU/g is added to the solution at about a 0.02% based on curd solids. The enzyme treated solution is allowed to react for about 15 minutes to 65 minutes preferably 20-45 minutes under continuous mixing. The hydrolysis is terminated by heating the hydrolyzed soy protein curd material to a temperature effective to inactivate the enzyme. Most preferably the hydrolyzed soy protein curd material is jet cooked to inactivate the enzyme, and flash cooled then dried as described above with respect to producing the dried Supro®760 protein material. The dried hydrolyzed material is the dried Supro® 670 protein material.

Example 17

Production of the SUPRO® 670-Type High Oleic Soy Protein Isolate

The SUPRO® 670-type high oleic soy protein isolate was prepared essentially as described in Example 16, but with the following experimental details. HO soy flour (60 lbs) was extracted with 600 lbs of 41° C. water at a 10:1 water to flour ratio in a mixer which agitates the soy flour for good water-flake contact. Defoaming agent was added at a quantity sufficient to prevent foaming and 54.48 g sulfite ($Na_2SO_3$) was added at this point. Slurry pH was 6.5. The slurry was mixed 10 minutes. The slurry was fed into a batch centrifuge at 10.0 lb/min at 8.2% solids to separate solids from liquid. The liquid was decanted and the solids returned to the mixing vessel, and re-extracted at a 5:1 water to flake ratio at 33° C. The pH of the slurry was increased with NaOH to 9.7 and the slurry was mixed for 10 min and separated in a batch centrifuge at 12.0 lb/min with 3.8% feed solids. Following centrifugation the liquid was decanted and the spent flake discarded. The first and second liquid extracts were combined and carried forward. To precipitate the protein, the pH was adjusted to 4.5 with HCl, held for 10 minutes. The material was fed into a batch centrifuge at 24 lb/min, 6.0.0% solids and 57° C. to separate liquid whey from curd. The liquid was decanted and discarded and the solids reslurried with fresh water in a 7:1 water to flake ratio and passed through a Dispax grinder to ensure effective washing. The ground slurry was fed into a batch centrifuge at 14 lb/min at 56° C. to separate the liquid wash from the curd. The wet curd was resuspended with water to 11.3% solids suitable for pasteurization of the protein slurry. The pH of the slurry was increased with NaOH to a pH of 7.7 and the slurry was homogenized at 550 psig. The slurry was introduced into a jet-cooker feed tank where the soy curd was kept in suspension with a mixer which agitated the soy curd. The curd slurry was directed from the feed tank to a pump which forced the curd through a reactor tube 0.94 inches in diameter and 33 inches long. Steam was injected into the curd under pressure as the curd entered the reactor tube, instantly heating the curd to the desired temperature. The temperature was controlled by adjusting the pressure of the injected steam and was 129° C. The curd was treated at the elevated temperature for 9 seconds. The heated curd was then cooled and dried. The curd was cooled by flash vaporization. The heated curd was flash vaporized by introducing the hot curd into a vacuumized chamber having an internal temperature of 63° C. which instantly dropped the pressure to 23 mm Hg. The instantaneous large pressure and temperature drop vaporized a substantial portion of water from the curd, instantly cooling the curd to 70° C.

After the flash cooling, an enzyme (Bromelain) having an activity of about 2400 TU/g was added to the solution at a 0.03% based on curd solids. The enzyme treated solution was allowed to react for 35 minutes under continuous mixing. The hydrolysis was terminated by heating the hydrolyzed soy protein curd material to a temperature effective to inactivate the enzyme. The hydrolyzed soy protein curd material was jet cooked at 142° C. for 9 seconds to inactivate the enzyme, and flash cooled. The heated curd was flash vaporized by introducing the hot curd into a vacuumized chamber having an internal temperature of 61° C. which instantly dropped the pressure to 25 mm Hg. The instantaneous large pressure and temperature drop vaporized a substantial portion of water from the curd, instantly cooling the curd to 61° C.

The flash vaporized protein material was homogenized and spray dried using a co-current flow dryer where hot inlet air and protein material were atomized by being injected into the dryer under pressure through an atomizer and passed through the dryer in a co-current flow.

The curd slurry was fed into a homogenizer and homogenized at 2000 psig at 54° C. The homogenized slurry was injected into the dryer through a nozzle atomizer at an atomization pressure of 4000 psig. Hot air was injected into the dryer through a hot air inlet located so the hot air entering the dryer flowed co-currently with the atomized soy curd sprayed from the atomizer. The hot air had a temperature of 307° C. The dryer outlet temperature was 93° C.

The dried hydrolyzed High Oleic Supro®670-type isolated soy protein was collected by gravity collection from the outlet of the spray dryer.

Example 18

Production of the SUPRO® 670-Type High Oleic Soy Protein Isolate

The SUPRO® 670-type High Oleic Soy Protein Isolate was produced from High Oleic Soybeans according to the following process. 100 lbs of defatted High Oleic soybean flakes were placed in an extraction tank and extracted with 1,000 lbs of water heated to 32° C. This provided a weight ratio of water to flakes of 10:1. The flakes were separated from the extract and re-extracted with 600 lbs of water heated to 32° C. and having sufficient calcium hydroxide added to adjust the pH to 9.7. This second extraction step provided a weight ratio of water to flakes of 6:1. The flakes were removed by centrifugation, and the first and second extracts were combined and adjusted to a pH of 4.5 with hydrochloric acid to precipitate a protein curd. The acid precipitated curd was separated from the extract by centrifugation, leaving aqueous whey (discarded), and then was washed with water in a weight amount of seven times that of the starting flake material to provide an isoelectric protein isolate.

To produce the SUPRO® 670-type High Oleic protein material, water was added to the isoelectric soy protein material and the pH was adjusted to between 7.3 and 7.7 with an aqueous solution of sodium hydroxide to produce a neutralized soy protein slurry and then heated by injecting pressurized steam into the slurry, hereafter referred to as "jet-cooking." The neutral soy protein slurry was introduced into a jet-cooker feed tank where it was kept in suspension with a mixer that agitated the slurry. The slurry was directed from the feed tank to a pump that forced the slurry through a reactor tube. Steam was injected into the slurry under pressure as the slurry entered the reactor tube, instantly heating the slurry to the desired temperature. The temperature was controlled by adjusting the pressure of the injected steam. The heat treatment was about 9 seconds at about 130° C. The heated neutral slurry was then cooled by flash vaporization, which vaporized a substantial portion of water from the hot neutral protein slurry, instantly cooling the neutral protein material to about 61° C. Bromelain enzyme was added to the cooled protein slurry and allowed to react for a time sufficient to enzyme hydrolyze the protein to a TNBS value of about 50. The enzyme treated slurry was then heat treated by jet-cooking to inactivate the bromelain enzyme. The enzyme treated slurry was cooked in the jet-cooker for about 9 seconds at about 152° C. The heated neutral slurry was then cooled by flash vaporization, which vaporized a substantial portion of water from the hot neutral protein slurry, instantly cooling the neutral protein material to about 82° C.

The cooled neutral protein slurry was then homogenized and transferred to a spray dryer wherein most of the moisture was evaporated by the addition of heat to achieve the final SUPRO® 670-type soy protein isolate.

Example 19

Gel Strength Measurements of High Oleic Protein Soy Protein Isolates (Small Scale Production Platform)

The effect of high oleic protein isolates (essentially prepared as described in Example 10) on gel strength of refrigerated and pasteurized gels compared to isolates from commodity or low linolenic (low lin) acid soybeans were analyzed. The fatty acid composition of the low linolenic acid soybeans used herein has been disclosed in Table 2 of U.S. Pat. No. 5,981,781, issued Nov. 9, 1999). Oleic acid levels in the low lin lines are similar to the levels found in commodity soybeans, whereas linolenic acid levels are about 3fold lower.

Low lin samples were used for comparison to high oleic samples in addition to isolates from commodity soybeans. Gels were prepared by mixing 75 mL ddH2O and 15 g of protein isolate in a Waring blender on a mix setting of #2 for 30 seconds (initial hydration). The mixer was stopped and any residual dry protein was scraped from the bowl surface.

In some cases, gels were prepared by adding 0.84 g NaCl at this point and mixing was resumed for a total of 3 minutes with additional scraping every 30 seconds. Following preparation, gels were packed into 5 mL glass vials using a disposable cartridge mini gun dispenser. Care was taken to eliminate any residual air bubbles. Vials were sealed with tightly crimped septum and cap. Sealed vials were either placed immediately in the refrigerator and stored for 16-24 hours (refrigerated gel) or incubated in an 80° C. bath for 30 minutes, cooled for 30 minutes in a 25° C. water bath prior to refrigeration for 16-24 hrs (pasteurized gel). Gel strength was measured either on a texture Analyzer (TAXT.2i, Stable Micro Systems, UK) or an an AR-1000 Rheometer (TA Instruments). When gel strength was measured on the texture Analyzer, gels were removed from the refrigerator and warmed in a 25° C. Decapped sample vials were centered on the loading platform and a 3 mm diameter stainless cylinder punch probe was used for measurement. Gels were penetrated twice in the center of the vial to a depth of 10 mm and the data recorded using the instrument manufacturer's software. The area under the positive portion of the curve was integrated and recorded (labeled area). Gel preparation and measurements were replicated on a second day and the data averaged and recorded.

The results are shown in Table 4. The average gel strength and standard deviation of the high oleic soybean isolates compared to non-high oleic soybean isolates was 168±45 g*s and 346±59 g*s, respectively. The reduction in gel strength of high oleic compared to non-high oleic soybean isolates ranged from 25%-70% (calculated from the averages).

TABLE 4

Gel strength of High Oleic isolates compared to control soybean isolates

| Inventory ID | Trait[1] | Commercial protein type[2] | Gel texture 1:5 2% NaCl Past. Area, g * s |
|---|---|---|---|
| PPI002385 | High Oleic v.1 | Supro ® 500E | 127 |
| PPI002391 | Commodity | Supro ® 500E | 460 |
| PPI002419 | High Oleic v.1 | Supro ® 500E | 140 |
| PPI002581 | High Oleic v.2 | Supro ® 760 | 173 |
| PPI002582 | Commodity | Supro ® 760 | 338 |
| PPI002583 | High Oleic v.1 | Supro ® 760 | 106 |
| PPI002584 | Low Lin | Supro ® 760 | 318 |
| PPI002588 | Low Lin | Supro ® 760 | 315 |
| PPI002589 | High Oleic v.2 | Supro ® 760 | 248 |
| PPI002590 | Commodity | Supro ® 760 | 350 |
| PPI002599 | High Oleic v.2 | Supro ® 760 | 194 |
| PPI002600 | High Oleic v.2/High Stearic | Supro ® 760 | 146 |
| PPI002601 | High Oleic v.2 | Supro ® 760 | 162 |
| PPI002602 | High Oleic v.2 | Supro ® 760 | 195 |
| PPI006508 | Commodity | Supro ® 760 | 294 |

[1]High Oleic, High Oleic v.1 (version 1) and High Oleic v. 2 (version 2) soybean protein isolates were prepared as described in Examples 3, 5, and 8. Commodity and Low Lin (see Table 8) soybean isolates were used as controls and are referred to as "commodity" lines for the purpose of this invention. Resulting numbers for gel strength were rounded up or down after the decimal point.
[2]the commercial name refers to the specific process parameters by which the isolates were made.

Example 20

Hunter Color Determination High Oleic Soybean (Protein) Products (Small Scale Production Platform)

Color measurements were made on 5% protein isolate slurries (essentially prepared as described in Example 10) on a Hunter Colorflex 45/0 LAV instrument with an instrument setting of D65/10. A custom ring provided by the manufacturer for small volume measurements was used to reduce the amount of sample necessary for analysis by placement within the sample cup. Either 14 mL (for 10 mm ring) or 8 mL (for 5 mm ring) of the 5% isolate slurry was dispensed by pipette into the center of the ring reaching a fluid level just above the top of the ring. The sample cup was placed on the instrument and topped with the white or black disk when prompted by the software provided by the instrument manufacturer. Data for L value and Difference from White were calculated by the software and recorded. The L, a, and b scale values obtained for the samples are reported as the sample color. Whiteness Index is calculated from the L and b scale values using the following:

Whiteness Index=$L-3b$

The Color L Value, Color difference from white and the Whiteness index of High Oleic, Low Lin and Commodity soybean samples are listed in Table 5. The values were measured in 5% protein slurries. High oleic samples have higher L values, a lower difference from white value and increased whiteness indices. The average whiteness index and standard deviation of the high oleic soybean samples was 45±4.4 and that of non-high oleic soybean samples 37±4.9. An increase ranging from 3%-35% (calculated from the averages) in the whiteness index in high oleic samples compared to non-high oleic samples was observed.

TABLE 5

| Inventory ID | Trait[1] | Commercial protein type[2] | L value | Color Difference from White | Whiteness index (defined by Solae as L-3b) |
|---|---|---|---|---|---|
| PPI002385 | High Oleic | Supro ® 500E | 74 | 27 | 51 |
| PPI002391 | Commodity | Supro ® 500E | 56 | 45 | 28 |
| PPI002419 | High Oleic | Supro ® 500E | 72 | 29 | 47 |
| PPI002581 | High Oleic v.2 | Supro ® 760 | 71 | 30 | 44 |
| PPI002582 | Commodity | Supro ® 760 | 64 | 38 | 33 |
| PPI002583 | High Oleic v.1 | Supro ® 760 | 68 | 34 | 36 |
| PPI002584 | Low Lin | Supro ® 760 | 65 | 36 | 38 |
| PPI002588 | Low Lin | Supro ® 760 | 65 | 36 | 41 |
| PPI002589 | High Oleic v.2 | Supro ® 760 | 67 | 34 | 42 |
| PPI002590 | Commodity | Supro ® S760 | 65 | 35 | 43 |
| PPI002599 | High Oleic v.2 | Supro ® S760 | 70 | 31 | 45 |
| PI002600 | High Oleic v.2/High Stearic | Supro ®760 | 73 | 29 | 44 |
| PPI002601 | High Oleic v.2 | Supro ® 760 | 73 | 28 | 50 |
| PPI002602 | High Oleic v.2 | Supro ® 760 | 71 | 30 | 45 |
| PPI006492 | Commodity | Supro ® 760 | 62 | 39 | 36 |
| PPI006493 | Low Lin | Supro ® 760 | 62 | 39 | 36 |
| PPI006495 | High Oleic v.2 | Supro ® 760 | 70 | 31 | 46 |
| PPI006508 | Commodity | Supro ® 760 | 67 | 34 | 41 |

Example 21

Pasteurizer Feed Viscosity Measurements (Small Scale Production Platform)

A small sample of pasteurizer feed was collected during the preparation of protein isolates (essentially prepared as described in Example 10) following adjustment of the solids concentration and pH. To prepare a sample for viscosity measurements, the sample was loaded onto the platform of an AR-1000 Rheometer (TA Instruments) with a disposable pipette and the head lowered to 1500 mm. Excess sample was cleaned from around the edge of the geometry and the cover placed over the geometry in preparation for measurement. The viscosity was measured 60 minutes post pasteurizer feed preparation using a 40 mm flat plate geometry at a gap setting of 1000 μm. Viscosity (measured in centipoises) was recorded and analyzed using the Rheology Advantage Data Analysis software supplied by the instrument manufacturer.

High Oleic samples have lower Pasteurizer feed Viscosity compared to Low Lin or commodity samples (Table 6).

The average viscosity and standard deviation of the high oleic soybean samples compared to non-high oleic soybean isolates were 110±57.8 cp and 449±125 cp, respectively, with a % reduction (calculated from the averages) in viscosity ranging from around 9% to 52% for high oleic samples compared to non-high oleic samples.

TABLE 6

Viscosity Measurements of High Oleic Soybean Isolates

| Inventory ID | Trait[1] | Commercial protein type[2] | Pasteurizer Feed Viscosity-AR1000-Viscosity at 30/s |
|---|---|---|---|
| PPI002385 | High Oleic | Supro ® 500E | 135 |
| PPI002391 | Commodity | Supro ® 500E | 566 |
| PPI002419 | High Oleic | Supro ® 500E | 24 |
| PPI002588 | Low Lin | Supro ® 760 | 465 |
| PPI002589 | High Oleic v.2 | Supro ® 760 | 155 |
| PPI002590 | Commodity | Supro ® 760 | 317 |
| PPI002601 | High Oleic v.2 | Supro ® 760 | 79 |
| PPI002602 | High Oleic v.2 | Supro ® 760 | 158 |

Example 22

Improvement of Drying Efficiency by Using High Oleic Soybeans

High Oleic protein products were fed to a pasteurizer or a dryer at higher feed solids (above 14%) compared to commodity soy protein products (Table 7 & Table 8 in Example 23). This can be explained by the reduced viscosity of high oleic soy protein products. When protein products are fed to a pasteurizer or a dryer at increased feed solids, less water has to be removed in every pound fed to the dryer resulting in decreased energy costs, and more solids can be dried per hour resulting in better capital utilization as well as higher production quantities.

TABLE 7

Measured solid content of slurry to the Spray dryer for High Oleic vs Commodity beans

| Defatted flake | Commercial type | Slurry concentration measured by CEM | Solid content of Dryer feed by CEM |
|---|---|---|---|
| Commodity | Supro ® 760-type | 13.43 | 11.99 |
| Commodity | Supro ® 760-type | 13.28 | 11.84 |
| Commodity | Supro ® 670-type | 12.22 | 9.69 |
| Commodity | Supro ® 670-type | 12.01 | 10.38 |
| High Oleic | Supro ® 760-type | 13.49 | 11.77 |
| High Oleic | Supro ® 760-type | 14.01 | 12.28 |
| High Oleic | Supro ® 760-type | 16.56 | 14.62 |
| High Oleic | Supro ® 760-type | 17.12 | 14.89 |
| High Oleic | Supro ® 760-type | 19.40 | 15.54 |
| High Oleic | Supro ® 760-type | 18.89 | 16.09 |
| High Oleic | Supro ® 670-type | 13.41 | 10.27 |
| High Oleic | Supro ® 670-type | 13.55 | 11.38 |
| High Oleic | Supro ® 670-type | 17.02 | 14.18 |
| High Oleic | Supro ® 670-type | 17.02 | 15.31 |
| High Oleic | Supro ® 670-type | 18.34 | 15.19 |
| High Oleic | Supro ® 670-type | 17.51 | 16.18 |

Example 23

Gel Strength Measurement of High Oleic Soy Protein Products

High Oleic soy protein products have a gel strength comparable to the gel strength of commodity soy protein products when fed at no less than 14% feed solids to a dryer.

Gel strength was measured on the AR-1000 Rheometer, a sample of the gel was placed on the rheometer platform using a metal spatula and the head lowered to 1500 μm. Excess gel was trimmed from the edge of the geometry and the cover placed on top. A 40 mm cross-hatched geometry a to gap of 1400 μm was used for measurement in an oscillatory mode controlled by the instrument software. The G' (labeled gel elasticity, expressed in units of Pascals [Pa]), from 2 replicates per sample was recorded (Table 8).

TABLE 8

Measured Slurry Solid Concentration and % Protein in the Final Product of High Oleic Soybeans compared to Commodity Soybeans

| Sample No. | Defatted flake source | Commercial protein type | Slurry concentration measured by oven (%) | Prod. % Protein by Comb. Leco (as is) N*6.25 | Average of Refrigerated Gel Elasticity | Average of Pasteurized Gel Elasticity |
|---|---|---|---|---|---|---|
| a2122 | Commodity | Supro ® 500E type | 13.1 | 91.67 | 1129 | 3204 |
| b2123 | Commodity | Supro ® 500E type | 13.2 | 91.88 | 698 | 3340 |
| c2121 | Commodity | Supro ® 500E type | 13.6 | 91.07 | 972 | 2897 |
| d2131 | Commodity | Supro ® 500E type | 13.7 | 92.21 | 700 | 3075 |
| e2124 | HO | Supro ® 500E type | 12.6 | 91.98 | 26 | 591 |
| f2137 | HO | Supro ® 500E type | 15.8 | 92.78 | 68 | 697 |
| g2136 | HO | Supro ® 500E type | 16.1 | 92.71 | 64 | 649 |
| h2128 | HO | Supro ® 500E type | 19 | 92 | 172 | 1698 |
| i2135 | HO | Supro ® 500E type | 20.5 | 92.32 | 288 | 2243 |
| i2134 | HO | Supro ® 500E type | 20.9 | 93.24 | 269 | 1982 |
| k2133 | HO | Supro ® 500E type | 24.7 | 91.87 | 664 | 2077 |
| l2138 | HO | Supro ® 500E type | 24.8 | 91.08 | 637 | 1836 |

Example 24

Residual Fatty Acid Analysis by Acid Methanolysis

Triplicate samples (approximately 100 mg) were weighed, to a precision of 0.1 mg, into 13×100 mm screw capped (PTFE liners) tubes. After addition of C17:0 triacylglycerol internal standard (10 μl, 5% W:V stock in toluene), 1 ml of fresh methanolysis solution (5% sulfuric acid in anhydrous methanol) was added to each tube. The tubes were capped, vortex mixed and heated at 80° C. for 30 min, with vortex mixing every 10 minutes. The samples were cooled to room temperature and 1 ml of saline solution (25% sodium chloride in water), followed by 1 ml heptane, was added to each tube. After vortex mixing, the phases were separated by centrifugation (3000×g for 10 min) and the upper, organic phases, were transferred to GC sample vials. Fatty acid analysis was performed on an Agilent 6890 with FID detector. The GC was fitted with an OmegaWax-320, 30 m×0.32 mm×0.25 um column (Supelco, Bellefonte, Pa.). The carrier gas was hydrogen (28 cm/sec linear velocity) and the following temperature profile was used; 220° C. for 2.6 min, ramp at 10° C. to 240° C., hold for 1.4 min. Peak areas of the individual fatty acids were integrated, individual fatty acids were quantified relative to the C17 internal standard and fatty acid compositions were estimated based on these values. The assumption was made that the detector response for each fatty acid was the same (Morrison et al. (1980) Methods for the quantitative analysis of lipids in cereal grains and similar tissues. Journal of Science Food and Agriculture 31: 329-340).

Using the above-described technique, the fatty acid profile of residual fatty acids associated with hexane-extracted soy white flake flours and soy protein isolates manufactured from them was determined for commodity soybeans and two genetically altered soybean varieties, high oleic acid soybeans and low linolenic acid soybeans. The results are shown in Tables 9. Although it is recognized that other fatty acids are present in soybean oil and the residual lipid in soy products, they are only present at trace levels (<3% of total). For the sake of comparison in this patent we have restricted our analysis to the most abundant fatty acids i.e., palmitic (16:0), stearic (18:0), oleic (18:1), linoleic (18:2) and linolenic (18:3) acids.

The residual fatty acids associated with the hexane-defatted white flake flour and soy protein isolate is principally in the form of phospholipid, and therefore derived from membrane lipids, while the hexane-extracted soy oil is principally composed of storage triglycerides. Prior to this work it was not known how closely the residual fatty acid profile would be related to the fatty acid profile of hexane-extracted soy oil. From the data shown in Table 9 it can be seen that the level of palmitic acid increases in the residual fatty acids present in soy white flake flour and soy protein isolate compared to hexane-extracted soy oil in the three genetically different soybean varieties tested. In contrast, the level of oleic acid decreases in the residual fatty acids compared to hexane-extracted soy oil significantly in the commodity and low linolenic acid soybeans, but only marginally in the high oleic soybeans. The polyunsaturated fatty acids, linoleic and linolenic, are at similar levels in the residual fatty acids and hexane-extracted soy oil from the three genetically different soybean varieties.

The residual fatty acid content in soy white flake flour and soy protein isolate from low linolenic acid soybeans is lower in oxidatively unstable linolenic acid than that of commodity soy protein products, indicating that soy protein products produced from low linolenic acid soybeans are less likely to generate off-flavor compounds. Similarly, the residual fatty acid content in soy white flake flour and soy protein isolate from high oleic acid soybeans is lower in both of the polyunsaturated fatty acids, linoleic and linolenic, than that of commodity soy protein products, indicating that soy protein products produced from high oleic acid soybeans are less likely to generate off-flavor compounds.

TABLE 9

Fatty acid profiles of soy oils, of residual fatty acids in flours produced from hexane-defatted soy white flake, and of soy protein isolates

| Sample ID | 16:0 % | 18:0 % | 18:1 % | 18:2 % | 18:3 % | % Total polyunsaturates |
|---|---|---|---|---|---|---|
| Commodity Soy Oil[1] | 8-13 | 2-6 | 18-27 | 51-59 | 6-10 | 57-69 |
| High Oleic Soy Oil | 6-7 | 4-5 | 79-86 | 2-4 | 2-5 | 4-9 |
| Low Linolenic Soy Oil[4] | 10 | 5 | 29 | 53 | 3 | 62 |
| High Oleic/High Saturate Soy Oil[5] | 12 | 22 | 60 | 3 | 3 | 6 |
| High Oleic/High Stearic Soy Oil | 6 | 19 | 62 | 6 | 6 | 12 |

TABLE 9-continued

Fatty acid profiles of soy oils, of residual fatty acids in flours produced from hexane-defatted soy white flake, and of soy protein isolates

| Sample ID | 16:0 % | 18:0 % | 18:1 % | 18:2 % | 18:3 % | % Total poly-unsaturates |
|---|---|---|---|---|---|---|
| Commodity Soy WFF[2] Residual Fatty Acids | 17-27 | 5-7 | 11 | 49-58 | 7-9 | 56-67 |
| High Oleic Soy WFF[2] Residual Fatty Acids | 9-10 | 3-4 | 78-82 | 2-4 | 3-5 | 5-9 |
| Low Linolenic Soy WFF[2] Residual Fatty Acids | 24 | 7 | 10 | 57 | 3 | 60 |
| Commodity Soy SPI[3] Residual Fatty Acids | 18-24 | 5-7 | 14-15 | 45-55 | 5-7 | 50-62 |
| High Oleic Soy SPI[3] Residual Fatty Acids | 8-10 | 3 | 80-83 | 2-3 | 3-4 | 5-7 |
| Low Linolenic Soy SPI[3] Residual Fatty Acids | 26 | 6 | 15 | 52 | 2 | 54 |

For this table fatty acid % relates the individual fatty acid to the sum of the five major fatty acids indicated. Other fatty acid types that are sometimes present and represent less than 3% of the total fatty acids are not considered for purposes of comparison.
[1]Value ranges for the five major fatty acids in commodity soy oil are taken from "The Lipid Handbook" 2nd ed., (1994) Gunstone, F.D., Harwood, J.L., Padley, F.B., Chapman & Hall.
[2]WFF = White flake flour from hexane-extracted soybeans
[3]SPI = Soy protein isolate produced from white flake flour
[4]Table X U.S. Pat. No. 5,710,369
[5]Table 9 U.S. Pat. No. 6,426,448
16:0 = palmitic acid, 18:0 = stearic acid, 18:1 = oleic acid, 18:2 = linoleic acid, 18:3 = linolenic acid

Example 25

Fatty Acid Analysis of High Oleic and Commodity Soybean Isolates

Isolates from Supro®760 type high oleic, Supo®760 type ver. 2 and commodity soybeans were prepared as described in Example 13.

Fatty acid analysis of the isolates was performed as described below and the results are shown in Table 10.

The relative amounts of the fatty acids of isolated soy protein was determined as follows. The isolated soy protein was extracted by the acid hydrolysis fat method (AOAC 922.06). Extracted lipid was saponified with alcoholic sodium hydroxide. The fatty acids was esterified in methanol, with boron trifluoride as a catalyst, taken up in heptane, and injected on an Agilent 5890 Gas Chromatograph equipped with a flame ionization detector and cool on-column injector. Fatty acid methyl esters were separated on a Supelco SP-2560 column (100 m×0.25 mm ID). The column oven temperature was set to 140° C. for 5 minutes, then heated at 4° C. per minute to a maximum temperature of 240° C. and held at that temperature to the end of the analysis. The percent of individual fatty acid methyl esters were calculated from a set of standards containing known concentrations of prepared methyl esters of selected fatty acids.

TABLE 10

Fatty acid analysis of HO Supro ®760 type and Commodity Supro ®760 type Isolates

| Fatty Acid (FA) Analysis | HO Supro ® 760 type | Commodity Supro ® 760 type |
|---|---|---|
| Fat Total (%) | 4.03 | 2.07 |
| Saturated FA | 0.59 | 0.82 |
| Monounsaturated FA | 2.89 | 0.44 |
| Trans FA | <0.04 | <0.04 |
| Fatty Acid Profile (%) | | |
| Palmitic | 9.99 | 31.1 |
| Stearic | 3.44 | 7.61 |
| Oleic | 73.1 | 19.5 |
| Vaccenic | 1.56 | 2.19 |
| Linoleic | 3.17 | 32.0 |
| Linolenic | 3.59 | 2.69 |
| Others | 5.15 | 4.91 |

Example 26

Viscosity Measurements of Soy Protein Slurries Prepared from Isolates Produced Using Large Scale Production Platform Viscosity measurements were made using a Brookfield Viscometer, Model DV-II+.

Samples were prepared by weighing out a designated amount of protein (±0.1 g) into a plastic cup for 5 and 10% protein slurry.

Into a 250 mL graduated cylinder, a designated amount of deionized water of 26°±1° C. was measured. The water was poured into a glass pint blender jar and the protein sample was carefully added. The jar was immediately caped with the blade assembly and the sample mix was vigorously shaken for 20 seconds to disperse the protein and keep it from adhering to the sides of the jar. Subsequently the sample was blended for 1 minute using the lowest speed of the blender. Then the protein slurry was added to a 600 mL beaker and three drops of antifoam were added to the slurry and the mixture was swirled. The beaker was covered and left standing for 30 minutes, then swirled to dissipate and remove any remaining foam.

The Brookfield Viscometer was set up (according to the manufacturer's instructions), and viscosity of the sample was measured. Viscosity was measured in centipoises (cps). The Brookfield spindle number was 1, rotational speed was at 100 rpm and temperature at which the data was recorded was 22° C.

As can be seen in Table 11, viscosity measured in cps for 5% and 10% dispersion of soy protein from High Oleic protein samples was substantially reduced compared to the respective sample from commodity soybean (a 83% reduction in 5% slurries and 87% reduction in 10% slurries).

TABLE 11

Brookfield Viscosity measurements of High Oleic and commodity soybean Supro ® 760 - 5% and 10% protein slurries

| Sample | % protein slurry | Viscosity (cps) |
|---|---|---|
| HOSupro ® 760 | 5 | 8 |
| Commodity Supro ® 760 | 5 | 47 |
| HOSupro ® 760 | 10 | 82 |
| Commodity Supro ® 760 | 10 | 630 |

Example 27

Viscosity Measurements of Soy Protein Slurries Prepared from Isolates Produced Using Large Scale Production Platform For rheological evaluation, protein isolates were hydrated by placing 90 g DI water into an 8-ounce plastic blender jar, followed by addition of 10 g isolate powder to the surface of the water. The mixture was blended with an Oster blender using the "blend" setting for 90 seconds. After this time, the mixture was decanted into a 16-ounce plastic cup. The cup was capped with a plastic lid, and the slurry was allowed to stand for about 4 hours at 22° C. to permit a major portion of the foam atop the fluid to dissipate prior to the rheological measurements.

Rheological measurements were performed in duplicate on a combination of Anton Paar MCR-300 and MCR-301 rheometers. Each rheometer was equipped with a concentric cylinder geometry (Anton Paar CC27) having an active length of 119.2 mm, a position length of 72.5 mm, and a gap length of 40 mm. Temperature control was achieved by circulating 22° C. water from controlled-temperature baths to a Peltier sample heater that controlled the temperature of the measuring cell. All measurements were carried out at 25±0.05° C. Viscosity curves for each sample were obtained via the following 4-step procedure: (1) A 19 mL sample was loaded into the concentric cylinder cup and pre-sheared for 30 s at a shear rate of 10 1/s to erase sample loading history. (2) Immediately after the pre-shear step, the sample was allowed to equilibrate at 25° C. for 10 minutes. (3) The sample was then subjected to a 1-100 1/s shear rate ramp during which 20 logarithmically-spaced data points were recorded at an interval of 30 s per point. (4) The sample was then immediately exposed to a downward shear rate ramp which had the same characteristics as the upward ramp, but was applied in the opposite direction (100-1 1/s). The resulting viscosity versus shear rate curves were fit to a $2^{nd}$ log polynomial model: viscosity=A (shear rate)^[b+c ln(shear rate)], where A, b, and c are fitting constants. Shear stress versus shear rate curves were also recorded during these measurements and were fitted to a Herschel-Bulkley power law model: (shear stress)=K(shear rate)n, where K and n are the Herschel-Bulkley consistency and flow indices, respectively. The shear stress hysteresis area (HA) bounded by the upward and downward shear rate ramps was also recorded during each measurement.

The rheological characteristics of high oleic and commodity SUPRO® ISP products resulting from these measurements are compared in Table 10-A. Mean values of A, K, n (from the upward shear rate ramp only) and hysteresis area are reported in the table. Mean coefficients of variation for each parameter were 2.3, 1.5, 0.4, and 7.4, respectively. Significant rheological differences were observed between the commodity and high oleic variants of SUPRO® 760, SUPRO® 1610, and SUPRO® 651 ISP products. Reductions in the values of A, K, and hysteresis area ranged from 67-90%, 41-86%, and 45-90%, respectively for the high oleic samples versus their commodity analogs. The SUPRO® 760 and SUPRO® 651 high oleic ISP samples also exhibited larger flow indices—indicative of more Newtonian behavior—versus their commodity variants. In contrast, virtually no rheological differences were observed between the high oleic and commodity variants of the SUPRO® 670 ISP product.

TABLE 12

Rheological comparison of High Oleic and commodity SUPRO® type ISP products - 10 wt % aqueous dispersions at 25° C.

| Product | A [mPa s] | K [mPa] | n | HA [Pa/s] |
|---|---|---|---|---|
| SUPRO® 760 Type | | | | |
| Commodity | 6978.7 | 5032.3 | 0.473 | 175.00 |
| High Oleic | 2293.3 | 2278.4 | 0.548 | 96.28 |
| SUPRO® 1610 Type | | | | |
| Commodity | 7680.9 | 2811.7 | 0.564 | 186.20 |
| High Oleic | 1712.3 | 1667.4 | 0.492 | 85.48 |
| SUPRO® 651 Type | | | | |
| Commodity | 872.8 | 637.9 | 0.658 | 51.50 |
| High Oleic | 91.1 | 89.8 | 0.817 | 5.35 |
| SUPRO® 670 Type | | | | |
| Commodity | 10.8 | 11.3 | 0.946 | 0.05 |
| High Oleic | 12.0 | 12.4 | 0.945 | 0.00 |

Example 28

Hunter Color Determination High Oleic Soybean (Protein) Products (Large Scale Production Platform)

Color measurements using the Hunter colorimeter were made on high oleic protein and commodity protein powders and 5% aqueous slurries. Two units of L value differences can be detected and one unit of Whiteness index differences can be detected. The whiteness index was increased by 11% in HO Powder compared to commodity powder and 34% in HO slurries compared to commodity slurries. The data are shown in Tables 13 and 14.

Whiteness index measurements of a 5% by weight solids sample of the suspension for HO and commodity isolates made were determined using a HunterLab Labscan XE colorimeter manufactured by Hunter Associates Laboratory (HunterLab, Reston, Va.). For the whiteness index measurement, protein samples were dispersed on a 5% w/w basis: (5.25 g) is added to deionized water (100 mL). The results obtained using the Hunter Colorimeter are reported in units of L, a, and b. Whiteness Index is calculated from the L and b scale values using the following: Whiteness Index=L−3b.

TABLE 13

Hunter Color Determination of High Oleic and Commodity Soybean Samples

| Sample | Trait | L value | Whiteness index |
|---|---|---|---|
| Supro® 760 powder | High Oleic | 87.9 | 58.0 |
| Supro®760 powder | Commodity | 86.3 | 51.8 |
| Supro®760 slurry | High Oleic | 69.9 | 47.5 |
| Supro®760 slurry | Commodity | 68.2 | 31.2 |

TABLE 14

Hunter Color Determination of High Oleic and Commodity Soybean Samples

| Sample | Trait | L value | Whiteness index |
|---|---|---|---|
| Supro ® 1610 Type, Powder | Commodity | 82.78 | 40.6 |
| Supro ® 1610 Type, Powder | High Oleic | 84.34 | 44.38 |
| Supro ® 1610 Type, Slurry | Commodity | 48.01 | 25.81 |
| Supro ® 1610 Type, Slurry | High Oleic | 51.94 | 28.09 |
| Supro ® 651 Type, Powder | Commodity | 84.07 | 39.52 |
| Supro ® 651 Type, Powder | High Oleic | 86.62 | 47.41 |
| Supro ® 651 Type, Slurry | Commodity | 60.36 | 24.9 |
| Supro ® 651 Type, Slurry | High Oleic | 63.27 | 32.43 |
| Supro ® 670 Type, Powder | Commodity | 83.26 | 40.15 |
| Supro ® 670 Type, Powder | High Oleic | 85.5 | 48.48 |
| Supro ® 670 Type, Slurry | Commodity | 58.99 | 29.95 |
| Supro ® 670 Type, Slurry | High Oleic | 60.09 | 38.52 |
| Supro ® 760 Type, Powder | Commodity | 83.7 | 44.64 |
| Supro ® 760 Type, Powder | High Oleic | 85.7 | 49.2 |
| Supro ® 760 Type, Slurry | Commodity | 48.81 | 29.58 |
| Supro ® 760 Type, Slurry | High Oleic | 55.45 | 37.54 |

Example 29

Preparation of Plain Flavored Soymilk

About 20 pounds of dry, whole soybeans were soaked in an excess (40 pounds or more) of cold tap water, and then allowed to sit quiescently overnight. The excess water was then drained of and discarded. The 40 pounds of rehydrated soybeans were ground through a mill or grinder. A sufficient amount of water was continuously added during the grinding to keep the slurry moving through the mill. Sufficient water to bring the total slurry weight up to approximately 180 pounds was then added. The slurry was next transferred to a pressure cooker and the temperature rose, through steam injection, to 116° C., and the temperature was held constant for approximately 40 seconds. The slurry or soymilk was vented out of the pressure cooker and strained through a coarse mesh cloth. The soy residue (okara) was pressed in the bag to remove the trapped soymilk and the okara was then discarded. The resulting soymilk was strained through a fine mesh cloth and then into a container. This procedure yielded approximately 200 pounds of 93.3° C. soymilk. Lecithin (93 g), corn oil (533 g) and yeast flavor (180 g) were added and the mixture is agitated using a Tekmar High Speed Shear Mixer for 30 seconds.

Example 30

Preparation of Flavored Soymilk

Soy milk beverages, including the ingredients as set forth in the table below, was made from the product described above (example plain flavored soymilk) and a soy protein isolate (Supro® 760).

100% of water was heated to 65.6° C. and maintained at 65.6° C. with agitation until all ingredients were added. The protein product was added with agitation and mixed until dissolved. Sucrose, carboxymethylcellulose and carrageenan were dry blended and added to the protein slurry and mixed until dissolved. Calcium carbonate and sodium chloride were added and dispersed. The soybean oil was then added followed by flavors and vitamin premix. The pH of the system was adjusted between 6.8 and 7.0 using HCl or NaOH as needed. The products were then processed in an ultra high temperature short time processor at 143° C. for 10 seconds. Then the products were homogenized in a 2 stage homogenizer at 2000 and 500 psi, cooled and filled into clean bottles, and stored in a refrigerator. Whiteness Index and viscosity of samples are shown in Table 15. The whiteness index and viscosity of HO flavored soymilk compared to flavored soymilk from commodity soybeans were increased by 22% and reduced by 40%, respectively.

TABLE 15

| Sample | Trait | Whiteness index | Viscosity (cps) |
|---|---|---|---|
| Supro ®760 Flavored soymilk | High Oleic | 27.67 | 6.25 |
| Supro ®760 Flavored soymilk | Commodity | 21.52 | 10.4 |

Example 31

Plain Soymilk Physical Characteristics

Plain soymilk from high oleic and commodity soybean was prepared as described in Example 30. The whiteness index and viscosity of the samples are shown in Table 16. The viscosity of HO soymilk was reduced by 17% compared to commodity soymilk. The Whiteness Index of HO soymilk was increased by 7.5% compared to soymilk prepared from commodity soybeans.

TABLE 16

| Sample | Trait | Whiteness index | Viscosity (cps) |
|---|---|---|---|
| Supro ® 760 plain soymilk | High Oleic | 55.27 | 3.45 |
| Supro ® 760 plain soymilk | Commodity | 51.14 | 4.15 |

Example 32

Solid Phase MicroExtraction (SPME) GC MS Method for Soy Volatile Analysis

Samples for the analysis of soy volatile compounds using the SPME GC MS methods are prepared by weighing out 2.5±0.005 g of the sample to be analyzed into a weigh boat. Then 47.5±0.1 g of reverse-osmosis (e.g., Mili-Q or Labcono) water are measured into a 250 mL Waring blender cup. The blender is started at minimum speed and the weighed-out sample is sprinkled into the water over approximately 10 seconds. The sample and water are blended into a slurry using minimal speed to keep foaming to a minimum. Blending time should be enough to achieve good dispersion of the sample and should be around 30 seconds and not exceed 60 seconds. This should be kept consistent for each sample matrix. If foam develops, it should be scooped off with a spoon and manually stirred back into the sample mix.

In order to suspend the slurry and to make it as homogenous as possible it is briefly stirred with a spoon or scoop. Then 30 g of the slurry are quickly transferred from the blender cup into a tared SPME vial (50 mL serum bottle: Supelco p/n 33108-u) containing 11.1 g NaCl (Omnipur grade, EMD Chemicals).

Of the 49.2 ppm internal standard stock solution of 4-heptanone, 100 µL are pipetted into the SPME vial to yield 164 ppb internal standard concentration upon mixing. A 1" (1/16" diameter) Teflon stir bar is dropped into the vial and the vial is sealed with crimp-top septum cap (Supelco) fitted with a Natural Teflon/Blue Silicone septum (Microanalytical Supplies) to ensure a good airtight seal. The bottle is then placed on the center of a stirplate and stirred for 5 min at 300 rpm to allow thorough mixing and equilibration of the headspace.

Sample extraction is performed as follows. The SPME fiber is preconditioned as recommended by the manufacturer's manual (Supelco) for 30 min at 250° C. with minimal carrier gas flow if used for the first time. Re-conditioning of the fiber is done by inserting it into the rear injection port at 280° C. in between runs for a minimum of 30 min. Once the headspace is equilibrated, the sheathed SPME fiber is inserted through the septum. It has to be ensured that neither sheath nor fiber touches or immerses into the liquid.

Then the SPME fiber has to be extended out of its sheath, and exposed to the headspace for 30 min. The height of the fiber should be adjusted such that the end is approximately ¼" over the surface of the liquid. Subsequently the SPME fiber is retracted into its sheath and withdrawn from the septum. The fiber containing the volatiles should be injected as soon as possible for analysis. Analysis is carried out on an Agilent 6890N GC with a 7973 MSD detector and Agilent ChemStation software. The sample is injected with the sheathed SPME fiber through the injector septum, then rapidly unsheathing the fiber into the injector body. Separation begins when GC is started. The SPME should be left unsheathed in the injector for 1.5 min, after which it is removed and re-conditioned and retracted back into its sheath.

The data are analyzed using the Agilent ChemStation Software and peak areas were calculated by manual integration The calculated peak areas for each target volatile were converted to ppb by the following formula:

$$\text{Concentration of volatile in slurry (µg/kg slurry)} = 164 \times \text{target peak area/int.std.peak area}$$

Example 33

Volatile Analysis of Soy Isolates

Sample preparation and analysis was performed as described in Example 32, and the concentration of volatiles in the slurry' are shown in Table 17.

As can be seen from Table 17 (hexanal levels in high oleic samples are substantially lower compared to the hexanal levels in the respective samples form commodity soybean. It is believed that lower hexanal levels correspond to improved flavor of soybean protein products.

TABLE 17

| | Protein Product | | | | | |
|---|---|---|---|---|---|---|
| Volatiles | High Oleic SUPRO® 760 type | Commodity SUPRO® 760 type | Commodity SUPRO® 670 type | High Oleic SUPRO® 670 type | Commodity Alpha™ 5800 type | High Oleic Alpha™ 5800 type |
| Pentenal | 2.7[1] | 11.8 | 3.9 | ND | 2.5 | ND |
| Hexanal | 10.6 | 171 | 35.9 | 3.6 | 19.6 | 1.7 |
| 2-Heptanone | 1.4 | 26.5 | 12.4 | 1.6 | 8.0 | 0.34 |
| Heptanal | 1.1 | 2.60 | 0.57 | 0.25 | 0.30 | 0.45 |
| 1-Octen-3-ol | 0.25 | 0.68 | 0.19 | ND | 0.13 | ND |
| 2-Octanone | 0.11 | 1.5 | 0.54 | 0.12 | 0.27 | ND |
| 2-Pentylfuran[2] | 20.90 | 59.7 | 15.7 | 1.5 | 2.52 | 0.12 |
| 3-Octen-2-one | ND[2] | 0.60 | 0.61 | ND | ND | ND |
| 2-Nonanone | 0.93 | 1.2 | 0.96 | 0.96 | 0.15 | 0.11 |
| Nonanal | 2.3 | 2.4 | 0.64 | 0.65 | 0.39 | 0.46 |
| Decanal | ND | 0.52 | ND | 0.27 | 0.08 | 0.22 |

[1]All concentrations are expressed as µg volatile/kg 5% slurry relative to the 4-heptanone internal std. which was present at 164 µg/kg 5% slurry.
[2]ND = not detected

What is claimed is:

1. A method for processing a soy protein isolate, the method comprising:
   (a) feeding at least one unhydrolyzed high oleic acid protein isolate from a high oleic acid soybean which has an oleic acid content of at least 60% at no less than 18% and no more than 24% feed solids and at a pH of 6.8 to 7.3 to a pasteurizer or jet-cooker and exposing said high oleic soy protein isolate to a temperature of about 75° C. to about 160° C.;
   (b) after step (a) feeding at no less than 18% and not more than 24% feeds solids the high oleic soy protein isolate to a spray dryer; and then
   (c) spray drying the high oleic soy protein isolate at a temperature of about 285° C. to about 315° C.

2. The method of claim 1, wherein when compared to a soy protein isolate obtained from a commodity soybean using a comparable process as that to obtain the soy protein isolate from a high oleic soybean but feeding in steps (a) and (b) at less than 14% feed solids:
   a) the whiteness index of the protein isolate of step (c) is increased by at least 3%;
   b) the gel strength of the protein isolate of step (c) is reduced by at least 25%; or
   c) the viscosity of the protein isolate of step (c) is reduced by at least 9%.

3. The method of claim 1, wherein the protein isolate of step (c) has at least 40% protein (N×6.25) on a moisture-free basis.

4. The method of claim 1, wherein the protein isolate of step (c) has at least 65% protein (N×6.25) on a moisture-free basis.

5. The method of claim 1, wherein the protein isolate of step (c) has at least 90% protein (N×6.25) on a moisture-free basis.

6. The method of claim 1, wherein the temperature in step (a) is about 100° C. to about 155° C.

7. The method of claim 1, wherein the temperature in step (c) is about 290° C. to about 300° C.

8. The method of claim 1, wherein the high oleic acid protein isolate is fed into a jet-cooker at a flow rate of about 18.5 lbs/minute in step (a).

9. The method of claim 1, wherein the protein isolate in step (c) is dried using a nozzle atomizer.

10. A method for processing a soy protein isolate, the method comprising:
    (a) feeding at least one unhydrolyzed high oleic acid protein isolate from a high oleic acid soybean which has an oleic acid content of at least 60% at no less than 18% and no more than 24% feed solids and at a pH of 7.3 to 7.7 to a pasteurizer or jet-cooker; and then
    (b) feeding the at least one unhydrolyzed high oleic acid soy protein isolate at no less than 18% and not more than 24% feeds solids to a spray dryer.

11. The method of claim 10, further comprising spray drying the unhydrolyzed high oleic acid soy protein isolate after step (b).

* * * * *